(12) United States Patent
Wei et al.

(10) Patent No.: US 11,645,745 B2
(45) Date of Patent: May 9, 2023

(54) SYSTEM AND METHOD FOR ADVERSE EVENT DETECTION OR SEVERITY ESTIMATION FROM SURGICAL DATA

(71) Applicant: SURGICAL SAFETY TECHNOLOGIES INC., Toronto (CA)

(72) Inventors: Haiqi Wei, Toronto (CA); Teodor Pantchev Grantcharov, Stouffville (CA); Babak Taati, Toronto (CA); Yichen Zhang, Toronto (CA); Frank Rudzicz, Toronto (CA); Kevin Lee Yang, Mississauga (CA)

(73) Assignee: SURGICAL SAFETY TECHNOLOGIES INC., Toronto (CA)

( * ) Notice: Subject to any disclaimer, the term of this patent is extended or adjusted under 35 U.S.C. 154(b) by 238 days.

(21) Appl. No.: 16/791,919

(22) Filed: Feb. 14, 2020

(65) Prior Publication Data

US 2020/0265273 A1  Aug. 20, 2020

Related U.S. Application Data

(60) Provisional application No. 62/944,033, filed on Dec. 5, 2019, provisional application No. 62/806,164, filed on Feb. 15, 2019.

(51) Int. Cl.
*G06K 9/62* (2022.01)
*G06V 20/40* (2022.01)
(Continued)

(52) U.S. Cl.
CPC ......... *G06K 9/6268* (2013.01); *G06K 9/6271* (2013.01); *G06N 3/0481* (2013.01);
(Continued)

(58) Field of Classification Search
CPC .... G06K 9/6268; G06N 20/10; G06N 3/0481; G06N 3/084; G06T 3/0093; G06T 7/0012
See application file for complete search history.

(56) References Cited

U.S. PATENT DOCUMENTS 6,640,132 B1 * 10/2003 Freeman ............... G06T 7/0002
600/476
2009/0326383 A1 * 12/2009 Barnes ................. H04N 5/2256
600/476
(Continued)

FOREIGN PATENT DOCUMENTS

CN 107451620 A * 12/2017

OTHER PUBLICATIONS

Shuaicheng Liu, Lu Yuan, Ping Tan, and Jian Sun, "Bundled camera paths for video stabilization", ACM Transactions on Graphics (TOG), vol. 32, Issue 4, Jul. 2013, Article No. 78, pp. 1-10, https://doi.org/10.1145/2461912.2461995 (Year: 2013).*
(Continued)

*Primary Examiner* — Bernard Krasnic
(74) *Attorney, Agent, or Firm* — Norton Rose Fulbright Canada LLP

(57) ABSTRACT

Embodiments described herein may provide devices, systems, methods, and/or computer readable medium for adverse event detection and severity estimation in surgical videos. The system can train multiple models for adverse detection and severity estimation. The system can load selected models for real-time adverse event detection and severity estimation.

16 Claims, 49 Drawing Sheets

(51) Int. Cl.
G06V 10/70 (2022.01)
G06N 3/084 (2023.01)
G06T 3/00 (2006.01)
G06N 20/10 (2019.01)
G06T 7/00 (2017.01)
G06N 3/04 (2023.01)

(52) U.S. Cl.
CPC .............. *G06N 3/084* (2013.01); *G06N 20/10* (2019.01); *G06T 3/0093* (2013.01); *G06T 7/0012* (2013.01); *G06V 10/70* (2022.01); *G06V 20/44* (2022.01)

(56) References Cited

U.S. PATENT DOCUMENTS

2018/0033144 A1* 2/2018 Risman .................. G16H 30/20
2018/0247023 A1* 8/2018 Divine ................... G16H 20/40
2020/0240840 A1* 7/2020 Darty ..................... G01J 3/0272

OTHER PUBLICATIONS

Tsung-Yi Lin, Priya Goyal, Ross Girshick, Kaiming He, and Piotr Dollár, "Focal Loss for Dense Object Detection", 2017 IEEE International Conference on Computer Vision (ICCV) (2017): 2999-3007 (Year: 2017).*

Aïcha Ben Taieb and Ghassan Hamarneh. "Uncertainty Driven Multi-loss Fully Convolutional Networks for Histopathology." CVII-STENT/LABELS@MICCAI (2017), DOI:10.1007/978-3-319-67534-3_17 (Year: 2017).*

Farha, Y.A.—"MS-TCN: Multi-Stage Temporal Convolutional Network for Action Segmentation"—arXiv—Mar. 5, 2019, pp. 1-10 (Year: 2019).*

Leape, L. L. et al., The nature of adverse events in hospitalized patients: Results of the Harvard medical practice study II. New England Journal of Medicine 324, 377{384 (1991), URL: http://www.nejm.org/doi/abs/10.1056/NEJM199102073240605.

Gawande, A. A., Zinner, M. J., Studdert, D. M. & Brennan, T. A., Analysis of errors reported by surgeons at three teaching hospitals, Surgery 133, 614{621 (2003), URL: https://doi.org/10.1067/msy.2003.169.

Gawande, A. A., Thomas, E. J., Zinner, M. J. & Brennan, T. A., The incidence and nature of surgical adverse events in Colorado and Utah in 1992, Surgery 126, 66{75 (1999), URL: https://doi.org/10.1067/msy.1999.98664.

Thomas, E. J. et al., Costs of Medical Injuries in Utah and Colorado, Inquiry 36, 255{264 (1999), URL: http://www.jstor.org/stable/29772835.

BIS Research, Global laparoscopy and endoscopy devices market: Focus on surgical procedures (cholecystectomy and hysterectomy) and product types (arthroscopes, neuroendoscopes, cystoscope, and bronchoscopes)—analysis and forecast, 2018-2025, Tech. Rep., BIS Research (2018), URL: https://www.researchandmarkets.com/research/626pqp/global?w=12.

Garcia-Martinez, A., Vicente-Samper, J. M. & Sabater-Navarro, J. M., Automatic detection of surgical haemorrhage using computer vision, Artificial Intelligence in Medicine 78, 55 { 60 (2017), URL: http://www.sciencedirect.com/science/article/pii/S0933365716305590.

Okamoto, T. et al., Real-time identification of blood regions for hemostasis support in laparoscopic surgery, Signal, Image and Video Processing 13, 405{412 (2019), URL: https://doi.org/10.1007/s11760-018-1369-7.

Jo, K., Choi, B., Choi, S., Moon, Y. & Choi, J., Automatic detection of hemorrhage and surgical instrument in laparoscopic surgery image, In 2016 38th Annual International Conference of the IEEE Engineering in Medicine and Biology Society (EMBC), 1260{1263 (2016).

Fu, Y., Zhang, W., Mandal, M. & Meng, M. Q., Computer-Aided Bleeding Detection in WCE Video. IEEE Journal of Biomedical and Health Informatics 18, 636{642 (2014).

Ghosh, T., Bashar, S. K., Fattah, S. A., Shahnaz, C. & Wahid, K. A., A feature extraction scheme from region of Interest of wireless capsule endoscopy images for automatic bleeding detection, In 2014 IEEE International Symposium on Signal Processing and Information Technology (ISSPIT), 256{260 (2014).

Zhou, S., Song, X., Siddique, M. A., Xu, J. & Zhou, P., Bleeding detection in wireless capsule endoscopy images based on binary feature vector, In Fifth International Conference on Intelligent Control and Information Processing, 29{33 (2014).

Usman, M. A., Satrya, G., Usman, M. R. & Shin, S. Y., Detection of small colon bleeding in wireless capsule endoscopy videos, Computerized Medical Imaging and Graphics 54, 16 { 26 (2016), URL: http://www.sciencedirect.com/science/article/pii/S0895611116300970.

Jia, X. & Meng, M. Q., A deep convolutional neural network for bleeding detection in Wireless Capsule Endoscopy Images, In 2016 38th Annual International Conference of the IEEE Engineering in Medicine and Biology Society (EMBC), 639{642 (2016).

Li, X., Zhang, H., Zhang, X., Liu, H. & Xie, G., Exploring transfer learning for gastrointestinal bleeding detection on small-size imbalanced endoscopy images, In 2017 39th Annual International Conference of the IEEE Engineering in Medicine and Biology Society (EMBC), 1994{1997 (2017).

Szegedy, C., Vanhoucke, V., Ioffe, S., Shlens, J. & Wojna, Z., Rethinking the Inception Architecture for Computer Vision, In 2016 IEEE Conference on Computer Vision and Pattern Recognition (CVPR), 2818{2826 (2016).

Russakovsky, O. et al., Imagenet large scale visual recognition challenge. International Journal of Computer Vision 115, 211{252 (2015), URL: https://doi.org/10.1007/s11263-015-0816-y.

Secretariat, M. A., Wireless capsule endoscopy: an evidence-based analysis, Ontario health technology assessment series 3, 1{35 (2003), URL: https://www.ncbi.nlm.nih.gov/pubmed/23074442. 23074442[pmid].

Carreira, J. & Zisserman, A., Quo Vadis, Action Recognition? A New Model and the Kinetics Dataset, In 2017 IEEE Conference on Computer Vision and Pattern Recognition (CVPR), 4724{4733 (2017).

Farha, Y. A. & Gall, J., MS-TCN: Multi-Stage Temporal Convolutional Network for Action Segmentation. In 2019 IEEE Conference on Computer Vision and Pattern Recognition (CVPR) (2019), URL: http://arxiv.org/abs/1903.01945.1903.01945.

Lin, T., Goyal, P., Girshick, R., He, K. & Piotr Dollar, Focal Loss for Dense Object Detection, In 2017 IEEE International Conference on Computer Vision (ICCV), 2999{3007 (2017).

Liu, S., Yuan, L., Tan, P. & Sun, J., Bundled Camera Paths for Video Stabilization, ACM Trans. Graph. 32, 78:1{78:10 (2013), URL: http://doi.acm.org/10.1145/2461912.2461995.

Kay, W. et al., The Kinetics Human Action Video Dataset, ArXiv abs/1705.06950 (2017).

Cipolla, R., Gal, Y. & Kendall, A., Multi-task Learning Using Uncertainty to Weigh Losses for Scene Geometry and Semantics, In 2018 IEEE/CVF Conference on Computer Vision and Pattern Recognition, 7482{7491 (2018).

Rublee, E., Rabaud, V., Konolige, K. & Bradski, G., Orb: An e_cient alternative to SIFT or SURF, In 2011 International Conference on Computer Vision, 2564{2571 (2011).

Lea, C., Flynn, M. D., Vidal, R., Reiter, A. & Hager, G. D., Temporal Convolutional Networks for Action Segmentation and Detection, arXiv:1611.05267v1 [cs.CV] Nov. 16, 2016.

Richard, A. & Gall, J., Temporal Action Detection Using a Statistical Language Model, In 2016 IEEE Conference on Computer Vision and Pattern Recognition (CVPR), 3131{3140 (2016).

* cited by examiner

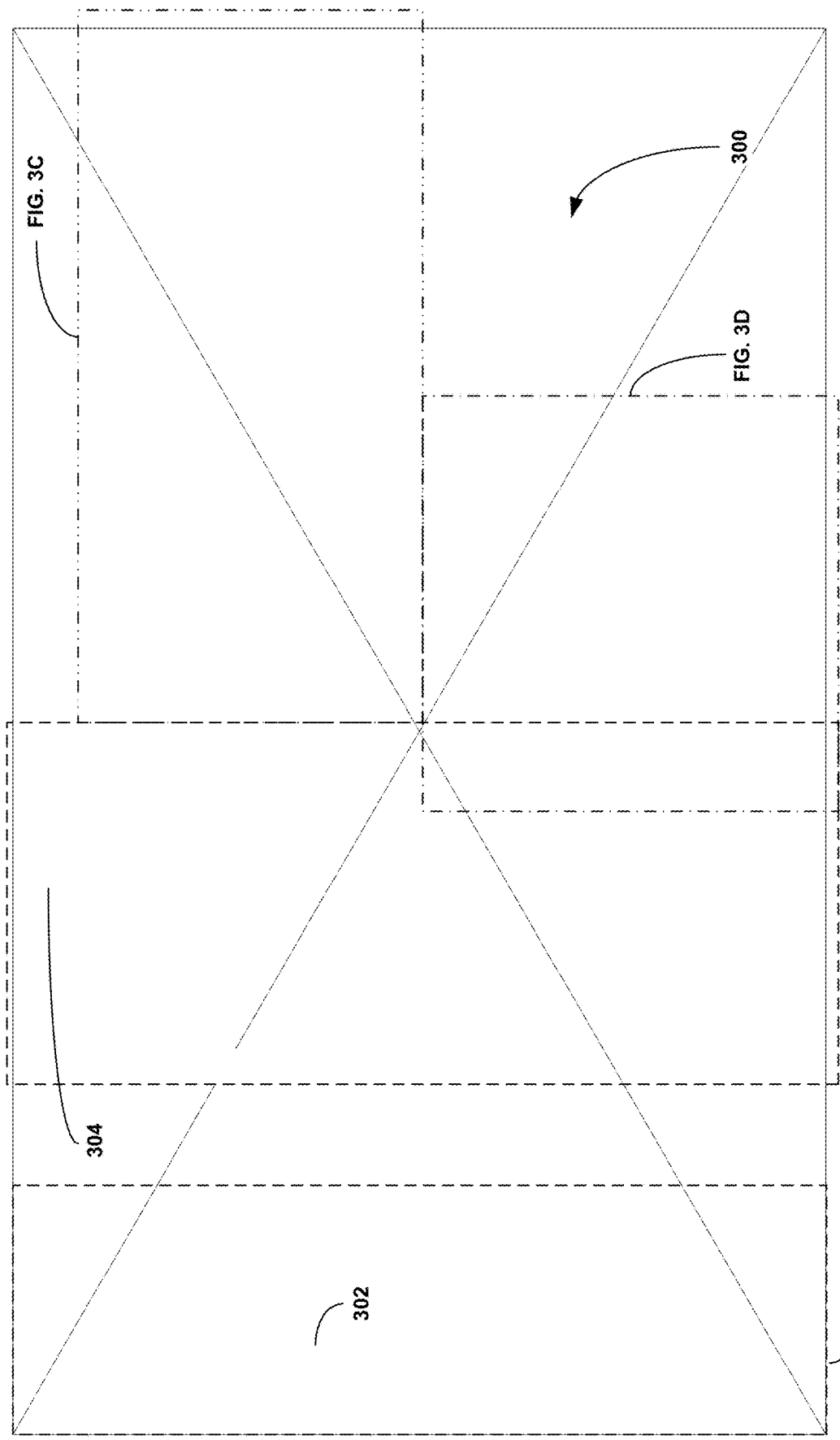

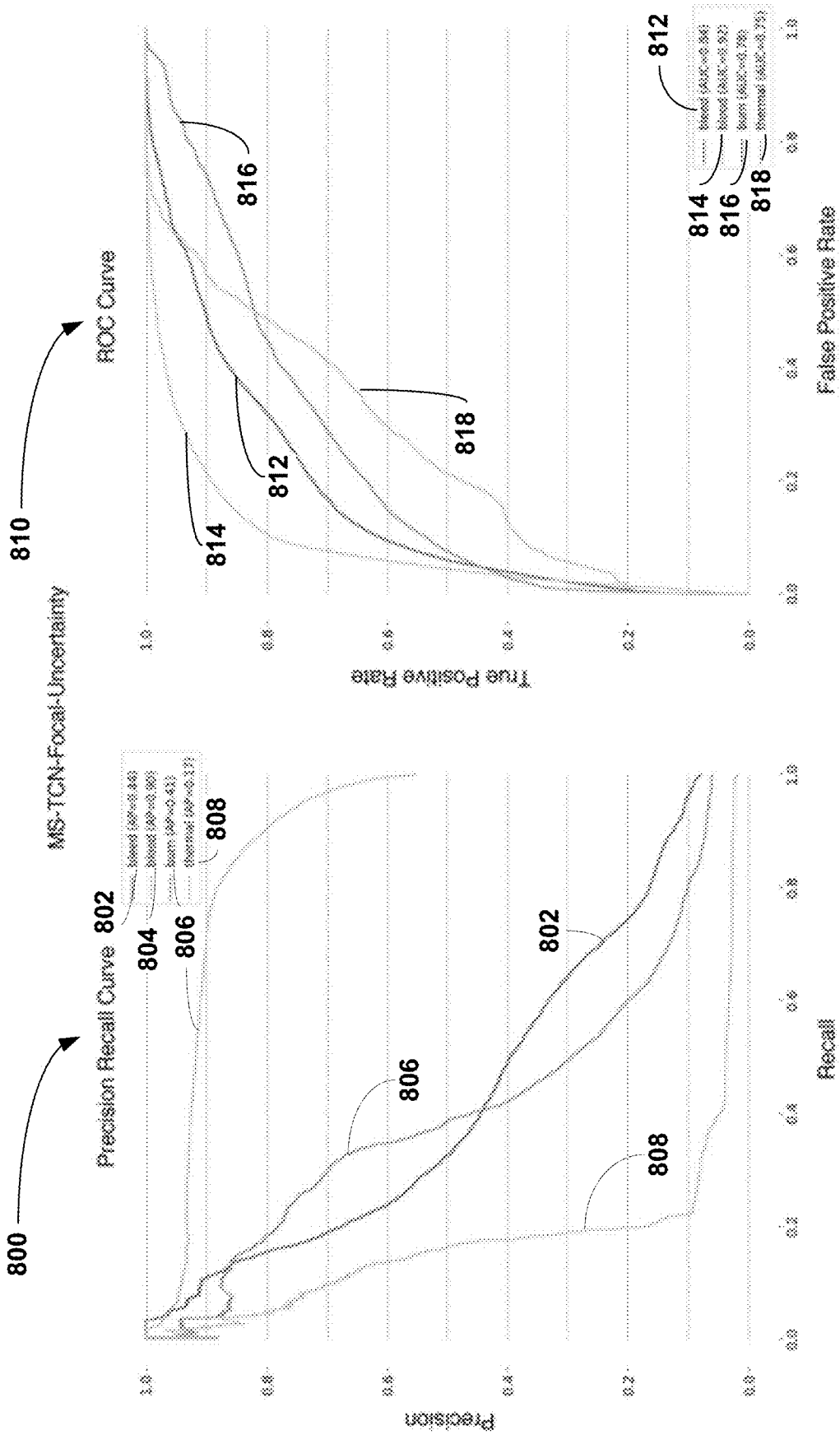

Distractions, Audio Tagging

| Distraction | F1 | Precision | Recall |
|---|---|---|---|
| Anaesthesia Alarm | 0.738 | 0.803 | 0.680 |
| Cell Phone / Pager | 0.545 | 0.818 | 0.409 |
| Door Close | 0.576 | 0.556 | 0.599 |
| Door Open | 0.467 | 0.503 | 0.435 |
| Dropped Instrument | 0.000 | 0.000 | 0.000 |
| Handling Packaging | 0.724 | 0.742 | 0.708 |
| Object Dragging | 0.507 | 0.758 | 0.381 |
| Other Loud Distraction | 0.596 | 0.578 | 0.615 |
| Phone Ring | 0.769 | 0.750 | 0.789 |
| Supply Access | 0.621 | 0.616 | 0.626 |
| Overall | 0.554 | 0.612 | 0.524 |

FIG. 21A

OR Sounds, Audio Tagging

| Distraction | F1 | Precision | Recall |
|---|---|---|---|
| Cautery | 0.957 | 0.938 | 0.977 |
| Harmonic | 0.961 | 0.978 | 0.944 |
| Insufflation Air | 0.764 | 0.777 | 0.753 |
| Ligasure | 0.913 | 0.955 | 0.875 |
| Stapler | 0.901 | 0.867 | 0.938 |
| Specimen Removal | 0.000 | 0.000 | 0.000 |
| Suction | 0.903 | 0.943 | 0.867 |
| Overall | 0.771 | 0.779 | 0.765 |

FIG. 21B

| Exp # | Category | Method | ATF1 | Prec | Recall |
|---|---|---|---|---|---|
| 1 | Distractions | Guided Learning | .3215 | 0.376 | 0.298 |
| 2 | OR Sounds | Guided Learning | 0.5738 | 0.580 | 0.570 |
| 3 | Distractions | Mean Teacher (non-normalize, T) | 0.294 | 0.181 | 0.777 |
| 4 | OR Sounds | MT, NN, T | 0.603 | 0.522 | 0.715 |
| 5 | Distractions | MT, NN, S | 0.286 | 0.173 | 0.826 |
| 6 | OR Sounds | MT, NN, S | 0.610 | 0.593 | 0.628 |
| 7 | Distractions | MT, Norm, T | 0.291 | 0.181 | 0.744 |
| 8 | OR Sounds | MT, Norm, T | 0.566 | 0.534 | 0.602 |
| 9 | Distractions | MT, Norm, S | 0.294 | 0.186 | 0.697 |
| 10 | OR Sound | MT, Norm, S | 0.638 | 0.611 | 0.667 |

FIG. 22

SYSTEM AND METHOD FOR ADVERSE EVENT DETECTION OR SEVERITY ESTIMATION FROM SURGICAL DATA

CROSS REFERENCE

This application claims all benefit, including priority, to U.S. Provisional Application No. 62/806,164, entitled "SYSTEM AND METHOD FOR ADVERSE EVENT DETECTION AND SEVERITY ESTIMATION IN SURGICAL VIDEOS", and filed on Feb. 15, 2019; and U.S. Provisional Application No. 62/944,033 entitled "SYSTEM AND METHOD FOR ADVERSE EVENT DETECTION AND SEVERITY ESTIMATION IN SURGICAL VIDEOS", and filed on Dec. 5, 2019; the entire contents of each of which are hereby incorporated by reference.

FIELD

The present disclosure generally relates to the field of video processing, object detection, and object recognition, and more specifically, to machine learning mechanisms for generating classifications for identifying potential adverse events.

INTRODUCTION

Embodiments described herein relate to the field of medical devices, systems and methods and, more particularly, to a medical or surgical devices, systems, methods and computer readable medium to monitor patient activity in an operating room (OR) setting or patient intervention area.

There are three studies that developed algorithms for bleeding or blood-region detection in laparoscopic videos. Two of these used statistical parameters of colour space such as RGB, and HSV for feature extraction, and fed these features into a support vector machine (SVM). The third study used CIELAB colour space, and Otsu's method for bleeding detection. These handcrafted features are not adaptive to environmental changes in videos such as change in light source, and they strongly depend on a threshold selected for feature extraction, and on other hyper-parameters. Although temporal features were considered by previous work, it required the camera to be stable, which is extremely unlikely in real operations.

A method that addresses camera motion and handcrafted feature issues of detection in laparoscopic videos is desired. While little work has been done in laparoscopic videos, similar work has been done in diagnosis in Wireless Capsule Endoscopy (WCE), a device that is swallowed by patients, and is often used to see inside a patient's digestive tract. Physicians will go through thousands of images taken while the capsule is going down the patient's digestive tract, and diagnose the problem. Similar to laparoscopic studies, most of the automatic detection algorithms in WCE utilized handcrafted features, specifically statistical parameters of colour space such as RGB, CMYK, HSI, and HSV. These handcrafted features are highly sensitive to its operating environments which limits the generalizability of the algorithm. One of the studies grouped pixels into 44 super-pixels to address this problem. However, this study classified bleeding based on statistical parameters computed from super-pixels. Although this method is more generalizable than pixel-based method, it still depends on colour, and brightness of the scene which will not generate a consistent result among different cases.

SUMMARY

As described in some embodiments, an automated system for generating data structures storing classifications relating to an adverse event is provided. Surgical outcomes, despite operation by expertly trained surgeons and healthcare professionals, are nonetheless constrained through limitations of science and technological tools, and errors are possible.

A specific architecture for a computer system is proposed that, in conjunction with a pipeline of data obtained from sensors disposed throughout a healthcare facility (e.g., operating room), utilizes deep learning and machine learning approaches to provide a practical mechanism for automated generation of computer-based estimations, which are encapsulated in output data structures. The specific architecture and machine learning approaches of various embodiments are proposed to help address technical, computer-based problems that arose during system implementation.

The system can be provided as a computer server, which, for example, can reside within a data center that is either electronically coupled to a healthcare facility or reside within the healthcare facility. Training can be conducted based on electronic data sets from one facility (e.g., based on local data), or in some cases, across multiple facilities. In some cases, the machine learning data architecture model is trained locally and federated such that updates to the underlying model weights and interconnections are coordinated. Using a federated training approach allows sensitive data to remain on-premises while training the model architecture across multiple facilities.

The system of some embodiments is directed to healthcare applications where disparate data sets are received, and it is not practically feasible for all of the data to be processed and labelled by human reviewers, especially where time sensitive analyses are required (e.g., near-real time interventions). Data outputs, in some embodiments, can include annotated graphical user interfaces or data objects including annotations indicating estimated regions of interest or points of interest associated with an audio or video recording of a healthcare procedure, which can then be used for ease in navigation by the human reviewers so that they may not need to review the entirety of the procedure. In alternate embodiments, the data outputs can include data structures which are appended to an electronic health record or a procedural record on a data warehouse or database storing procedure-based data.

Applicants have developed an healthcare "black box" system where a healthcare facility, such as an operating room, an operating theater, recovery room, intensive care unit, emergency room, etc. are equipped with various sensors to feed audio and/or video to a machine learning system for processing. The sensors, for example, can be microphones (e.g., ceiling microphones, wearable microphones), and video cameras (e.g., wide angle cameras in-room, cameras installed into an overhead light, or an intra-corporeal video feed from a laparoscope or an endoscope). There may be other data feeds that are provided from other devices operating in the healthcare facility, such as feeds from patient monitors, electronic health records, medical devices (e.g., a connected surgical stapler), among others. These data sets can be time synchronized, collected into a pipeline of data and stored on a secure server for further analysis.

Processing the received data quickly helps provide actionable insights that can either be used to improve future iterations of a particular procedure or, in some cases, aid in identifying issues with a recent procedure and/or conducting an intervention. Relative to conventional approaches of identifying adverse events and reporting post hoc in patient records, automatic adverse event detection reduces the subjectivity of such reports. For post-operative care, automatic adverse event detection (estimation) assists with reducing the administrative burden and cost of manual review by helping focus the review or to automatically annotate estimations into an electronic data record.

Applicants note that intraoperative adverse events are a risk factor in any procedure and a factor in morbidity, as it is difficult or impossible for healthcare practitioners (e.g., surgeons) to account for every uncertainty, especially in relation to high risk procedures. Similarly, even for minimally invasive procedures and lower risk procedures (e.g., a routine hernia repair), adverse events are still possible. For example, a surgical tool can inadvertently touch tissue and cause undesirable burns (e.g., thermal injury), or cut injuries (e.g., bleeding). Other types of adverse events can also include dropped tools, for example.

An objective of the approaches described herein, among others, reduce potential surgical errors through providing an automated machine learning based mechanism to support clinical decision making.

A large volume of raw audio, video, equipment, and electronic health record data is received by the sensor network, and this data is subject to a large amount of variance due to differences in operating theatre configurations (e.g., differences in lighting conditions, device positioning, camera motion, room spectral characteristics), among others.

It is not practical to use hand-crafted detection networks as they are not capable of adapting to these changes and individualization of each and every configuration, especially as new features and parameters are added into the computer-based analysis. Hand-crafted detection networks include approaches that are written for a specific configuration, for example, having static approaches and hard coded values. A weakness with hand-crafted approaches is that they become domain specific and not portable from one implementation to another, and the cost of customization is very high.

Accordingly, Applicants have investigated deep learning approaches for adverse event estimation, and propose an improved system that addresses some of the technical problems encountered in respect of practical implementation of a deep learning/machine learning system. For example, as described herein, the performance of various embodiments of the proposed system are compared against alternate machine learning approaches and performance improvements are noted in respect of machine learning data architecture model performance.

The system is configured to extract, using a neural network as a feature extractor, a vector of latent features from the set of audio or video data. The feature extractor can be a convolutional neural network (e.g., a 2D or a 3D convolutional neural network, such as an InceptionV1-based 3D convolutional neural network). The feature extractor extracts vectors of latent features from the set of audio or video data. These vectors are provided to a plurality of time-based classifiers (e.g., temporal convolutional classifiers) each corresponding to a specific classification task (e.g., bleeding detection, thermal injury detection).

The time-based classifiers can include recurrent neural networks, multi-stage temporal convolutional networks, self-attention mechanisms (e.g., transformers), among others. Transformers learn representations by a method of self-attention, and they are more parallelizable than other networks.

In some embodiments, each of the specific classification tasks are causally distinct (e.g., events having low or no correlation with one another), and may be adapted to specifically distinguish between related sub-events, such as having a first task for classifying bleeding events as distinct from pre-existing blood captured in a data feed, and a second task for classifying thermal injury events as distinct from pre-existing burn marks captured in the data feed.

These distinctions, for example, can be used to identify active injury events resultant from the on-going procedure as opposed to prior injury events. This is especially useful in the surgical environment, where a machine system can otherwise be confused in generating estimations by the presence of clotted blood/blood stains, thermal injury scars from prior procedures, etc. For a particular type of procedure (e.g., heart valve replacement surgery), there may be an acceptable level of tissue damage, and an adverse event can occur when the tissue damage exceeds those normally encountered for the particular surgery (e.g., a major artery has been ruptured).

The feature extractor neural network of some embodiments can be trained on a training data set using a sigmoid binary cross-entropy loss, and each of the time-based classifiers is trained using a loss function. The loss function can include, for example, at least the sigmoid binary cross-entropy loss used to train the feature extractor, and in some embodiments, further includes a T-MSE loss (truncated mean-square error that minimizes the number of transitions from one detection to another). Other potential aspects of the loss function for the feature extractor neural network can include focal loss, uncertainty loss, etc.

As noted in variant embodiments herein, in some embodiments, the approach can be adapted to compensate for camera motion/jitter (e.g., of a laparoscope as it travels within the body through the abdominal wall). An additional stabilizer (e.g., stabilizer circuit, stabilizer module, stabilizer subcircuit, stabilizer process, stabilizer software subroutine) is added in some embodiments that receives a set of video frames and uses bundled-camera path stabilization to reduce jitter and smooths camera paths so that the latent features are accumulated across a plurality of frames. Experimentation was conducted in respect of stabilization, and approaches where camera paths were estimated and optimized to improve smoothness were found to be useful, especially with laparoscopic videos. A discontinuity-preserving term (smoothing term) can be utilized to preserve motion discontinuity, which prevents cropping for a quickly panning scene. Specific experimentation provided evaluation metrics in relation to different technical approaches to frame division, resolution, adaptive parameters, and frame consideration.

Specific loss functions for the plurality of time-based classifiers are described in various embodiments, and Applicant conducted experimentation to identify loss functions that aided in improving technical performance. Technical performance is assessed based on a balance of accuracy, sensitivity of the model, segmental precision, and recall.

As described in further detail in various embodiments, different combinations of the multi-task loss (e.g., the sigmoid binary cross entropy) modified using focal loss, uncertainty loss, and smoothing loss are proposed and evaluated. Modifying the loss function yielded technical distinctions where, for example, utilizing focal loss scales the binary cross-entropy for each sample so that the model focuses on learning harder examples, addressing imbalance issues that can arise during training. The focal loss and the uncertainty address class imbalance issues, among others. Uncertainty loss addresses task-specific uncertainty, which guide models to learn better weights.

As noted above, a T-MSE loss may be optionally included and may be beneficial in some use cases as technical trade-offs in precision and recall may be justified. This loss helps to minimize outliers in prediction by forcing the model to penalize more on predictions that leads to a transition (e.g. from positive to negative prediction).

Experimentation was conducted against data sets obtained in relation to gastric bypass laparoscopic procedures, where trained surgeons generated a labelled data set based on frames of received data captured during the procedures, and Applicants note that the embodiments are not to be considered limited to only these types of procedures, but rather, various embodiments are contemplated for use with a range of procedures.

Classifier outputs, in some embodiments, can be encapsulated by way of data structures which can include, for example, the logits generated by the neural networks. In another embodiment, the logits may be processed (e.g., by a softmax) to generate normalized outcomes as data values.

These output data values can then be processed using a graphical rendering or data structure encapsulation engine to be associated with annotations or visualizations in respect of renderings of a record of a surgical procedure.

In some embodiments, the output data values and/or a representation of the recorded procedure (e.g., segments of interest) may also be appended on to an electronic health record of the patient, or apply an edit to an existing record, such that downstream analysis is possible (this may be useful, for example, where the patient suffered a negative outcome). These updates can include encapsulated video, audio, or other media, and generate alarms or notifications for downstream processing.

The annotations can include time-based markings of segments or points on a timeline, which can be provided then to a human reviewer to identify specific areas of a video or an audio stream (or equipment data) to focus on or to investigate further. For example, a bleeding event may be tracked from 12:11-12:45 of a video, followed by a thermal event at 12:50-12:55.

In some embodiments, the encapsulated annotations and/or record can be provided so that the human surgical reviewer focuses his/her attention on those predicted segments of interest. In another embodiment, the system is configured to conduct real or near real-time analysis based on an on-going procedure, and if the output data values indicate that there may be a potential issue arising in the procedure, the system may cause the generation of alerts or notifications (e.g., automatically sending out a request to prepare for a blood transfusion, requesting the presence of a senior surgeon).

As described in an embodiment, a system is provided that considers camera motion, spatial-temporal features, and full temporal resolution of laparoscopic videos. The system can use a novel loss function to handle class imbalance, and to address multi-task uncertainty. In some embodiments, the system may be trained on a dataset comprising a plurality of laparoscopic procedures. This system can be used to identify surgical adverse events with more objectivity, provide feedback to operating staff, and help physicians prepare for postoperative care.

In accordance with an aspect, there is provided a system for adverse event detection or severity estimation. The system comprises a processor and a memory storing instructions which when executed by the processor case the processor to process video data and/or other data (e.g., kinematic data) of surgical events to generate a pipeline of adverse event episodes, evaluate each adverse event episode of the pipeline to generate a severity estimate for the respective adverse event episode, and output data indicating the adverse event episodes and the corresponding severity estimates. Each adverse event episode can comprise at least one video frame (or audio frame) annotated as an adverse event.

In some embodiments, the server is configured to train one or more models for adverse event (such as bleeding and/or thermal injury) detection and select an optimal model for deployment to process the video data of surgical events to generate the pipeline of adverse event episodes, the models configured as neural networks.

In some embodiments, the server is configured to train one or more models for adverse event detection and select an optimal model for deployment to process kinematic data of surgical events to generate the pipeline of adverse event episodes, and the models are configured in a form of at least one of: support vector machines, random forests, or conditional random fields.

In some embodiments, the server is configured to data sample for the video data in order to oversample adverse event frames of the video data or undersample frames non-adverse event frames of the video data.

In some embodiments, the server is configured to update the selected model for adverse event detection using online training.

In some embodiments, the server is configured to use an attention mechanism to track an adverse event episode over a plurality of video frames, each of the plurality of video frames having an identified adverse event region.

In some embodiments, the server is configured to use an attention mechanism to eliminate duplicate adverse event episodes and aggregate as the adverse event episode.

In some embodiments, the server is configured to generate visual elements representing adverse event episodes of the pipeline.

In some embodiments, the server is configured to generate reasoning data and form knowledge base for the adverse event episodes of the pipeline using a neural network.

In some embodiments, the server is configured to train one or more models for severity estimation and select an optimal model for deployment to evaluate each adverse event episode of the pipeline to generate the severity estimates.

In some embodiments, the server is configured to train one or more models for severity estimation using images and results of bleeding detection to generate velocity estimates, volume estimates and features.

In some embodiments, the features can be one or more of colour, texture, blood flow, blood speed, or blood volume.

In some embodiments, the server is configured to train classification model for estimation of velocity of blood flow for the bleeding episode.

In some embodiments, the server is configured to train a volume regression model for estimation of volume of blood flow for the bleeding episode.

In some embodiments, the server is configured to data sample for the video data in order to oversample high severity frames of the video data or undersample frames low severity frames of the video data.

In some embodiments, the server is configured to evaluate each adverse event episode of the pipeline to generate the severity estimate for the respective bleeding episode by generating a frame-by-frame severity estimate for the adverse event episode and aggregating the frame-by-frame severity estimate(s).

In some embodiments, the server is configured to update the selected model for severity estimation using online training.

In some embodiments, the server is configured to generate reasoning data for the severity estimates of the pipeline.

In accordance with another aspect, there is provided a method of detecting and estimating the severity of an adverse event in a surgical intervention. The method comprises processing video data of surgical events to generate a pipeline of adverse event episodes, evaluating each adverse event episode of the pipeline to generate a severity estimate for the respective adverse event episode, and outputting data indicating the adverse event episodes and the corresponding severity estimates. Each adverse event episode comprises at least one video frame annotated as an adverse event.

In various further aspects, the disclosure provides corresponding systems and devices, and logic structures such as machine-executable coded instruction sets for implementing such systems, devices, and methods.

In this respect, before explaining at least one embodiment in detail, it is to be understood that the embodiments are not limited in application to the details of construction and to the arrangements of the components set forth in the following description or illustrated in the drawings. Also, it is to be understood that the phraseology and terminology employed herein are for the purpose of description and should not be regarded as limiting.

Many further features and combinations thereof concerning embodiments described herein will appear to those skilled in the art following a reading of the instant disclosure.

DESCRIPTION OF THE FIGURES

Embodiments will be described, by way of example only, with reference to the attached figures, wherein in the figures:

FIGS. 3, 3A, 3B, 3C and 3D illustrate a workflow diagram of a process for severity estimation in surgical videos according to some embodiments;

FIG. 8A illustrates, in a plot diagram, an example of a precision recall curve over all procedures in the test set for the MS-TCN-Focal-Uncertainty model, in accordance with some embodiments;

FIG. 8B illustrates, in a plot diagram, an example of an ROC curve over all procedures in the test set for the MS-TCN-Focal-Uncertainty model, in accordance with some embodiments;

FIG. 15 illustrates, in a plot diagram, an example of prediction plot comparison of models with different loss functions for all procedures in a test set, in accordance with some embodiments;

FIG. 21A and FIG. 21B are charts showing results for guided learning in relation to distractions and operating room sounds, according to some embodiments.

FIG. 22 is a chart showing results comparing a mean teacher approach as opposed to guided learning, according to some embodiments.

It is understood that throughout the description and figures, like features are identified by like reference numerals.

DETAILED DESCRIPTION

Figure 1:
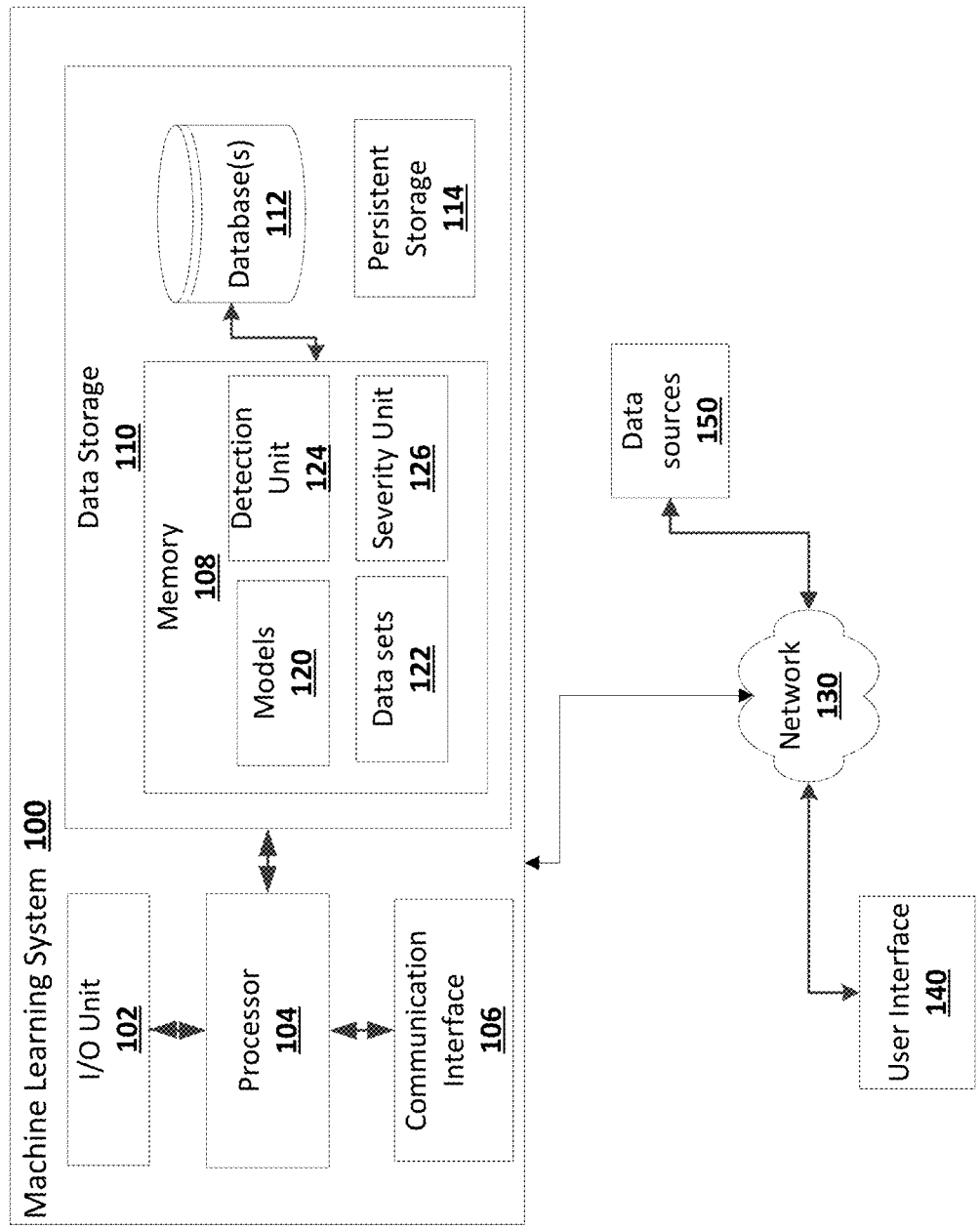
FIG. 1 illustrates a system for bleeding detection and severity estimation in surgical videos according to some embodiments.

It will be appreciated that numerous specific details are set forth in order to provide a thorough understanding of the exemplary embodiments described herein. Furthermore, this description is not to be considered as limiting the scope of the embodiments described herein in any way, but rather as merely describing implementation of the various example embodiments described herein.

Embodiments of methods, systems, and apparatus are described through reference to the drawings.

Adverse events occur in 3.7% of American hospital patients, and cause many deaths each year. The 12 estimated number of deaths from medical errors in the United States ranged from 98,000 to 400,000 deaths varying from report to report. Although a better system for more precise estimation is needed, the least number reported is scary enough to bring attention to adverse events. A major type of adverse events is surgical adverse events which accounts for 48% of all adverse events, and 70% of these surgical adverse events involve surgical errors [2]. More than half of the surgical errors are preventable by reducing human errors.

Laparoscopic procedures are minimally-invasive procedures performed by surgeons observing an internal view of a patient on a monitor with a video stream from the laparoscope. Nearly 15 million laparoscopic procedures were performed each year, indicating that many people are at risk of preventable adverse events in these procedures. Currently, surgeons must identify adverse events and report them in patient records. This relies on the memory of the operating staff, which may sometimes have biases. Providing automatic adverse event detection reduces the subjectivity of such reports, quickly generates accurate feedback to surgeons, and provides guidance in postoperative care.

More recent research adapted convolutional neural networks (CNNs) to bleeding detection, and showed a significant improvement on model performance. InceptionV3 pre-trained on ImageNet was used in previous work, and was compared to an InceptionV3 without pre-trained weights, a small CNN with 3 convolutional layers and 3 max-pooling layers, and an algorithm using handcrafted features. They showed that the small CNN had 12.7% increase in area under the ROC curve (AUC), and the InceptionV3 without ImageNet weights had an increase of 6.6% in AUC on top of that. The fine-tuned InceptionV3 had the best performance with another 8.7% increase, and achieved 0.991 in AUC. The best precision and recall is 0.919 and 0.872 respectively. No average precision (AP) and event-wise metrics is reported in these studies. The latter is helpful when a video contains several events, and one event dominates most of the frames.

In some embodiments, methods to detect two main surgical adverse events (bleeding and thermal injury) are provided.

Embodiments may provide a system, method, platform, device, and/or computer readable medium for monitoring patient activity in a surgical operating room (OR), intensive care unit, trauma room, emergency department, interventional suite, endoscopy suite, obstetrical suite, and/or medical or surgical ward, outpatient medical facility, clinical site, or healthcare training facility (simulation centres). These different example environments or settings may be referred to as an operating or clinical site.

Embodiments described herein may provide devices, systems, methods, and/or computer readable medium for adverse event detection and severity estimation in surgical videos. In some embodiments, the adverse event includes bleeding and/or thermal injury.

FIG. 1 illustrates, in a component diagram, and example of a system 100 for adverse event detection and severity estimation in surgical videos and/or surgical audio, in accordance with some embodiments. In a first embodiment, video only is utilized in relation to training system 100. In a second embodiment, audio only is utilized in relation to training system 100. In a third embodiment, both audio and video are utilized in relation to training system 100.

The system 100 implements deep learning software application to automatically detect adverse events in audio or video data, and can also estimate the severity of the adverse events based on objective classification systems. In some embodiments, the adverse event may comprise bleeding and/or thermal injury.

Audio data, for example, can be obtained from audio captured from array microphones (e.g., 8 channels), which can be beamformed at a microphone level. Video data can include camera data, which can be comprised of digital video frames where a number of digital images are displayed in rapid succession and provided at a particular rate (e.g., frames per second). The video data can be generated at various resolutions and filesizes.

The system 100 implements a process of automating the analysis of surgical video or audio recordings to detect and assess specific instances of bleeding and/or thermal injury, for example, among other types of events.

Previous approaches require manual human detection, which would require human labour to review surgical video recordings post-operatively to detect adverse events and evaluate them. This is labour intensive, cannot be done in real-time, and is prone to the traditional limitations (biases, inconsistencies between reviewers, time limitations, fatigue, etc.) that human-centric endeavours entail.

The system 100 implements a deep learning approach to identify or detect adverse events (such as bleeding and/or thermal injury) from a recording (e.g., video data), and can simultaneously estimate the severity of the adverse event. The approach can include specific technical improvements which were identified during testing to aid with technical issues that arose during practical implementation.

The system 100 can use pre-trained models and re-train the models with data from self-recorded videos to maximize the effectiveness of the deep learning algorithms to perform their bleeding detection and classification/estimation task. Furthermore, these models can be used in combination with an attention mechanism to visualize high-level adverse event features as a reasoning layer of bleeding and/or thermal injury detection and estimation.

An attention mechanism projects weights of a layer of trained model onto its corresponding input image, and the projection results in an attention map of the model's visual focus in the image. Therefore, assists in visualizing adverse event features and serves as a reasoning tool.

The system 100 implements a modular neural network system for severity estimation. Experimentally, in some examples, pre-trained detectors of detecting other features (e.g., colour detector) can be used with an attention mechanism to form a compositional neural network architecture with reasoning layers in the architecture. The reliability of this model can increase from traditional image classification and regression model. The system 100 can implement the process in real-time in some embodiments. The system 100 can implement the process post-operatively to laparoscopic video recordings in some embodiments.

The system 100 implements automatic detection of adverse events (bleeding and/or thermal injury) in patients, as opposed to requiring manual human labour to detect and estimate bleeding and/or thermal injury.

The system 100 implements deep learning algorithms to identify adverse events (e.g., bleeding and/or thermal injury) and can be used to generate outputs that estimate the bleeding and/or thermal event severity. The system 100 implements a novel modular architecture with reasoning layers to identify bleeding and estimate the bleeding and/or thermal injury severity. This model can be more reliable and explainable which is important in medicine.

The system 100 can provide a tool to pre-process laparoscopic videos for surgical safety analysis. The system 100 can process video almost instantaneously in some embodiments, as opposed to manual labour that has to watch the entire video to process the recording.

The system 100 implements an unbiased, objective process to identify adverse events (e.g., bleeding and/or thermal injury) and estimate its severity. The system 100 implements a real-time process to detect bleeding and/or thermal injury, and generates an alert notification when an adverse event (such as bleeding and/or thermal injury) occurs. The system 100 implements a real-time process to measure bleeding volume and velocity for severity estimations.

The system 100 implements a real-time process to quantify surgical technical performance based on the number of adverse event (e.g., bleeding and/or thermal injury) occurrences and severity of the events. Surgical performance data can be captured by platform 10 (such as described in relation to FIG. 9), for example.

The system 100 can generate predictions for post-surgical patient outcomes based on the machine observed adverse event conditions of the surgical operations. The post-surgical patient outcomes can be captured by platform 10 (such as described in relation to FIG. 9), for example. Platform 10 can system 100 can integrate to share and correlate data sets. The correlation can be based on a common timeline, for example.

The system 100 implements processes that involve surgical expertise and machine learning to process surgical recordings (e.g., laparoscopic, robotic, open) for generating recommendations for different types of quality improvement. The system 100 automates the processing of surgical recordings for alert and recommendation generation. The system 100 identifies a specific adverse event, such as bleeding and/or thermal injury, and simultaneously estimates the severity for analytical purposes and to gather data that can be used to improve surgery.

The system 100 trains deep learning algorithms to process surgical video for bleeding detection. This can involve pre-processing the videos, training neural network models, and comparing the performance of the neural network models. Multiple models are trained to identify the adverse event, and those with the best accuracy-to-speed balance are selected for use by system 100.

The system 100 can significantly reduce the time to review a laparoscopic video to review surgical safety, and perform other analytics of interest, on surgical videos. Even the most experienced analysts are subject to traditional human limitations that will negatively affect the quality of this work, and its potential to accurately draw valuable conclusions to guide future surgical performance. These include fatigue, inconsistencies between individuals, inconsistencies within single individuals, biases, honest errors that go uncorrected, among many others. Further, it is nearly impossible to review millions of surgeries with human forces, and therefore the potential to study and learn of deficiencies in operating rooms, is significantly limited. The system 100 efficiently and automatically perform the desired bleeding and/or thermal injury detection and severity estimation.

The system 100 can use different neural network models to complete the identification and estimation of bleeding and/or thermal injury events.

In some embodiments, the system 100 can use a non-neural-network methods to identify adverse events.

Examples include using image processing as feature extractor and/or using a statistical machine learning algorithm as a classifier and/or a regressor. For example, features can be extracted by feeding images to an image processing algorithm (e.g., image segmentation algorithm outlined by Otsu thresholding, texture segmentation, color segmentation, image enhancement histogram) that will segment out bleeding and/or thermal injury regions. A statistical machine learning algorithm (e.g., support vector machines, random forests, and conditional random fields) can be trained on features extracted from image processing algorithms and/or neural networks for adverse event identification and severity estimation.

Feature extraction can include, for audio segments, generating labelling categories. These categories can be established based on various criterion, such as ease of labelling, objectivity, clinical relevance, among others, and may further include approaches to exclude sounds that occur too often or are too common (e.g., oxygen saturation level device sounds).

Sounds can be converted into features related to, for example: alarm (e.g., device alarm sounds), cautery, cell phone/pager, door open/close, dropped instrument, packaging, harmonic, insufflation, Ligasure™, object dragging, loud distraction, operating room phone, stapler, suction, supply access, among others, and may be sorted into various categories, such as expected sounds (OR devices) and unexpected sounds (presumed distractions).

Pre-processing of audio data can be utilized to establish labels (which may be stored as metadata associated with specific features or sections of audio) as not all audio data may be associated with pre-generated labels. For example, some sounds can be labelled readily based on a correspondence with machine-based data (e.g., time synchronization against records collected from a blood pressure monitoring/alarm machine), while other sounds are not likely not labelled (e.g., sound of scalpel falling onto a tray). For these unlabelled sounds, the system 100 can some labelled positive and negative examples and used to automatically generate labels prior to provisioning the audio data for feature extraction.

Additional features can include data sets indicating a type of procedure being conducted, the types of tools in use or monitoring equipment available. These can be obtained, for example, from electronic health records or other data readily available at a data center of a healthcare facility. These features can be used for establishing baselines during training in relation to abnormal amounts of classified events and specific thresholds (e.g., a particular procedure may be more bloody than another, and procedures where there are required ablations may result in some necessary thermal injury).

In a variant embodiment, the system 100 is trained per sound as opposed to based on grouped sounds. Such an approach would increase training time, but could increase performance. In some embodiments, the audio segments are received as log mel spectrograms (instead of or in addition to raw waveforms), for example, at 64 magnitudes, (0 Hz-fs/2 Hz, or 0-22050 Hz), and having the following parameters 40 ms frames, 50% overlap. This approach provides frequency data and may provide a significant improvement over using raw waveform.

The system 100 can run in real-time or post-operatively. For example, the system 100 can run in real-time (as opposed to post-operatively) if desired to generate different measurements such as an estimate bleeding volume and velocity and/or thermal injury surface area and degree of intensity. The system 100 can implement aspects of a surgeon evaluation system and patient outcome analysis system.

In some embodiments, the system 100 can be used for robot assisted surgery to accurately identify a hemorrhage and/or burn during surgery. This could allow the robot to react accordingly in real-time.

In some embodiments, the system 100 can be used for education programs. The automatic detection of adverse events from surgery recordings can allow for the automatic identification of events of interest occurring in conjunction with the bleeding and/or thermal injury (e.g., improper use of a specific surgical device). Surgery review by these adverse event detection processes can be performed in real-time which can give surgical teams near-immediate feedback post-surgery while the surgery is fresh in their mind.

In some embodiments, the system 100 can have the ability to process and gather meaningful data from the operating room to allow for the development of sophisticated and valuable models to guide optimal surgical performance than would otherwise be possible. Adverse events, for example, are nearly always an undesired inevitability of surgery. Hence, bleeding and/or thermal injury data could be paired with other metrics acquired by a platform 10 as described in relation to FIG. 9 (for example, distractions in the OR), which could highlight undesired conduct of surgical teams that can be used for training/education purposes to improve practice.

The platform 100 connects to data sources 170 (including one or more cameras, for example) using network 130. Network 130 (or multiple networks) is capable of carrying data and can involve wired connections, wireless connections, or a combination thereof. Network 130 may involve different network communication technologies, standards and protocols, for example. User interface 140 application can display an interface of visual elements that can represent bleeding episodes and alerts, for example.

The visual elements can relate to features for severity estimation such as colour, texture, blood flow, blood velocity, blood volume, organ discoloration surface area, and so on. The visual elements can relate to data computed by the attention neural network layer. The visual elements can relate to reasoning data linked to the detected bleeding and/or thermal injury episodes, for example.

The platform 100 can include an I/O Unit 102, a processor 104, communication interface 106, and data storage 110. The processor 104 can execute instructions in memory 108 to implement aspects of processes described herein. The processor 104 can execute instructions in memory 108 to configure models 120, data sets 122, detection unit 124, severity unit 126, and other functions described herein. The platform 100 may be software (e.g., code segments compiled into machine code), hardware, embedded firmware, or a combination of software and hardware, according to various embodiments.

The detection unit 124 can process video data and/or other data (e.g., kinematic data) of surgical events to generate a pipeline of bleeding and/or thermal injury episodes. Each adverse event episode involves at least one video frame annotated as an adverse (e.g., bleeding and/or thermal injury) event. For example, multiple video frames showing bleeding and/or thermal injury events or regions of the same or different perspectives can all represent the same adverse event episode.

The severity unit 126 can evaluate each bleeding episode of the pipeline to generate a severity estimate for the respective adverse event episode. The severity unit 126 can generate the severity estimate by computing volume and velocity of blood flow for the bleeding episode, and/or the surface area and degree of intensity for the thermal injury episode. In some embodiments, the severity unit 126 is configured to evaluate each adverse event episode of the pipeline to generate the severity estimate for the respective adverse event episode by generating a frame-by-frame severity estimate for the frames tagged or annotated as adverse events for the adverse event episode. The severity unit 126 aggregates the frame-by-frame severity estimate(s) to generate an overall severity estimate for the adverse event episode.

The processor 104 can generate output data indicating the adverse event episodes and the corresponding severity estimates. An adverse event episode can be represented as a collection of video frames that are annotated as bleeding events along with the corresponding severity estimate.

The processor 104 can train one or more models 120 for adverse event detection or severity estimation. The models can be different types of neural networks, for example. The processor 104 can select an optimal model (of the models 120) for adverse event detection or severity estimation for deployment. The processor 104 can use the selected model for adverse event detection to process the video data and/or other data (e.g., kinematic data) of surgical events to generate the pipeline of adverse event episodes. The processor 104 can use the selected model for severity estimation to evaluate each adverse event episode of the pipeline to generate the severity estimates.

In some embodiments, the detection unit 124 is configured to train one or more models for adverse event detection. In some embodiments, the severity unit 126 is configured to train one or more models for severity estimation using images and results of adverse event detection to generate velocity estimates, volume estimates, surface area estimates, intensity estimates, and features. In some embodiments, the severity unit 126 is configured to train classification model for estimation of velocity of blood flow for the bleeding episode, and/or the intensity of thermal injury for the thermal injury episode. In some embodiments, the severity unit 126 is configured to train a volume regression model for estimation of volume of blood flow for the bleeding episode. In some embodiments, the severity unit 126 is configured to train a surface area regression model for estimation of surface area of thermal injury for the thermal injury episode.

In some embodiments, the processor 104 is configured to update the model 120 for adverse event detection or severity estimation using online training.

In some embodiments, the processor 104 is configured to data sample for the video data in order to generate a balanced data set for adverse event detection and severity estimation. This can generate different data sets 122 such as training, validation and test data sets. The validation and test data sets can be the initial (non-sampled) data. The training data set can be the sampled (balanced) data. For example, the processor 104 is configured to oversample adverse event frames of the video data or undersample non-adverse event frames of the video data. For example, the processor 104 is configured to oversample high severity frames of the video data or undersample low severity frames of the video data.

In some embodiments, the detection unit 124 is configured to use an attention mechanism to track an adverse event episode over a plurality of video frames, each of the plurality of video frames having an identified adverse event region. In some embodiments, the detection unit 124 is configured to integrate the attention neural network layer to eliminate duplicate adverse event episodes and aggregate as the adverse event episode.

In some embodiments, the detection unit 124 is configured to generate visual elements representing the adverse event episodes of the pipeline. In some embodiments, the severity unit 126 is configured to generate visual elements representing the severity estimates for the adverse event episodes of the pipeline. The visual elements can be used for user interface 140.

In some embodiments, the processor 104 is configured to generate reasoning data and knowledge base for the adverse event episodes of the pipeline using a modular or compositional neural network. In some embodiments, the server is configured to generate reasoning data for the severity estimates of the pipeline.

The I/O unit 102 can enable the platform 100 to interconnect with one or more input devices, such as a keyboard, mouse, camera, touch screen and a microphone, and/or with one or more output devices such as a display screen and a speaker.

The processor 104 can be, for example, microprocessors or microcontrollers, a digital signal processing (DSP) processor, an integrated circuit, a field programmable gate array (FPGA), a reconfigurable processor, or combinations thereof.

Memory 108 may include a suitable combination of computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Data storage devices 110 can include memory 108, databases 112 (e.g., graph database), and persistent storage 114.

The communication interface 106 can enable the platform 100 to communicate with other components, to exchange data with other components, to access and connect to network resources, to serve applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. WMAX), SS7 signaling network, fixed line, local area network, wide area network, and others, including any combination of these.

The platform 100 can be operable to register and authenticate users (using a login, unique identifier, and password for example) prior to providing access to applications, a local network, network resources, other networks and network security devices. The platform 100 can connect to different machines or entities (e.g., data sources 150).

The data storage 110 may be configured to store information associated with or created by the platform 100. The data storage 110 can store raw video data, data samples, marked adverse event frames, adverse event and severity estimates, and so on. The data storage 110 can implement databases, for example. Storage 110 and/or persistent storage 114 may be provided using various types of storage technologies, such as solid state drives, hard disk drives, flash memory, and may be stored in various formats, such as relational databases, non-relational databases, flat files, spreadsheets, extended markup files, and so on.

Bleeding

Figure 2:
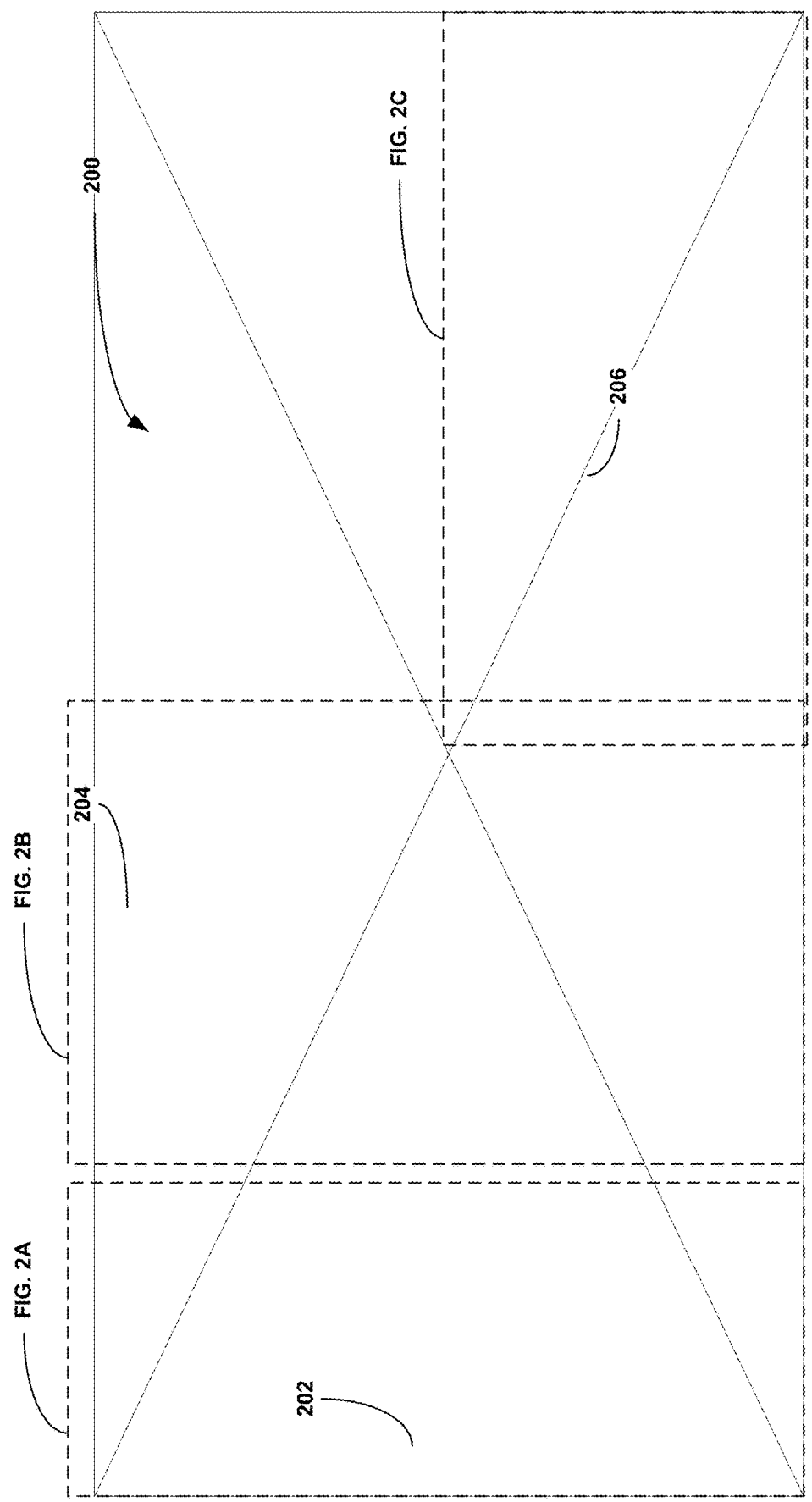
FIGS. 2, 2A, 2B and 2C illustrate a workflow diagram of a process for bleeding detection and severity estimation in surgical videos according to some embodiments.
Figure 2A:
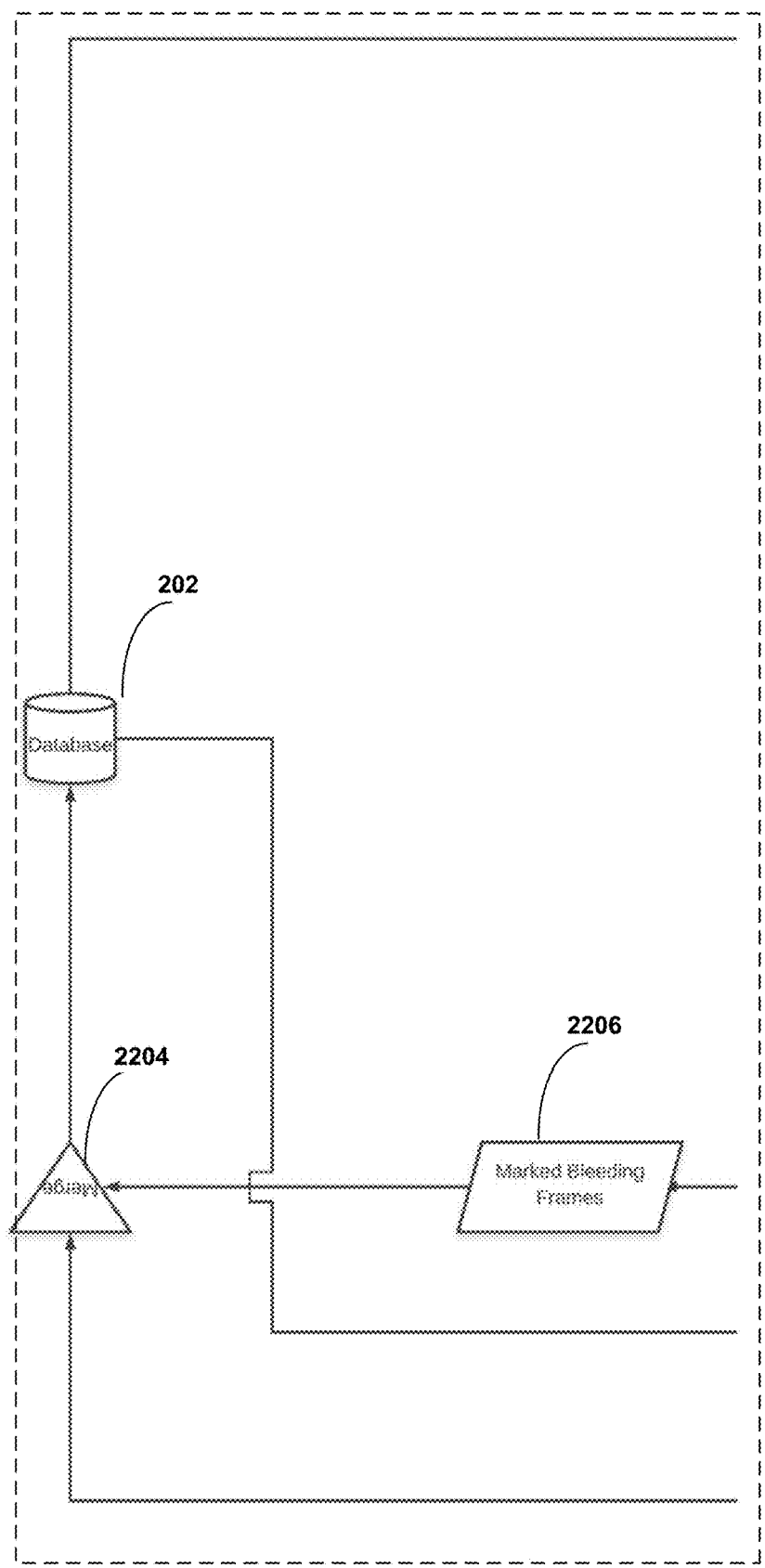
Figure 2B:
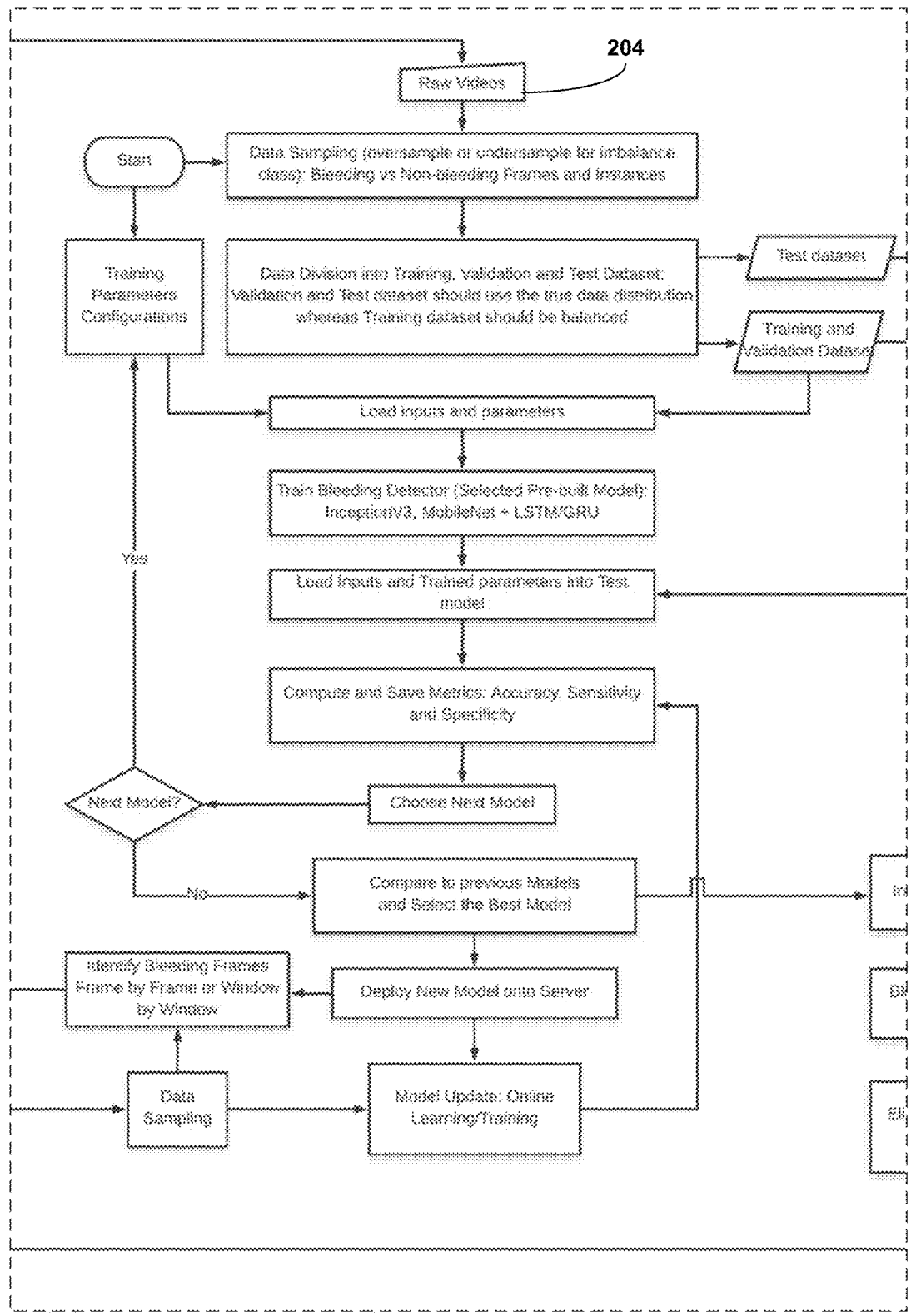
Figure 2C:
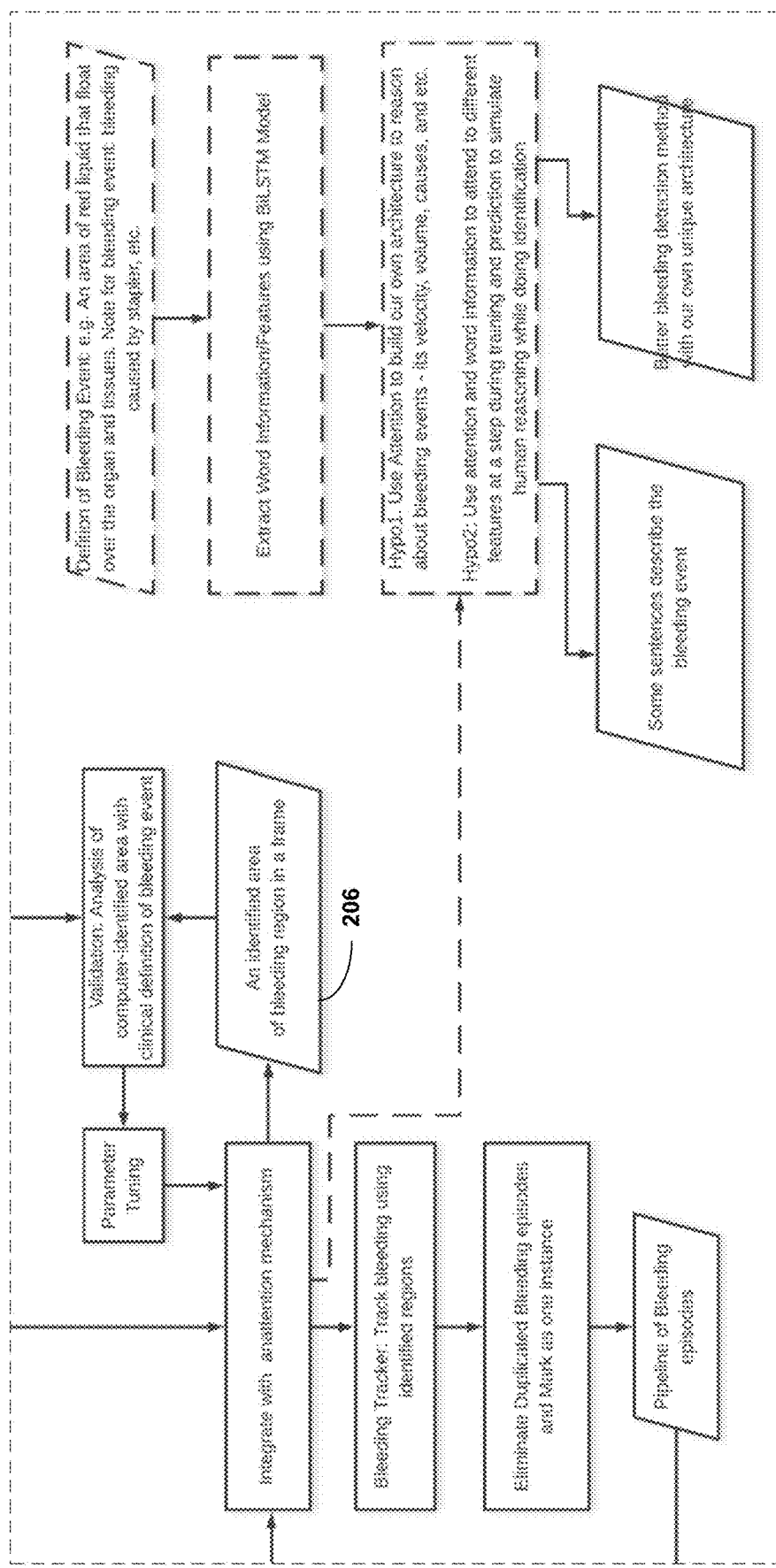
Figure 3A:
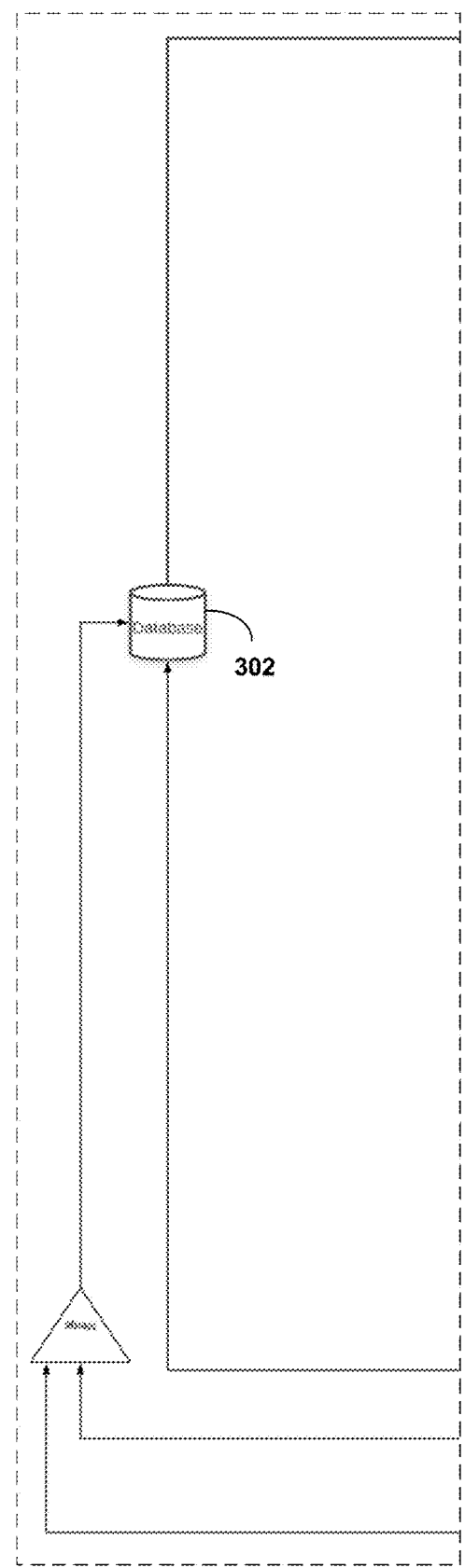
Figure 3B:
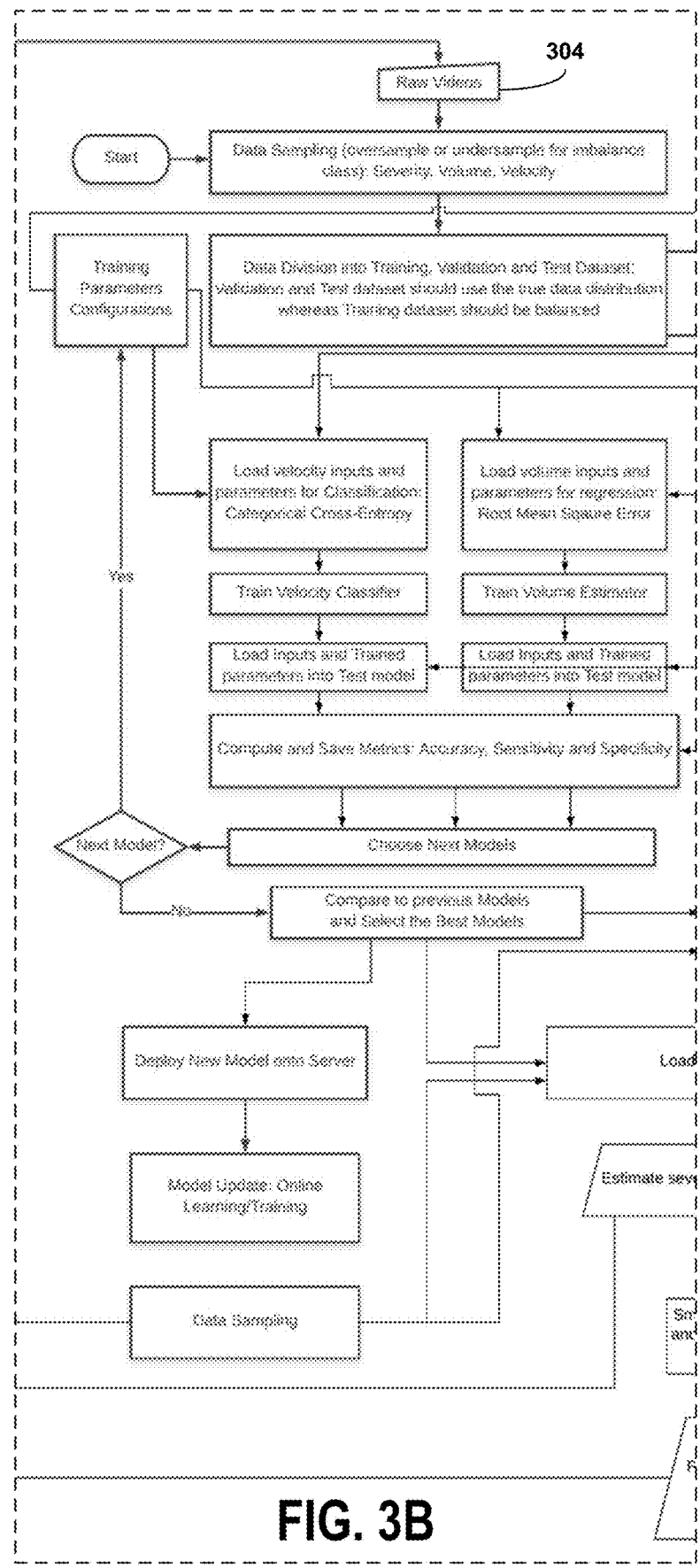
Figure 3C:
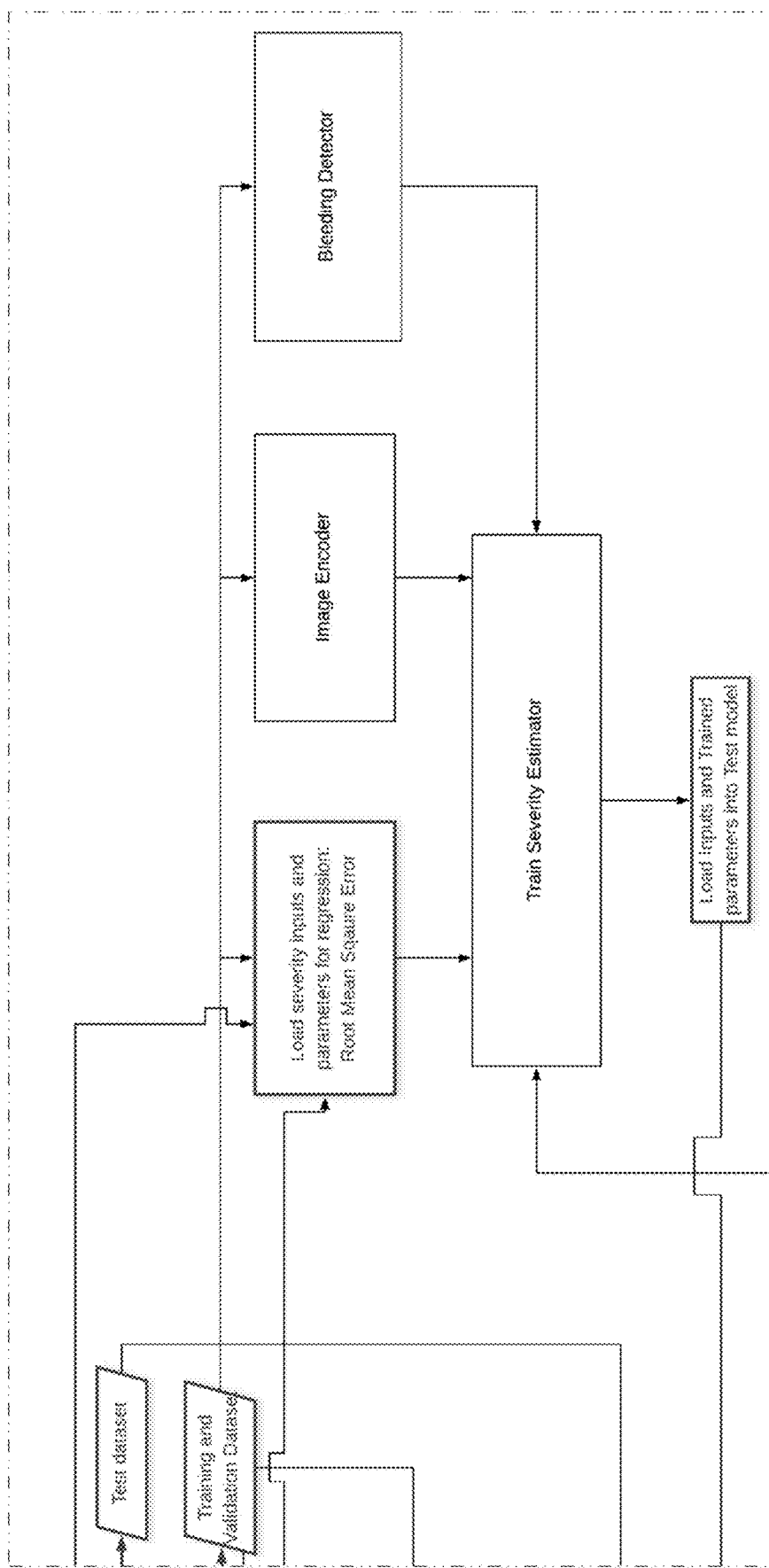
Figure 3D:
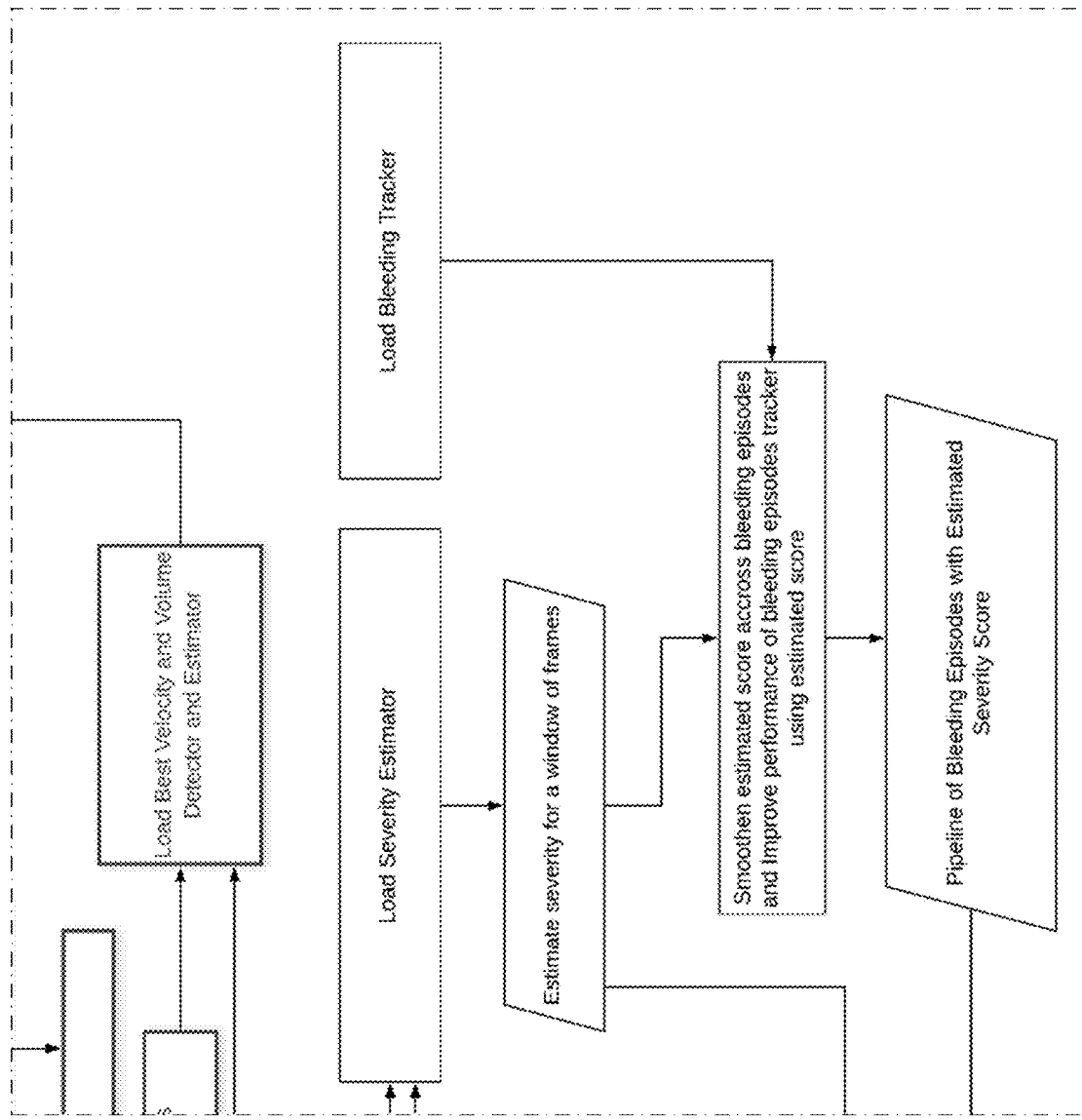

FIG. 2 illustrates a workflow diagram of a process for bleeding detection and severity estimation in surgical videos according to some embodiments. FIGS. 2A to 2C illustrate marked sections of FIG. 2.

In some embodiments, the bleeding detection process 200 can use one-hot encoding and categorical cross-entropy with Adam optimizer. The process 200 can use softmax to choose the best probability as an output class.

The process 200 can start by processing raw video data 204 that can be stored in a database 202. Accordingly, the process 200 implement data processing on the raw video data 204.

The process 200 implements data sampling. This can involve oversampling or under sampling for imbalanced data classes. For example, the bleeding and non-bleeding video data can imbalanced. There can be more non-bleeding clips or frames than bleeding clips or frames in the video data 204. Therefore, in this case, the process 200 can undersample non-bleeding data to balance the training dataset.

The process 200 implements data division into training and validation data sets and test data sets. The validation and test data sets can use the true data distribution where is the training data set can use the balanced data distribution.

The process 200 sets training parameters and configurations. For model selection, the process 200 loads as input into the different models the configurations, parameters, and the training and validation data sets.

For example, different models can be trained for bleeding detection with different configurations. The process can select a model to train. The process 200 can train one or more bleeding detector models. These can be selected pre-built models for example. The process 200 can load as input the trained parameters into one or more test models, along with the test data set. The process 200 can compute and save metrics that can indicate accuracy, sensitivity, specificity, and so on. The process 200 can then choose the next model for training if there is another model left to train. If the process 200 has trained all the models, then the process 200 compares the models and selects the best model.

Example models may include a convolutional neural network (CNN) and/or a recurrent neural network (RNN) that can be separately trained and/or end-to-end trained. The recurrent neural network may take a layer output of the CNN as feature inputs. Example, CNNs include MobileNet and InceptionV3. Example RNNs include long short-term memory (LSTM) and gated recurrent units (GRU).

Example combinations include MobileNet and LSTM that can be separately trained, MobileNet and GRU that can be separately trained, MobileNet and LSTM that can be end-to-end trained, MobileNet and LSTM that can be end-to-end trained, InceptionV3 and LSTM that can be separately trained, InceptionV3 and GRU that can be separately trained, InceptionV3 and LSTM that can be end-to-end trained, InceptionV3 and GRU that can be end-to-end trained, and so on. Each model can be trained with a segment of the video data where each segment is one training sample 204. The best length of the segment that best suits the training is selected. These are example models for illustrative purposes and other models can be used.

With respect to segmentation methods, models such as fast region CNN (RCNN) (Fast-RCNN) and Mask RCNN may be used to segment specific bleeding regions in surgical videos. Fine-tuned Mask RCNN draws boundaries along the bleeding regions given predicted positive frames.

Partially supervised methods may be limited by the amount of data collected/annotated. The partially supervised methods, such as synthetic data, movement prediction, and colorization, may be used to address bleeding detection problem.

With respect to synthetic data, surgical videos may be synthesized using networks such as generative adversarial network (GANs). This allows for the generation of data with enough diversity to train the models. With respect to movement prediction, existing unlabeled data and models may be used to predict future movements of objects (including bleeding) in the scene. This allows for the identification of unexpected bleeding. With respect to colorization, structure features may be extracted from neural network architecture with the ability to recolor a grey-level scene. This will provide the ability to identify unique objects in the scene. These features are then fed into a neural network for bleeding detection.

The process 200 integrates the selected model with an attention mechanism, along with the training and validation data sets.

The process 200 integrates the attention mechanism to track and visualize bleeding episodes. For example, an attention neural network can be applied to visualize bleeding episode in a detected bleeding frame. The tracking technique can be applied to convert frame-by-frame bleeding detection into a pipeline of distinct bleeding episodes. The process 200 can generate an identified area bleeding region 206 in a frame.

The process 200 can validate the identified region 206 by an analysis of the computer identified region 206 with clinical definition of a bleeding event. The process 200 can implement the validation it using the test data set, for example. The process 200 can use the output of the validation step for parameter tuning which can be used as input for the attention neural network layer. Visualization can be generated in this case by viewing the weights produced by the attention distribution of the neural network. The visual elements can indicate the weights produced by the attention distribution of the neural network.

The process 200 uses the attention neural network layer to implement a bleeding tracker to track bleeding using identified regions 206. The process 200 eliminates duplicated bleeding episodes and marks the bleeding episodes as one instance. The process 200 generates the pipeline of distinct bleeding episodes. The process 200 merges the pipeline of distinct bleeding episodes with data stored in the database 202.

The process 200 implements a production stage. The process 200 deploys the selected model on a server. The process 200 converts the selected model into a graph. The process 200 extracts data from the database and feed into the selected model to do bleeding detection. The process 200 deploys the model in a way that online training is allowed.

Deployment can involve uploading the model to the server and loading frames into the model and detecting potential inference errors such as missing frames, random interrupt, and so on. The online training is onboard and the model can be uploaded into the server.

The process 200 identifies bleeding frames frame by frame or window by window to generate marked leading frames. This can involve data sampling of the data in the database 202. The process 200 merges the marked leading frames with data stored in the database 202. The process 200 implements a model update for online learning or training. This can involve data sampling of the data in the database 202.

The process 200 can generate a definition of a bleeding event. For example, the definition of a bleeding event can be an area of red liquid that floats over an organ and tissues. The process 200 can generate metadata for bleeding events to add descriptive notes about the bleeding event. The process 200 can extract data and features from a bleeding event using a model, for example (e.g., a bidirectional LSTM (BiLSTM) model).

The process 200 implements online training or learning. The process 200 can select data for active learning. The process 200 implements weight updates to models on the server using the selected data. In some embodiments, the process 200 compares the model to previous model performance and decides whether to update the model or not.

The process 200 can generate reasoning output for each detected bleeding episode. The process 200 can use a modular or compositional neural network to do step reasoning by focusing on different features at a step guiding by the notes given for the bleeding episode (e.g., extreme bleeding, bleeding caused by staplers).

For example, the process can use an attention neural network layer to generate reasoning output about leading events that can be stored as metadata. This can include velocity, volume, causes, and so on. The reasoning data can be generated by platform 10 described in relation to FIG. 9, for example. The reasoning data can be linked to bleeding episodes using time data, for example.

The process 200 can use an attention mechanism and word data to attend to different features during training and prediction to simulate human reasoning while implementing identification of the bleeding events. For example the word data can describe the bleeding event. The word data can be clinical data.

The process 200 can use offline or online training to select the best models for bleeding detection. The process 200 can use the selected model for real-time bleeding detection. The process 200 can generate a prediction if a frame is classified as bleeding or non-bleeding event. The process 200 can annotate the frame with the prediction output (bleeding or non-bleeding event). A camera internal to a patient can generate the video data for processing by the selected model, for example. The detected bleeding events (e.g., frame annotated as a bleeding event) can be linked to a time interval and area of bleeding, along with other attributes or features. The process 200 can aggregate detected bleeding events to define a bleeding episode. A time feature can be a factor used for aggregation, however, just because two frames for bleeding events are consecutive or proximate in time does not mean that the bleeding events are part of the same bleeding episode. The two frames may indicate two bleeding episodes. Different bleeding features are used to aggregate the bleeding events to define bleeding episodes. The process 200 can use an attention neural network to define the bleeding episodes. Further, the camera perspective can also be changing so when a first bleeding event comes back into view then need to track this as the same bleeding event and not a new bleeding event, for example.

FIG. 3 illustrates a workflow diagram of a process 300 for severity estimation in surgical videos, in accordance with some embodiments. FIGS. 3A to 3D illustrate marked sections of FIG. 3. The process 300 uses raw video 304 data from database 302 to generate severity estimations.

The process 300 implements data sampling to balance the raw video 304 data the data sampling can involve oversampling and/or undersampling for imbalanced classes such as severity, volume, velocity, and so on.

The severity data can be highly imbalanced. Volume and velocity of the blood flow are estimated by analysts and the severity is estimated based on these two factors. Severity can be classified into 5 categories as shown in the severity matrix below. The raw video 304 data can have significantly more level 1 and 2 bleeding episodes than other leading episodes. Therefore, oversampling is performed on level 3-5 bleeding episodes and undersampling is performed on level 1-2 to a different degree. Accordingly, the process 300 can oversample video data for fewer bleeding episodes of a particular class and can undersample video data for a larger number of bleeding episodes of another class.

Severity Matrix
1—LOW VOLUME, LOW VELOCITY
2—LOW VOLUME, HIGH VELOCITY
3—MEDIUM VOLUME, ANY VELOCITY
4—HIGH VOLUME, LOW VELOCITY
5—HIGH VOLUME, HIGH VELOCITY Process 300 divides the data into a trained data set, a validation data set, and a test data set. The validation data set and the test data set can use the true data distribution from the raw video 304 data. The training data set can use the balanced data that results from the data sampling step.

The process 300 uses a novel architecture structure for severity estimation. Multiple models are trained and form a new modular architecture for severity estimation.

The process 300 trains a classification model for estimation of velocity. The process 300 trains volume regression model for estimation of volume. The velocity and volume estimations or metrics are used to generate the severity estimation.

The process 300 implements sub-metrics model training. The best model construction from bleeding detection is selected as the basis for each training. The best trained models are selected for the next step.

The process 300 trains a classification model for estimation of velocity. The process 300 loads training parameters and configurations for velocity classification. The process can implement classification categorically cross-entropy. The process 300 trains the velocity classifier. The process 300 loads inputs and the train parameters into a test model along with the test data set. The process 300 computes and saves velocity metrics for accuracy, sensitivity, and specificity. The process then chooses the next model and repeats the training for velocity.

The process 300 trains a volume regression model for estimation of volume. The process 300 loads of volume in pits and parameters for regression along with the training data set and the validation data set. The process 300 can compute regression using a root mean square error. The process trains the volume estimator. The process 300 loads inputs and train parameters into the test model, along with the test data set. The process 300 computes and saves volume metrics for accuracy, sensitivity, and specificity, and then may process the next model and repeat the training for volume.

If there are no further models for training in relation to velocity or volume, then the process 300 compares the previous models and selects the best models. The best trained models can be selected based on accuracy or F1 score (confidence score based on true negative rate and true positive rate), for example.

For the severity model training, images and results of bleeding detection are fed into the two models (velocity and volume) respectively. The estimated velocity, volume, and their features and an encoded image can be fed into a new model construction (potentially the best construction from bleeding detection) and this model can be trained based on these data. Features can be extracted from trained velocity model and trained volume model (e.g., one of the layers of the neural network).

A new trained model can be may be based on a different pre-trained model. This new model can be a different one from the velocity, volume and image encoder models. This new model can take inputs from different features e.g., estimated velocity, estimated volume, velocity features (e.g., optical flow or CNN features), volume features, and encoded image (e.g., CNN features) and output the final result as a severity estimation.

The process 300 loads the best velocity and volume detector and estimator for training the severity estimator. The process 300 uses the selected model and data sampling for training the severity estimator. The process trains the severity estimator by loading severity inputs and parameters for regression.

The process 300 can compute regression using the root mean square error. The process 300 trains the severity estimator using output from an imaging coder and the output from the bleeding detector (frames of detected bleeding episodes, for example). The process 300 loads the inputs and the train parameters from the trained severity estimator into the test model in order to compute and save the metrics for velocity and volume (accuracy, sensitivity and specificity).

The process 300 evaluates bleeding episodes. The process 300 uses the pipeline of bleeding episodes and frame-by-frame estimated severity score to generate a severity estimate for each bleeding episode.

The process 300 uses the selected model and data sampling to load the severity estimator. The process 300 estimates for severity for a window of frames that relate to bleeding episodes. That is, the process 300 generates frame-by-frame estimated severity scores. The process 300 loads the bleeding tracker. The process 300 smoothens the estimated scores for frames across bleeding episodes (which can be composed of multiple frames). The process 300 improves performance of the bleeding episodes tracker using the estimated score.

The process 300 outputs a pipeline of bleeding episodes that are linked to estimated severity scores. The output can be saved in the database 302.

For production, the process 300 deploys the selected model onto the server. The process 300 converts the selected model into a graph. An application can convert the model to a graph data format. This can allow process 300 to deploy the model into the server for production in a smaller size. It can contain multiple graphs (resulting from different training) into one file and do inference on different tasks with just one file. Models can be very large in the training process. In production, training parameters might not be needed anymore. The process 300 extracts data from the database 302 and feeds the data into the selected model to compute the severity estimation. The model can be deployed in a way that online training is allowed. As noted, the process 300 compares the previous models and selects the best model. The process 300 deploys the selected model onto the server. The model is updated using online learning and training. The sampled data can be used for online training. The weight can be updated in models on the server. The weight update can be like another new training however based on previous trained weights. The model can contain weights from offline training, and the online training can update the weights by training on new data. Once this is done, the model will be fed into the comparison algorithm to select the best model. If this model is identified to be better than the others, than this one will be deployed to the server to replace the former one. The process 300 can compare to previous model performance and decide whether to update or not. This can be fed back to the model selection algorithm, which can select a model based on accuracy, loss, and F1 scores. The selection can be based on either a new loss function or a confidence score that implements a weighted average on those metrics, for example.

The process 300 can generate reasoning data to provide reasoning behind the severity assignment of each bleeding episode and generate clinical notes for each bleeding episode. A modular or compositional neural network could be used to do step reasoning by focusing on different features at a step guiding by the notes given for the bleeding episode (e.g., extreme bleeding, bleeding caused by staplers and etc.). Velocity features, volume features, and severity features plus notes for each bleeding episode can be used to train a model to construct clinical notes for each bleeding episode without human assistance.

Figure 9:
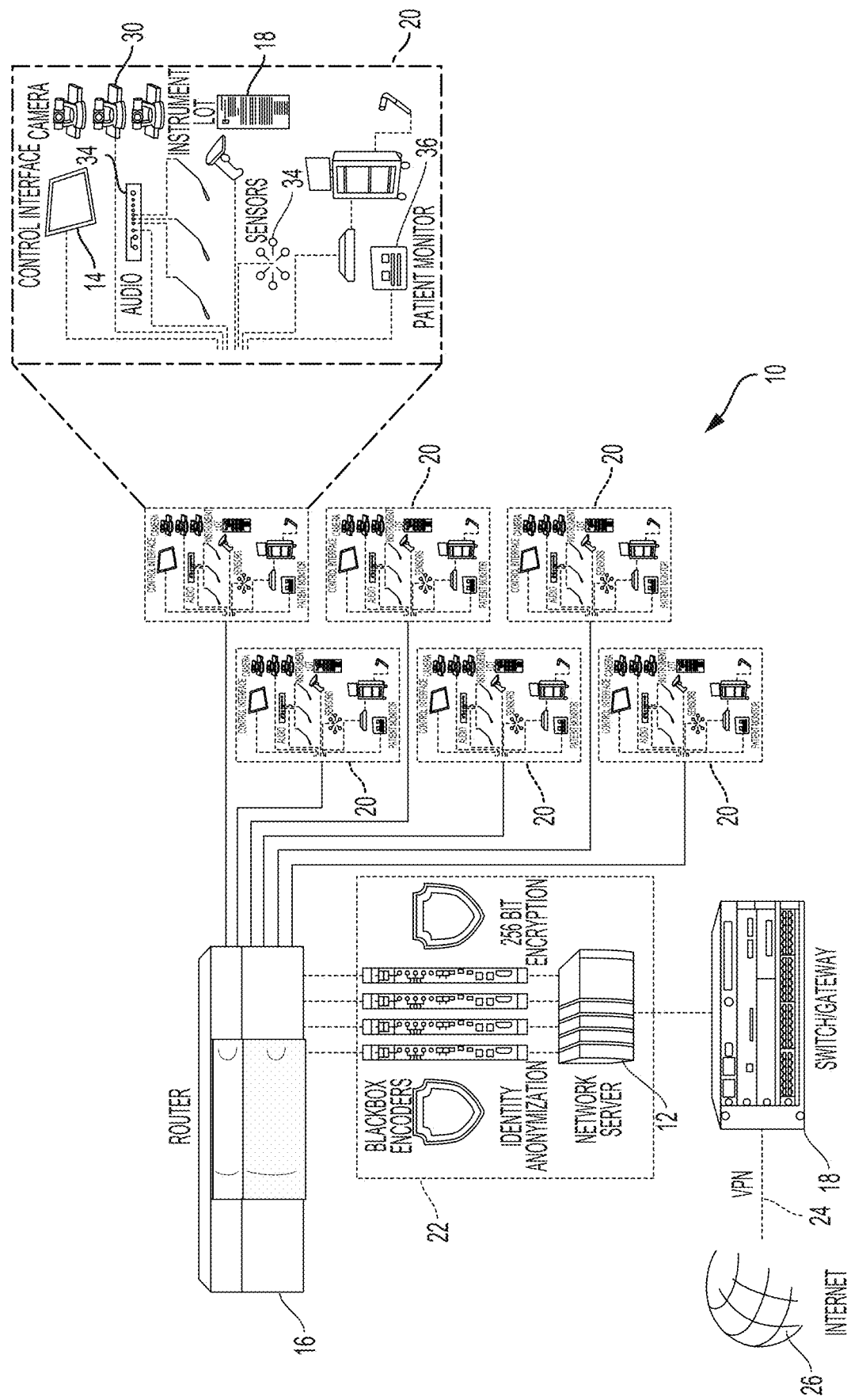
FIG. 9 illustrates a schematic of an architectural platform for data collection in a live OR setting or patient intervention area, in accordance with some embodiments.

The reasoning data can be from platform 100 (as described in FIG. 9, for example). The reasoning data can also be based on other database like clinical ontology (e.g., database that has descriptive context of a clinical term) for image retrieval. The reasoning data can add contextual data to the bleeding detection and severity estimation data: e.g., detected colour, flow of blood with a speed of 5 ml/s (or more), volume gets to 100 ml at time 100, therefore it is a bleeding event and has a severe level of 3. This can be achieved by detection based on related features (colour, texture, blood, flow, speed, volume and so on). This reasoning step is as an additional step to the attention layer (i.e., visualizing the focus of the neural network during inference).

The severity estimation process 300 can use root-mean-square-error with Adam optimizer for the regression model. The output can be any float number from 0 to 5, for example. The output can be rounded up to the closest severity category using the example severity matrix. Other values and severity classes can be used and the matrix is an example only.

Thermal Injury

In some embodiments, a solution is provided using a deep learning algorithm and computer vision technology to provide an end-to-end thermal injury detection system. The workflow of the solution is considered as data pre-processing, convolutional neural network (CNN) feature extraction, and recurrent neural network (RNN) classification. The surgical video data is first decoded into frames, along with data augmentation techniques such as randomly flipping and rotation to get auxiliary data. The frames are then packed as a sequence to restore the time sequential information of the original video. The system uses a CNN to extract key features from sequences of frames. The extracted features are then taken as the input of the RNN, to learn the time sequential information of the videos. With the convolutional neural network and recurrent neural network structure, the model can learn the features of thermal injury and detect thermal injury automatically in one pass. Both CNN and RNN are trained separately at first, and eventually the system is trained jointly to provide an end-to-end thermal injury detection solution. Implementation of this technology will allow for an objective tool to detect thermal injuries, which can be applied to an unlimited number of surgical procedure videos to gain greater insight than would otherwise be possible with the limitations of using human analysts.

In some embodiments, a thermal injury detection model may be trained with self-recorded internal surgical data (video) that has been manually labelled in-house, for which there are no pre-trained models or parameters. This training data is cleaned and curated specific to the thermal injury detection task before the training process. A variety of models and architectures are evaluated that balance speed with accuracy, specificity and sensitivity.

A thermal injury detection workflow may comprise data processing, supervised methods, segmentation methods, multi-task learning, partially supervised methods, tracking and visualizing episodes, production, and optionally online training/learning.

With respect to data processing, videos may be cropped into clips to fit the size of the computer memory. For example, each clip may include 18 frames that cover 3 seconds of video data. Cropped clips may be labelled as active thermal injury (injury is happening), passive thermal injury (injury happened but still in view) and negative (non-injury). Negative data are randomly sampled from the whole video and undersampled to balance the training dataset.

With respect to stabilization, the surgical videos may be stabilized using traditional methods such as optical flow and/or convolutional neural network.

Several supervised methods may be used, including CNN (e.g., InceptionV3), RNN (e.g., LSTM, GRU), and 3D convolutional network (3DCNN) (e.g., I3D). CNN, 3DCNN, and optical flow (e.g., FlowNet2.0) can also act as a feature extractor. For example, the following supervised methods may be used: InceptionV3 and LSTM structure, FlownNet2.0 and ResNet50 structure, linear Regression, and other model configurations. With respect to InceptionV3 and LSTM structure, InceptionV3 may be pre-trained on ImageNet and fine-tuned on a dataset. An LSTM may be trained from scratch with hidden layers and hidden units at each layer (for example, 3 hidden layers and 18 hidden units at each layer). InceptionV3 and LSTM are trained separately. With respect to FlownNet2.0 and ResNet50 structure, optical flows obtained from pre-trained FlowNet2.0 are stacked together and used to train ResNet50. FlowNet2.0 and ResNet50 are trained separately. With respect to Linear Regression, a regressor may be trained on top of two structures to get the final score. Other model configurations may be used such as InceptionV3 and GRU, 3DCNN, I3D, etc.

With respect to segmentation methods, models such as fast region CNN (RCNN) (Fast-RCNN) and Mask RCNN may be used to segment specific thermal injury region in surgical videos. Fine-tuned Mask RCNN draws boundaries along the thermal injury region given predicted positive frames.

With respect to multi-task learning, final prediction results may be based on multiple classification tasks. Tasks include types of thermal injury (active, passive or negative), types of organs which the injury is happening on, severity score of thermal injuries. All tasks share the same low level convolutional neural networks and the same weights, while have separate dense layers on top of CNN.

With respect to motion capture, optical flow is used to capture the general motion for pixels in two consecutive images, in order to eliminate the loss of information due to video down sampling with a low frame rate. Optical flow is obtained from FlowNet2.0 and then stacked into a feature vector. Model with a Resnet 101 backbone is used to do classification given the optical flow vector.

Partially supervised methods may be limited by the amount of data collected/annotated. The partially supervised methods, such as synthetic data, movement prediction, and colorization, may be used to address thermal injury detection problem. With respect to synthetic data, surgical videos may be synthesized using networks such as generative adversarial network (GANs). This allows for the generation of data with enough diversity to train the models. With respect to movement prediction, existing unlabeled data and models may be used to predict future movements of objects (including thermal injury) in the scene. This allows for the identification of unexpected thermal injuries. With respect to colorization, structure features may be extracted from neural network architecture with the ability to recolor a grey-level scene. This will provide the ability to identify unique objects in the scene. These features are then fed into a neural network for thermal injury detection.

With respect to tracking and Visualizing thermal injury episodes, attention neural network with Class Activate Mapping may be applied to visualize injury region in a detected injury frame. A tracking technique may also be applied to convert frame-by-frame thermal injury detection into a pipeline of distinct thermal injury episodes.

With respect to production, the selected model may be deployed onto a server. The selected model may be converted into a graph. Data may be extracted from the database and feed into the selected model to perform thermal injury detection. In some embodiments, the model may be deployed in a way that online training is allowed.

With respect to online training/learning, sample data may be used for online training. Weight updates may be performed in models on the server. Data may be updated based on a comparison to previous model performance.

In some embodiments, the thermal injury detection process can use one-hot encoding and categorical cross-entropy with stochastic gradient descent (SGD) optimizer. The process can use the softmax function to choose the best probability as an output class.

In some embodiments, the solution automates thermal injury detection that otherwise would require manual labour to perform, which is time consuming and cannot provide frame-wise accuracy. Far more surgical procedures can be analyzed with such technology, compared to the number that can be analyzed when relying on human analysts, which would therefore allow for greater insights to be derived. The more that is learned about the intricacies of surgery, the more methods can be derived to improve surgical practices. Further, human analysts have several biases and limitations (e.g., fatigue, variability between analysts, variability in experience, susceptibility to distraction, etc.) that are not found when applying a singular, consistent technology to perform the same task. This would help ensure greater quality of the data that is derived from the surgical recordings.

The convolutional neural network and recurrent neural network are modular models in the thermal injury detection system, which can be trained and retrained separately with auxiliary video data. Because of the modular design of the system, each network can be updated by other state-of-the-art deep learning models. Alternative parameters may be used to perform more effective and efficient thermal injury detection tasks. With the advance of the hardware support, a thermal injury detection system can be applied in real-time to live surgeries to provide instant feedback. The results of thermal injury detection can be used as input of other surgical analytical tasks, and the thermal injury detection system can be expanded with other surgical analytical projects such as intra-operative detection and surgeon skill evaluation.

In some embodiments, a thermal injury detection system may be used by an expert analyst. For this stakeholder, the technology serves the purpose of automatically identifying thermal injury, which are indicative of critical situations. Applying this technology to millions of cases, far beyond the capabilities of manual labour, could reveal a correlation between thermal injury and mortality. This could be used to develop methods to provide real-time feedback to surgical teams.

In some embodiments, a thermal injury detection system may be used in a robotic setting. In a robot assisted surgery, this technology could be leveraged to accurately identify thermal injury during surgery, which would allow the robot to react accordingly.

In some embodiments, a thermal injury detection system may be used in education programs. The automatic detection of thermal injury and/or other events of interest by this solution from surgical recordings would allow for far greater quantities of data to be gathered than would be possible by manual means. Studying this data in conjunction with adverse events could reveal detrimental patterns and trends in surgical performance that could be addressed by surgical training programs. Further, given that this technology could be applied to Black Box recordings in real-time, it could allow for surgical teams to receive near-immediate feedback post-surgery while the procedure is fresh in their mind.

Combined Bleeding and Thermal Injury

Compared to WCE, laparoscopic videos have larger fields of view, more depth and luminance variation, more camera motion, and more features in temporal domain. The maximum storage of WCE is 50,000 images taken at 2 frames per second (fps) over the course of 8 to 72 hours, whereas one laparoscopic video lasts about 1.5 hours, which contains around 160,000 frames at 30 fps, and is captured from the incision to the closure of the incision of an operation. Another challenge of laparoscopic videos is the camera motion, especially quick panning. In WCE event detection, the camera movement inside the digestive tract is small compared to a laparoscope in the abdomen. It is expected that the dynamic movement of the camera will cause false predictions in laparoscopic event detection. In most diagnosis in WCE, spatial features alone are sufficient for bleeding detection because a bleeding event may have occur for a while that detecting it in the scene is equivalent to detecting blood. In laparoscopic procedures, bleeding events need to be identified while it is happening, and they occur commonly, and leave stained tissues, blood residue, and blood clots in the scene after rectification. These can be confused with an active bleeding event which is not the case for most diagnosis in WCE. The same can be said to thermal injury detection. Detecting an active thermal injury event where the device is acting on a tissue can be confused with a leftover burn mark. To distinguish the active events, each frame was labelled according to occurring visual cues such as 1) blood: when blood clots or blood residue are visible in the scene, 2) burn: when a discolouration of tissues (burn mark) is visible, 3) bleeding: when blood is flowing out of a wound, and 4) thermal injury: when a thermal device is causing damages to tissues. Herein, the spatial and temporal features of the four categories are considered, and the aforementioned issues are addressed by constructing a deep learning multi-task system that reduces camera motion, utilizes temporal features, and cover the full temporal resolution of a laparoscopic video. The performance of the model was tested and evaluated using both frame-wise and event-wise metrics.

Figure 4A:
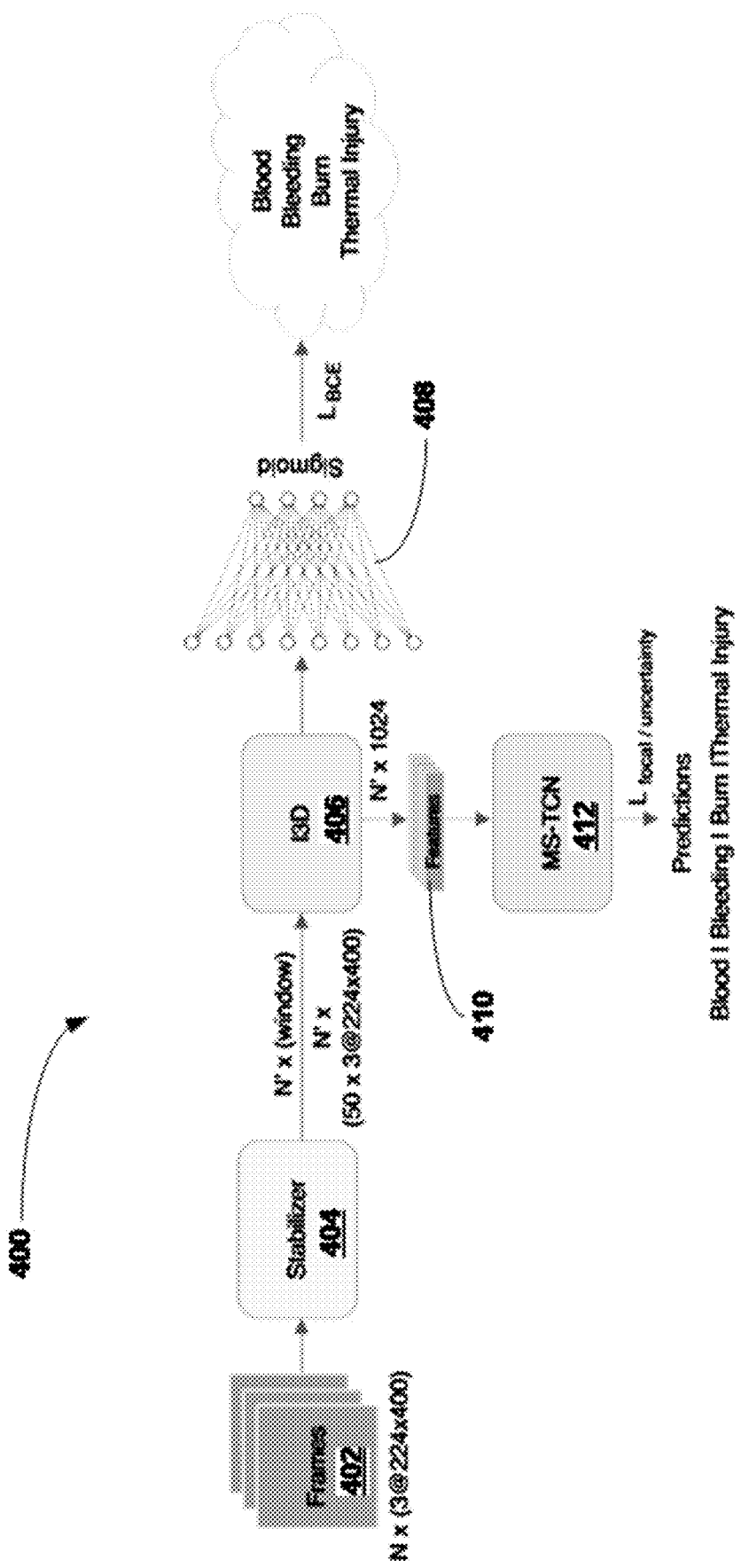
FIG. 4A illustrates, in a flow diagram, an example of a composition and flow of data of each module in a system, in accordance with some embodiments.

FIGS. 4A to 4D illustrate a system overview and qualitative result of a three-module adverse event detection system (3DStab-MS-TCN). FIG. 4A illustrates, in a flow diagram, an example of a composition and flow of data of each module in a system 400, in accordance with some embodiments. The system takes N raw frames 402 from a laparoscopic video as input. The stabilizer 404 stabilizes each window, and passes the outputs to I3D 406, a 3D convolutional network (3DCNN). The 3DCNN 406 is fine-tuned on a dataset using a sigmoid binary cross entropy loss function (LBCE) 408. Then features 410 are extracted from the 3DCNN 406, and passed to a multi-stage temporal convolutional network (MS-TCN) 412. N is the number of windows. MS-TCN 412 is trained with a focal and uncertainty loss term.

Figure 4B:
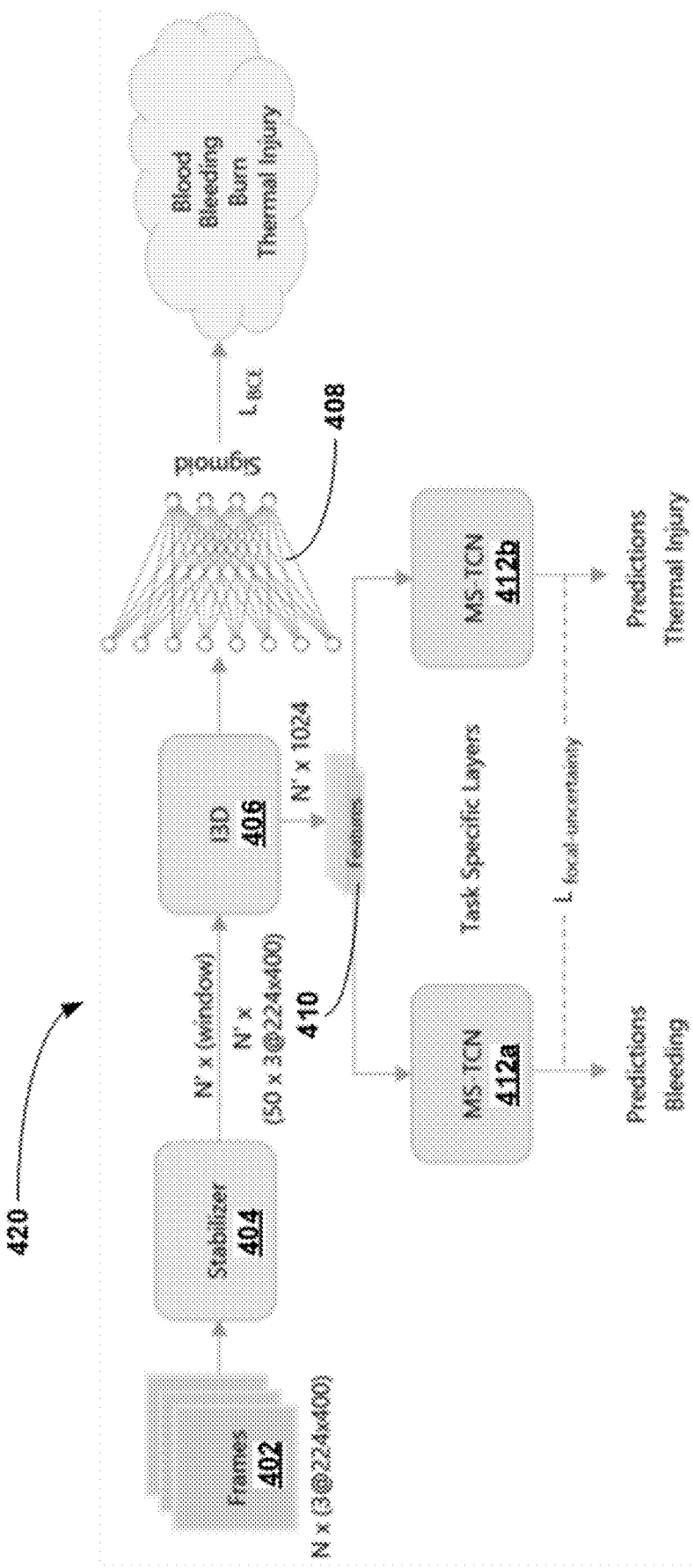
FIG. 4B illustrates, in a flow diagram, another example of a composition and flow of each module in a system, in accordance with some embodiments.

FIG. 4B illustrates, in a flow diagram, another example of a composition and flow of data of each module in a system 420, in accordance with some embodiments. The system 420 is similar to system 400, except system 420 comprises two MS-TSN 412a, 412b for each of predicting bleeding and thermal injury, respectively. It should be noted that there may be a plurality of MS-TNS 412, one for each type of adverse event being detected.

Figure 4C:
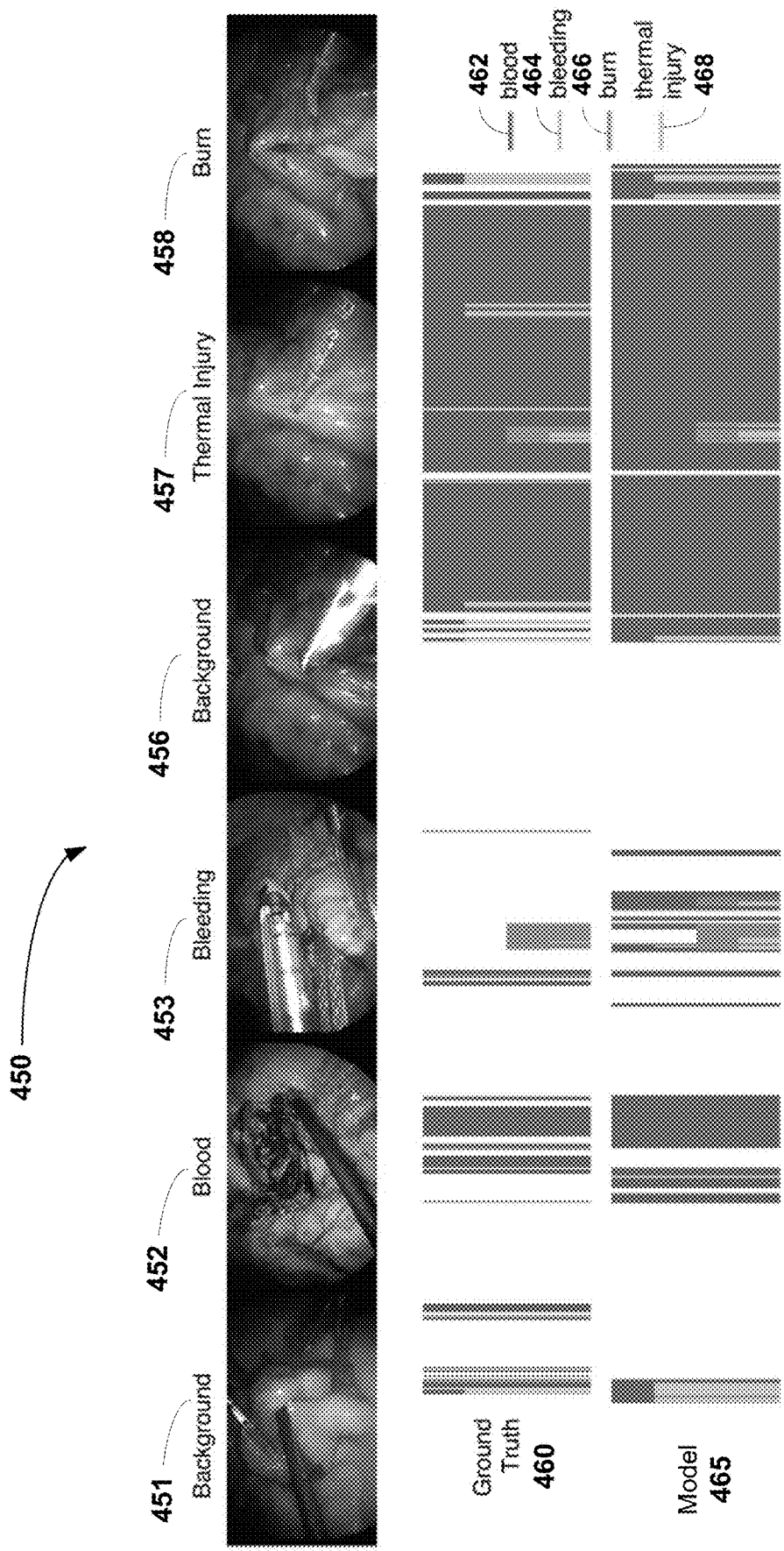
FIG. 4C, illustrates an example of inputs and outputs of the system, in accordance with some embodiments.

FIG. 4C illustrates an example of inputs and outputs of the system 450, in accordance with some embodiments. Images at the top, 451, 452, 453, 456, 457, and 458 show a few examples of different classes. The prediction plots 460, 465 indicate multi-class in one frame with multiple colors/shading in one vertical line. To achieve this, the vertical lines are plotted using different lengths. FIG. 4C shows in the top row instance frames from the video, each of which exemplifying one of five classes identified (background 451, blood 452, bleeding 453, background 456, thermal injury 457, burn 458), which is provided only as an example. The two figures on the bottom of FIG. 4C show a timeline, extending forward in time to the right of bleeding (active) 464, blood (passive) 462, thermal injury 468, and burn 466 events, where vertical bars indicate identifications. The top of these subfigures, 'Ground Truth 460' indicates a timeline annotated by a domain expert human; the bottom of these subfigures, 'Model 465', represents actual output identifications of an example model. Both objectively and subjectively, these events can be recognized with high accuracy.

Figure 4D:
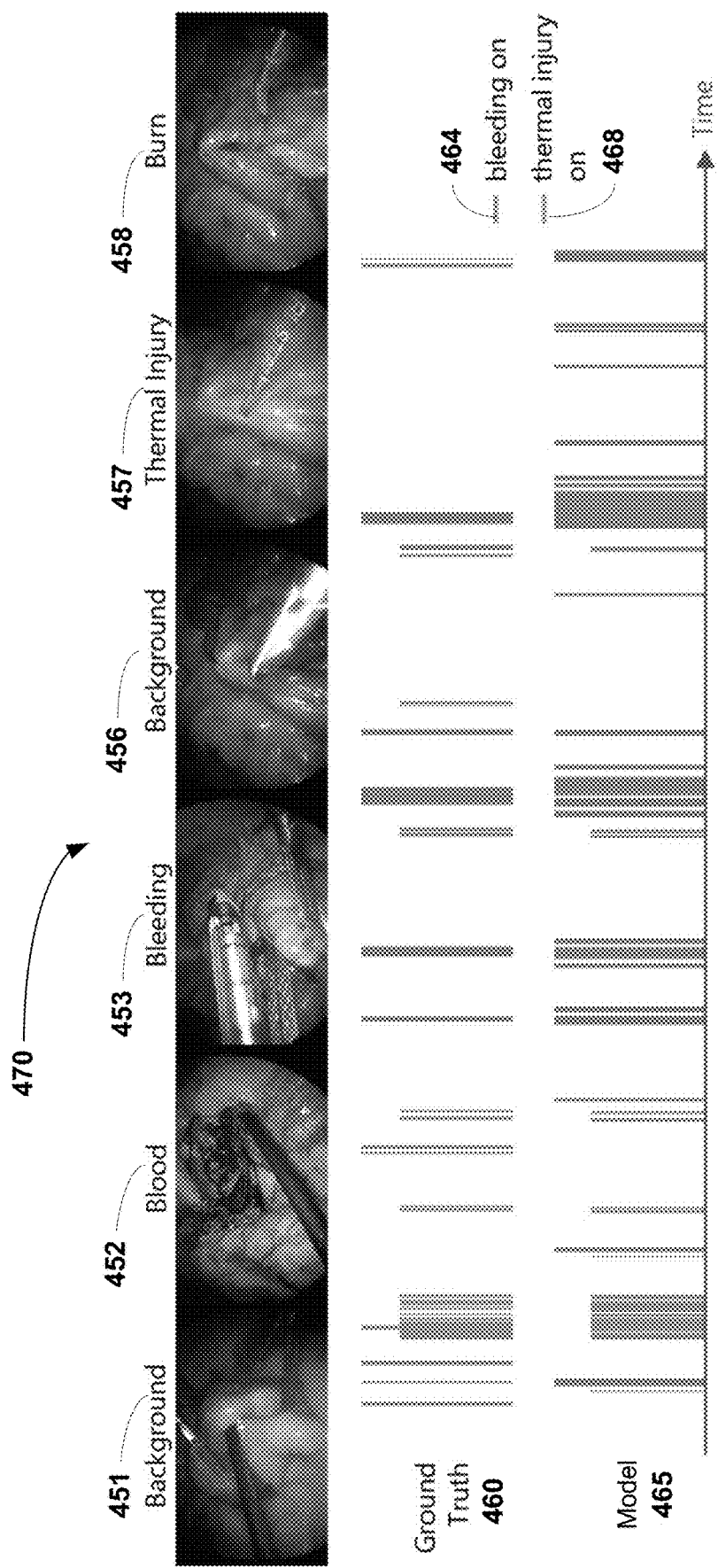
FIG. 4D illustrates another example of inputs and outputs of the system, in accordance with some embodiments.

FIG. 4D illustrates another example of inputs and outputs of the system 470, in accordance with some embodiments. FIG. 4D is a simplified version of FIG. 4C showing only bleeding 464 and thermal injury 468.

The bleeding and thermal injury detection system (3DStab-MS-TCN) 400, 420 takes different features of bleeding and thermal injury into account, and comprises three serial modules (see FIGS. 4A, 4B): a stabilizer 404, a spatial-temporal feature extractor 406, and an event classifier 412. Features of identifying bleeding and thermal injury may comprise the flow of blood and the discolouration and spread of burn marks on tissues. To better represent these features, the first module (i.e., the stabilizer 404) stabilizes a window of frames to minimize camera motion in laparoscopic videos. The second module (i.e., an InceptionV1-based 3D convolutional neural network (3DCNN) 406) extracts 1024 latent spatial-temporal features from each window of stabilized frames to represent features of the scene without an effect of camera motion. The final module is one or more multi-stage temporal convolutional network(s) (MS-TCN) 412, 412a, 412b which takes all extracted features 410 of a video as input, and generates predictions for frames of each video. FIGS. 4C and 4D show the qualitative result 450, 470 of the 3DStab-MS-TCN model 400, 420.

In one embodiment, to train the feature extractor (3DCNN) 406 and the classifier (MS-TCN) 412, 412a, 412b, 45 gastric bypass laparoscopic procedures were collected using a recording device in the operating room. Each case was approximately 1.5-hours long. Three trained surgeons labelled every frame of the 45 cases as one or more of the four categories: blood 452, burn 458, bleeding 453, and thermal injury 457 defined above, and if the frame does not contain any of the four categories, it is marked as background 451, 456 class. Although the purpose of the research is to identify bleeding 453 and thermal injury 457 events in a procedure, blood 452 and burn 458 classes were included in training to generalize features learned by 3DCNN 406. As a result, 5 million frames and 891 unique bleeding and thermal events (665 bleeding and 226 thermal injury events) were obtained. It should be understood that this embodiment describes one example. A plurality of laparoscopic procedures may be collected in the operating room for a different length. One or more trained surgeons may label every frame of the plurality of cases as one or more adverse event category (e.g., blood, burn, bleeding, thermal injury, or others). Different combinations of the number of procedures collected and labelled will result in a different number of frames and unique adverse events, and different metric values.

The distribution of each class frame-wise and event-wise is shown in Table 1

TABLE 1

Distribution of classes.

| | Blood 452 | Bleeding 453 | Burn 458 | Thermal Injury 457 | Number of Frames |
|---|---|---|---|---|---|
| Number of Positive Frames | 2,497,050 49.72% | 293,550 5.85% | 203,250 4.05% | 32,400 0.65% | Total 2,596,050 |
| Number of Individual Events | N/A N/A | 665 74.64% | | 226 25.36% | Total 891 |

The total number of frames in Table 1 is not equal to the sum of all positive frames because multiple classes can happen in one frame. Over all frames, blood class 452 is the largest class, accounting for 49.72% of frames; whereas bleeding 453, burn 458, and thermal injury 457 classes account for less than 6%. Within individual active events, bleeding 453 class is the majority class (76.64%), and thermal injury 457 events only account for 25.36% of all events. 30 cases were randomly selected as the training and validation set and 15 cases as the test set. All models in this paper were trained with 10-fold cross validation. It is understood that other cross validation may be used. A multi-task network aims to predict all four classes in parallel. Parameters are tuned based on minimum mean loss.

To train 3DCNN 406, 5 fps was sampled with a stride of 1 frame. For under- and over-sampling, potential predictions were grouped into 8 combinations shown in Table 2.

TABLE 2

Distribution of combinations

| | Blood 452 | Bleeding 453 | Burn 458 | Thermal Injury 457 | Number of Frames | |
|---|---|---|---|---|---|---|
| Combinations | x | x | x | x | 2,426,100 | 48.31% |
| | x | x | √ | x | 84,900 | 1.69% |
| | x | x | √ | √ | 14,100 | 0.28% |
| | √ | x | x | x | 2,117,700 | 42.17% |
| | √ | x | √ | x | 70,800 | 1.41% |
| | √ | x | √ | √ | 15,000 | 0.30% |
| | √ | √ | x | x | 275,100 | 5.48% |
| | √ | √ | √ | x | 15,150 | 0.30% |
| | √ | √ | √ | √ | 3,300 | 0.07% |
| | | | | Total | 5,022,150 | 100% |

Symbol x indicates that the frames do not contain that class. The checkmark V indicates that the class is present in the frames. The first row of combinations is the background class that no class is present in the frames.

For example, Table 2 shows one combination is a frame with positive blood, positive bleeding, positive burn, and negative thermal injury classes (the second last row of the combinations). The impossible combinations are discarded (e.g., a frame with no blood, but positive bleeding is not possible). The combination of all classes being positive was found to be the minority class with only 3,300 samples. Therefore, this combination was over-sampled using random over-sampling method (randomly select a sample to duplicate), and under-sample the rest of the combinations so that they all have the same number of frames. As a result, there are 27,000 training and validation frames, and 100,000 test frames for I3D training. Data augmentation such as random flip and random contrast adjustment is applied to all training samples to avoid over-fitting.

For training MS-TCN, under- and over-sampling cannot make the training set balanced, as each case is a sample to the model. To address the class imbalance problem, focal and uncertainty losses were utilized. This method shows up to 5%-boost in segmental F1 score—an event-wise metric. The method will be described in more detail below (see Methods below).

Figure 5A:
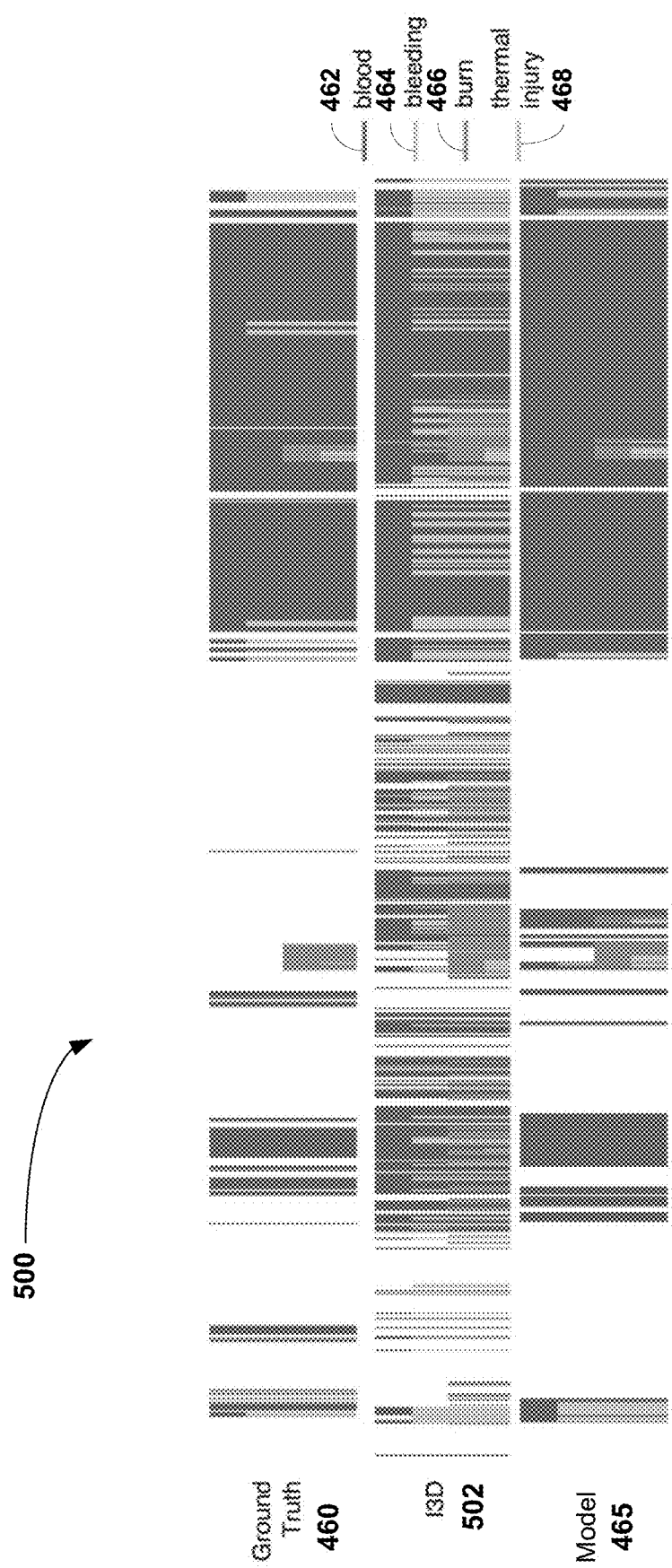
FIG. 5A illustrates, in a plot diagram, an example of prediction plots of Stab-I3D-BCE and 3DStab-MS-TCN-Uncertainty, in accordance with some embodiments.
Figure 5B:
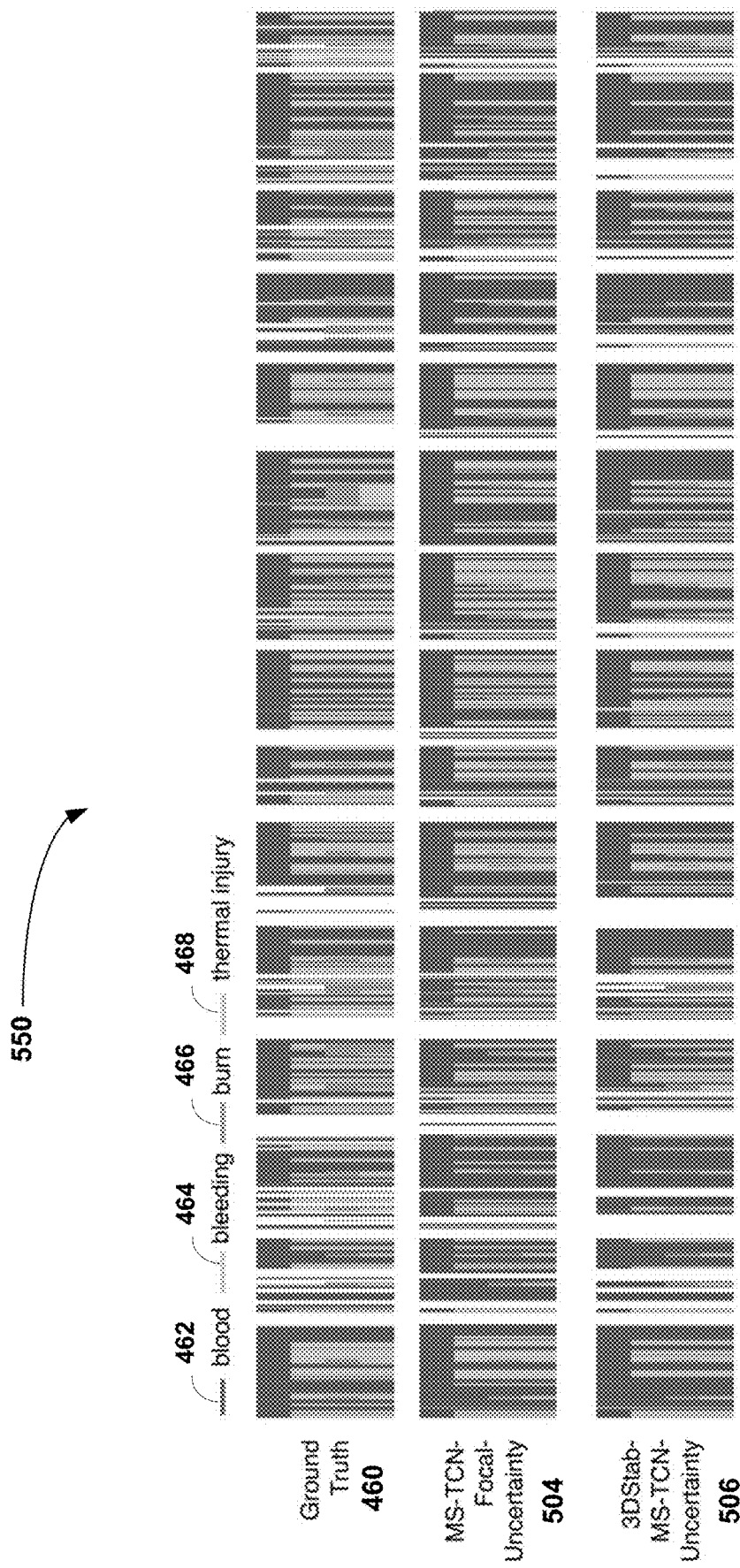
FIG. 5B illustrates, in a plot diagram, an example of prediction plots of 3DStab-MS-TCN-Uncertainty and MS-TCN-Focal-Uncertainty models, in accordance with some embodiments.

FIG. 5A illustrates, in a plot diagram 500, an example of prediction plots of Stab-I3D-BCE 502 and 3DStab-MS-TCN-Uncertainty models 465, in accordance with some embodiments. FIG. 5A shows a comparison of the qualitative result of Stab-I3D-BCE 502 and 3DStab-MS-TCN-Uncertainty 465, and an illustration of I3D 502 having more scattering predictions than 3DStab-MS-TCN 465. FIG. 5B illustrates, in a plot diagram 550, an example of prediction plots of 3DStab-MS-TCN-Uncertainty 465 and MS-TCN-Focal-Uncertainty models 504, in accordance with some embodiments.

Frame-wise metrics such as AUC, AP, precision, recall, and F1 score are commonly used to evaluate model performance. However, these metrics do not fully represent the model performance because the majority class dominates the calculation. These metrics ignore the ability of the model to detect an event, though having a few false positive frames. Therefore, event-wise metrics were adapted. In addition to that, both the model's overall performance, and the individual task performance, were evaluated. For individual task performance, these event-wise metrics are segmental F1 scores at intersection over union (IOU) thresholds of 0.1, 0.25, and 0.5, and at prediction probability threshold of 0.5.

To compare model performance, a new metric was introduced—mean segmental F1 scores computed based on thresholds at each of the three IOU thresholds. They were also compared based on the best threshold chosen during validation as a measure of their real-world performance. The 3DStab-MS-TCN system 400, 420 achieves a frame-wise mean AUC of 0.838, a frame-wise mean AP of 0.461, and mean segmental F1 scores of 0.457, 0.378, and 0.243 at IOU of 0.1, 0.25, and 0.5 respectively. Interestingly, the model that achieves the best results in event-wise metrics does not have the best performance in frame-wise metrics. This is demonstrated while comparing thermal injury detection performance of 3DCNN 406 with stabilized frames and binary cross entropy loss function (Stab-I3D-BCE) to 3DStab-MS-TCN with uncertainty loss function (3DStab-MS-TCN-Uncertainty). The AP of Stab-I3D-BCE is 5% better than 3DStab-MS-TCN-Uncertainty, whereas its segmental F1 scores are around 20% lower than the ones of 3DStab-MS-TCN-Uncertainty. Looking closer at the prediction plots of the two models in FIG. 5A, 3DStab-MS-TCN-Uncertainty is trainable weight is added to the loss of each class (see Methods below). The final objective function is $$\mathcal{L}_{focal-uncertainty} = \left(\frac{1}{CN}\sum_c\sum_n \frac{1}{\sigma_c^2}(1-p_{cn})\mathcal{L}_{BCE_{cn}} + \log\sigma_c\right) + \lambda\mathcal{L}_{T-MSE}, \quad (2)$$

where C is the number of classes, N is the number of samples, $\lambda$ is the smoothing loss constant, $L_{BCE_{cn}}$ is the binary cross entropy of class c and sample n, $p_{cn}$ is the confidence probability of a prediction of class c at sample n, and $\sigma_c^2$ is a learnable scalar added from uncertainty loss (see Methods below).

An ablation study was performed to show the effect of each term in the objective function. Results are shown in Table 3 with the loss function name as the suffix in the model name. All models are trained on stabilized frames. The loss function for I3D are the same as MS-TCN without the smoothing term.

TABLE 3

Effect of loss functions

| | Frame-wise | | | Thermal | Event-wise | | | | | |
| | Blood | Bleeding | Burn | Injury | Bleeding | | | Thermal Injury | | |
| Techniques | AUC AP | AUC AP | AUC AP | AUC AP | F1@0.1 | F1@0.25 | F1@0.5 | F1@0.1 | F1@0.25 | F1@0.5 |
|---|---|---|---|---|---|---|---|---|---|---|
| Stab-I3D-BCE | 0.911 0.911 | 0.804 0.309 | 0.786 0.332 | 0.775 0.185 | 0.073 | 0.053 | 0.024 | 0.325 | 0.270 | 0.199 |
| Stab-I3D-Focal | 0.891 0.891 | 0.748 0.223 | 0.742 0.231 | 0.717 0.137 | 0.057 | 0.031 | 0.008 | 0.217 | 0.172 | 0.090 |
| Stab-I3D-Uncertainty | 0.890 0.889 | 0.726 0.190 | 0.738 0.216 | 0.701 0.141 | 0.053 | 0.031 | 0.011 | 0.135 | 0.116 | 0.054 |
| Stab-I3D-Focal-Uncertainty | 0.883 0.883 | 0.716 0.103 | 0.734 0.203 | 0.697 0.116 | 0.046 | 0.023 | 0.003 | 0.177 | 0.155 | 0.065 |
| 3DStab-MS-TCN-Normal | 0.930 0.920 | 0.844 0.403 | 0.850 0.421 | 0.811 0.149 | 0.332 | 0.258 | 0.147 | 0.548 | 0.484 | 0.323 |
| 3DStab-MS-TCN-Focal | 0.927 0.924 | 0.845 0.425 | 0.816 0.439 | 0.751 0.160 | 0.293 | 0.237 | 0.154 | 0.585 | 0.504 | 0.325 |
| 3DStab-MS-TCN-Uncertainty | 0.929 0.919 | 0.843 0.385 | 0.806 0.405 | 0.774 0.132 | 0.344 | 0.269 | 0.101 | 0.569 | 0.488 | 0.325 |
| 3DStab-MS-TCN-Focal-Uncertainty | 0.924 0.919 | 0.851 0.391 | 0.760 0.334 | 0.760 0.158 | 0.340 | 0.243 | 0.143 | 0.805 | 0.458 | 0.305 | better at detecting an event with substantially less over-segmentation error. This might be due to the fact that MS-TCN has the full temporal resolution of the entire video and therefore learns the relationship between frames in a long segment, and correct over-segmentation errors. This result shows the importance of event-wise metrics because event-wise metrics give equal weights to each event instead of each frame. Event-wise metrics catch situations where models only learns the longer events, and ignoring the shorter events. Frame-wise metrics will not catch that because the longer events dominate the majority of the frames.

The original MS-TCN architecture is designed to solve action recognition, which is a classification problem. Its loss is optimized based on softmax cross-entropy plus a regression loss—a truncated mean-square error (T-MSE) that minimizes the number of transitions from one action to another. To re-design it for a multi-task event detection system, a sigmoid binary cross-entropy (BCE) loss is used with the regression loss $$L_{normal} = L_{BCE} + \lambda L_{T-MSE} \quad (1)$$

where $L_{BCE}$ is a binary cross entropy loss, and $L_{T-MSE}$ is the truncated mean-square error.

In addition to these two terms, a focal loss term was added to address class imbalance. This loss function takes into account the confidence of a prediction—it will scale the loss by a factor of 1−p, where p is the confidence of a prediction. This factor will help the model learn harder samples. Moreover, to address uncertainty of each task in multi-task problem (here detecting each class is its own task), a The results show that the focal term does not improve the I3D performance. This is expected because the class imbalance is addressed by the sampling algorithm. For the uncertainty loss term, it is expected to improve the performance of I3D. However, the I3D model with the uncertainty loss term drops more than 10% compared to the normal loss function.

Figure 6:
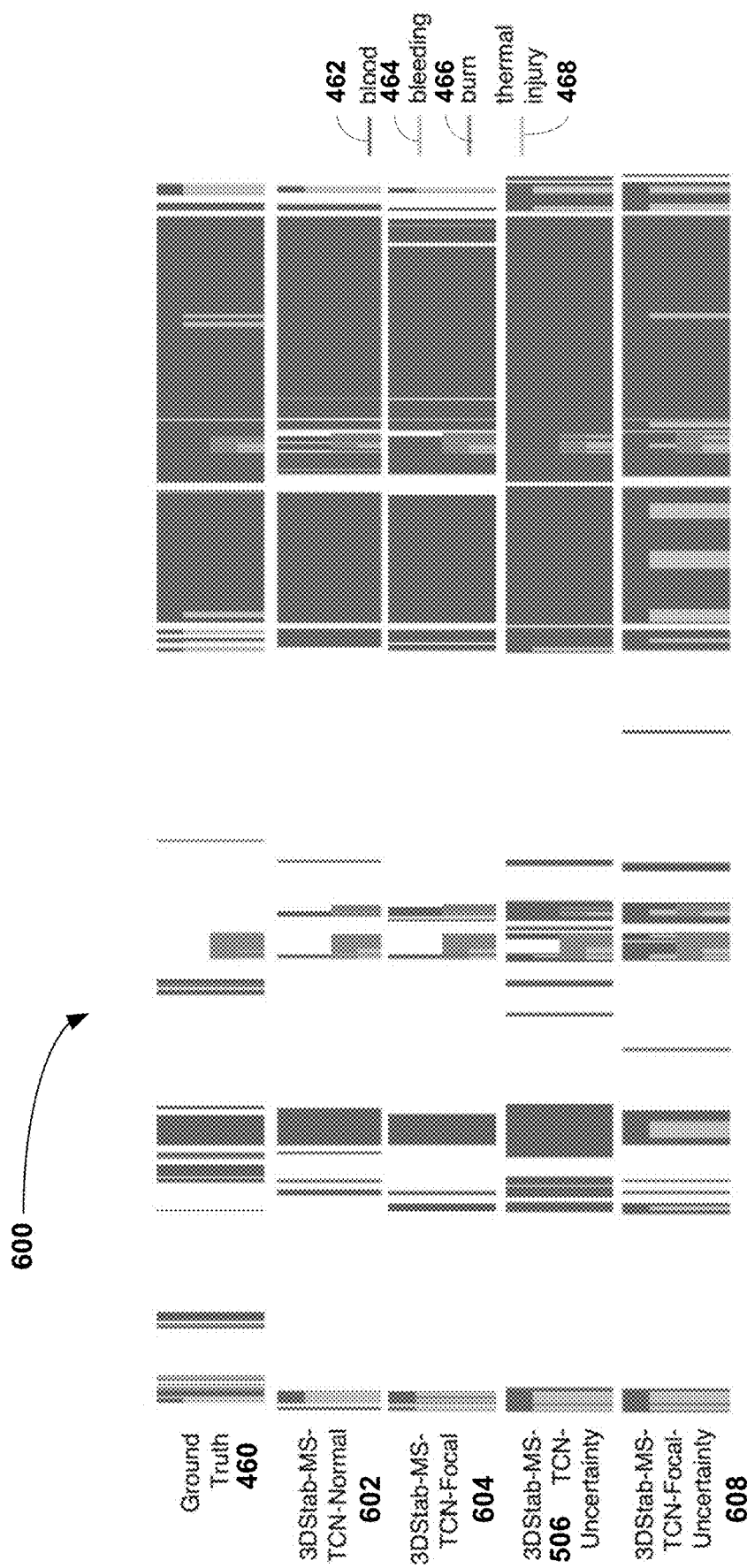
FIG. 6 illustrates, in a plot diagram, an example of prediction plots of models with different loss functions, in accordance with some embodiments.

By contrast, these two loss terms increase performance of 3DStab-MS-TCN in event-wise metrics, although they have no effect on frame-wise metrics. Focal loss improves segmental F1 score in thermal injury class by 2-4%, and uncertainty loss improves that by additional 1-2%. Meanwhile, focal loss has minimal influence on performance in bleeding class, whereas uncertainty boost performance on bleeding class by 1-2%. This shows that focal loss can better learn minority class, and generate a more refined event boundary (See FIG. 6) by applying more penalty on harder examples. FIG. 6 illustrates, in a plot diagram 600, an example of prediction plots of models with different loss functions, in accordance with some embodiments. FIG. 6 shows a qualitative comparison of regular multi-task classification loss (Normal 602), a focal loss (Focal 604), an uncertainty loss (Uncertainty 506), and a focal and uncertainty loss (Focal-Uncertainty 608). In FIG. 6, 3DStab-MS-TCN-Uncertainty 506 correctly predicted a bleeding event that other models did not catch, and 3DStab-MS-TCN-Focal-Uncertainty 608 predicted more events which makes it suffer in precision, though has a higher recall. The best overall model is 3DStab-MS-TCN with uncertainty loss 506 with the highest segmental F1 scores (see Table 4). However, 3DStab-MS-TCN-Focal-Uncertainty 608 might be preferable with its higher recall.

TABLE 4

Effect of loss functions

| Techniques | Frame-wise | | Event-wise | | |
|---|---|---|---|---|---|
| | mAUC | mAP | mF1@0.1 | mF1@0.25 | mF1@0.5 |
| Stab-I3D-BCE | 0.819 | 0.434 | 0.200 | 0.161 | 0.111 |
| Stab-I3D-Focal | 0.774 | 0.370 | 0.137 | 0.101 | 0.052 |
| Stab-I3D-Uncertainty | 0.761 | 0.367 | 0.094 | 0.073 | 0.033 |
| Stab-I3D-Focal-Uncertainty | 0.757 | 0.349 | 0.111 | 0.089 | 0.034 |
| 3DStab-MS-TCN-Normal | 0.859 | 0.473 | 0.440 | 0.370 | 0.235 |
| 3DStab-MS-TCN-Focal | 0.842 | 0.487 | 0.439 | 0.370 | 0.240 |
| 3DStab-MS-TCN-Uncertainty | 0.838 | 0.461 | 0.457 | 0.378 | 0.243 |
| 3DStab-MS-TCN-Focal-Uncertainty | 0.824 | 0.450 | 0.424 | 0.353 | 0.224 |

Figure 7:
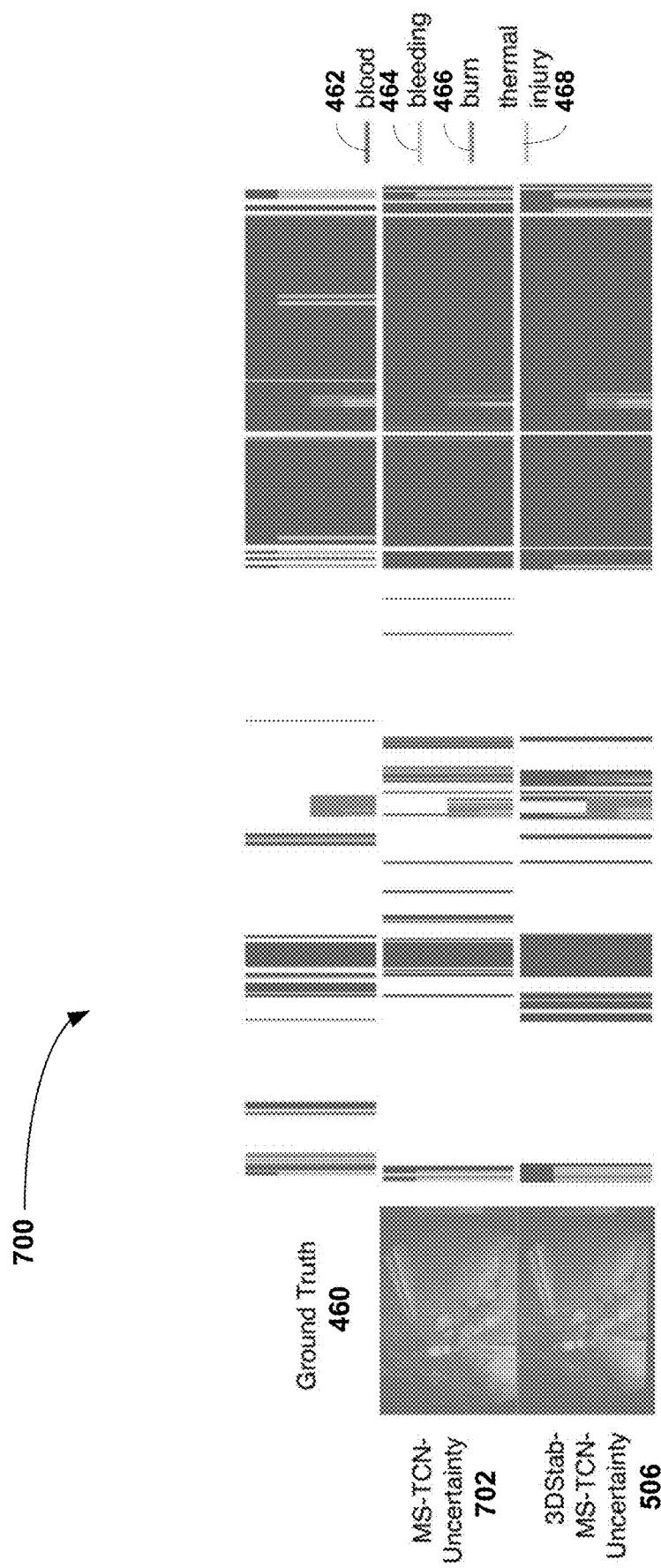
FIG. 7 illustrates, in a plot diagram, an example of prediction plots of models with and without stabilization, in accordance with some embodiments.

Bundled-camera path stabilization was implemented and applies to every 5 second window at 1 fps with a step size of 1 second. Stabilization reduces camera motion, and warps images so that each frame's camera view aligns with each other as shown in FIG. 7. FIG. 7 illustrates, in a plot diagram 700, an example of prediction plots of models with and without stabilization, in accordance with some embodiments. MS-TCN 702 and 3DStab-MS-TCN 506 were compared with uncertainty loss. Images at the bottom left are an example of not-stabilized and stabilized frames. In the prediction plots of FIG. 7, the predictions of 3DStab-MS-TCN 506 has fewer transitions between positive and background frames (over-segmentation error) compared to MS-TCN 702.

Applying stabilization improves both frame-wise and event-wise performance metrics. For I3D, stabilization improves frame-wise metrics by 1-5% and segmental F1 scores by approximately 10%. By contrast, stabilization reduces MS-TCN's performance on thermal injury shown in Table 5. Thermal injury detection obtains its best performance on a MS-TCN with no stabilization, and focal and uncertainty losses (MS-TCN-Focal-Uncertainty). This may be due to the fact that MS-TCN itself accommodates the over-segmentation error in predictions, and camera motion does not play a significant role in thermal injury detection as much as it does in bleeding detection. Moreover, stabilization is a warping operation that introduces some distortion to the scene, which could be responsible for the drop of the segmental F1 score.

TABLE 5

Effect of stabilization

| | Frame-wise | | | | Event-wise | | | | | |
|---|---|---|---|---|---|---|---|---|---|---|
| | Bleeding | | Thermal Injury | | Bleeding | | | Thermal Injury | | |
| Techniques | AUC | AP | AUC | AP | F1@0.1 | F1@0.25 | F1@0.5 | F1@0.1 | F1@0.25 | F1@0.5 |
| I3D-Normal | 0.778 | 0.303 | 0.734 | 0.183 | 0.073 | 0.050 | 0.019 | 0.223 | 0.156 | 0.109 |
| Stab-I3D-Normal | 0.804 | 0.309 | 0.775 | 0.185 | 0.073 | 0.053 | 0.024 | 0.326 | 0.270 | 0.199 |
| MS-TCN-Normal | 0.850 | 0.437 | 0.838 | 0.160 | 0.309 | 0.264 | 0.152 | 0.538 | 0.487 | 0.336 |
| 3DStab-MS-TCN-Normal | 0.844 | 0.403 | 0.811 | 0.149 | 0.332 | 0.255 | 0.147 | 0.548 | 0.484 | 0.323 |
| MS-TCN-Focal | 0.850 | 0.447 | 0.747 | 0.157 | 0.288 | 0.216 | 0.133 | 0.549 | 0.478 | 0.389 |
| 3DStab-MS-TCN-Focal | 0.845 | 0.425 | 0.751 | 0.160 | 0.293 | 0.237 | 0.154 | 0.585 | 0.504 | 0.325 |
| MS-TCN-Uncertainty | 0.804 | 0.371 | 0.770 | 0.156 | 0.290 | 0.204 | 0.095 | 0.564 | 0.564 | 0.479 |
| 3DStab-MS-TCN-Uncertainty | 0.843 | 0.385 | 0.774 | 0.132 | 0.344 | 0.269 | 0.161 | 0.569 | 0.488 | 0.325 |
| MS-TCN-Focal-Uncertainty | 0.841 | 0.435 | 0.746 | 0.169 | 0.296 | 0.225 | 0.125 | 0.624 | 0.576 | 0.416 |
| 3DStab-MS-TCN-Focal-Uncertainty | 0.851 | 0.391 | 0.760 | 0.155 | 0.340 | 0.248 | 0.143 | 0.508 | 0.458 | 0.305 |

Of all models tested, MS-TCN-Focal-Uncertainty 702 performed the best in thermal injury 468 detection, and 3DStab-MS-TCN-Uncertainty 506 performed the best in bleeding 464 detection. Their prediction plots over all procedures in the test set are shown in FIG. 5B. Their task performance over all procedures in the test set are shown in FIGS. 8A to 8D.

FIG. 8A illustrates, in a plot diagram, an example of precision recall curves 800 over all procedures in the test set for the MS-TCN-Focal-Uncertainty model, in accordance with some embodiments.

FIG. 8B illustrates, in a plot diagram, an example of receiver operating characteristic (ROC) curves 810 over all procedures in the test set for the MS-TCN-Focal-Uncertainty model, in accordance with some embodiments.

Figures 8C, 8D:
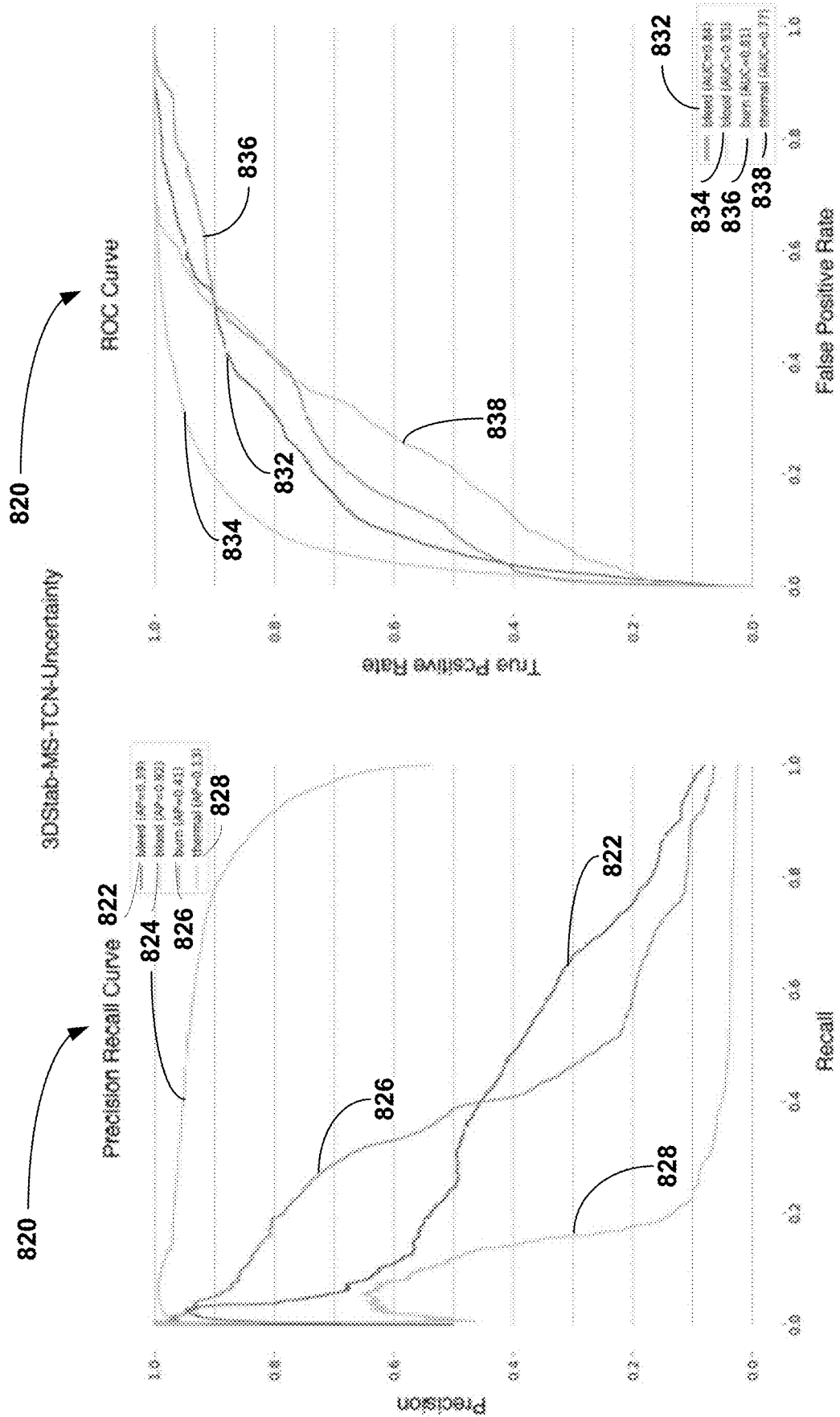
FIG. 8C illustrates, in a plot diagram, an example of a precision recall curve over all procedures in the test set for the 3DStab-MS-TCN-Uncertainty model, in accordance with some embodiments.
FIG. 8D illustrates, in a plot diagram, an example of an ROC curve over all procedures in the test set for the 3DStab-MS-TCN-Uncertainty model, in accordance with some embodiments.

FIG. 8C illustrates, in a plot diagram, an example of precision recall curves 820 over all procedures in the test set for the 3DStab-MS-TCN-Uncertainty model, in accordance with some embodiments.

FIG. 8D illustrates, in a plot diagram, an example of ROC curves 830 over all procedures in the test set for the 3DStab-MS-TCN-Uncertainty model, in accordance with some embodiments.

A 2DCNN—InceptionV3, the I3D, and a single-stage TCN (SS-TCN)—were trained as baselines for comparison to system 400. Table 6A shows the task performance of each model. All models share similar frame-wise performance except for thermal injury detection of InceptionV3, which could be due to over-segmentation errors. Event-wise performance of InceptionV3 is close to zero although its frame-wise bleeding performance is similar to the other models. I3D shows significant improvement in thermal injury detection from InceptionV3. Its AUC increases from 0.473 to 0.734.

TABLE 6A

Task performance of state-of-the-are methods

| | Frame-wise | | | | Event-wise | | | | | |
| | Bleeding | | Thermal Injury | | Bleeding | | | Thermal Injury | | |
| Techniques | AUC | AP | AUC | AP | F1@0.1 | F1@0.25 | F1@0.5 | F1@0.1 | F1@0.25 | F1@0.5 |
|---|---|---|---|---|---|---|---|---|---|---|
| 3DStab-MS-TCN-Uncertainty | 0.843 | 0.385 | 0.774 | 0.132 | 0.344 | 0.269 | 0.161 | 0.569 | 0.488 | 0.325 |
| MS-TCN-Focal-Uncertainity | 0.841 | 0.435 | 0.746 | 0.169 | 0.296 | 0.225 | 0.125 | 0.624 | 0.576 | 0.416 |
| MS-TCN-Normal | 0.844 | 0.403 | 0.811 | 0.149 | 0.332 | 0.255 | 0.147 | 0.548 | 0.484 | 0.323 |
| I3D-BCE | 0.778 | 0.303 | 0.734 | 0.183 | 0.073 | 0.050 | 0.019 | 0.223 | 0.156 | 0.109 |
| Inception-V3-BCE | 0.797 | 0.300 | 0.473 | 0.038 | 0.024 | 0.013 | 0.005 | 0.034 | 0.019 | 0.005 |
| SS-TCN-Normal | 0.851 | 0.446 | 0.715 | 0.170 | 0.191 | 0.138 | 0.074 | 0.528 | 0.496 | 0.304 |

Table 6B shows the general performance of the model. The best precision and recall illustrate the real-world performance of this model at best threshold chosen in validation.

TABLE 6B

Overall performance of state-of-the-art methods

| | Frame-wise | Event-wise | | | | |
| | All | All | | Bleeding | | Thermal Injury |
| Techniques | mAUC | mAP | mF1 | Precision | Recall | Precision | Recall |
|---|---|---|---|---|---|---|---|
| 3DStab-MS-TCN-Uncertainty | 0.838 | 0.461 | 0.359 | 0.530 | 0320 | 0.697 | 0.622 |
| MS-TCN-Focal-Uncertainty | 0.820 | 0.477 | 0.377 | 0.338 | 0.409 | 0.830 | 0.595 |
| MS-TCN-Normal | 0.863 | 0.481 | 0.348 | 0.412 | 0.368 | 0.741 | 0.541 |
| I3D-BCE | 0.793 | 0.429 | 0.105 | 0.157 | 0.197 | 0.423 | 0.644 |
| Inception-V3-BCE | 0.713 | 0.345 | 0.016 | 0.111 | 0.243 | 0.197 | 0.187 |
| SS-TCN-Normal | 0.829 | 0.496 | 0.288 | 0.191 | 0.332 | 0.729 | 0.581 |

Using a single-stage temporal convolutional network further improves performance on both bleeding and thermal injury detection. Frame-wise metrics of bleeding detection increases around 7.3% and 14.6% on AUC and AP respectively, and mean segmental F1 increases to 0.191, 0.138, and 0.074 from 0.073, 0.053, and 0.019. Although I3D and SS-TCN have similar frame-wise thermal detection performance, mean segmental F1 score of SS-TCN is more than 25% better than I3D.

In line with the performance increase from SS-TCN to MS-TCN [19], multi-stage computation improves event-wise performance of each task by more than 10% on bleeding detection, and has a slightly better thermal detection performance. Bleeding is subjected to more over-segmentation error, and is harder to be optimized by SS-TCN. By contrast, SS-TCN has very few over-segmentation error, so the space for improvement for MS-TCN is smaller. The improved ability of MS-TCN in correcting over-segmentation error could be a reason for the significant improvement of bleeding detection.

In one embodiment, laparoscopic gastric bypass procedures were collected in which surgical steps, and patterns of bleeding and thermal injury are similar. This leads to the question of the system generalizability to different procedures where the amount of bleeding may vary, where tissue injuries are different, where the devices used are different, et cetera. Additional data may be collected to explore these issues more generally.

The speed-optimized stabilizer 404 was compared with a previous implementation. For a video with a resolution of 1280×720 pixels, the stabilizer reaches a speed of 7 fps, whereas the previous implementation claimed 228 a 2.5 fps. For a dataset, a resolution of 224×400 was used with the speed-optimized stabilizer 404, which increases the speed from 7 fps to 11 fps. However, the speed of stabilization is still a bottleneck of 3DStab-MS-TCN. To process a window (e.g., 50 frames) for 3DCNN 406, this stabilizer 404 requires around 5-seconds per window. With current hardware (see Methods below), one epoch may be trained in approximately 1.5 days on the training dataset which contains 27,000 frames. In some embodiments, stabilization quality may be reduced while reaching the same results and still be able to use stabilization in real-time processing.

For clinical deployment, choosing a prediction threshold, and IOU threshold merely at the smallest mean loss or at the maximum segmental F1 score during cross-validation is not sufficient justification. In some embodiments, if a choice is to be made between high recall and high precision, a high recall may be more relevant than a high precision clinically so that clinical reports will not miss severe adverse events, despite some false positives. However, this trade-off is not reflected by a single F1 score nor the loss value. In some embodiments, different performance evaluation frameworks may be used such as measuring inter-rater reliability score among raters servicing models at each threshold as a rater.

The A3DStab-MS-TCN system 400, 420 stabilizes videos to capture object motion and eliminate camera motion in laparoscopic videos, extract spatial-temporal features, and predict and refine event boundaries using multi-stage temporal convolutional layers. This system accommodates an imbalanced dataset using a novel loss function. In testing, the 3DStab-MS-TCN system 400, 420 outperformed previous state-of-the-art models by a large margin.

The 3DStab-MS-TCN detects two major types of adverse events in surgical procedures—bleeding and thermal injury. This system 400, 420 can be extended to other adverse event detection, such as mechanical injury. This might help a feature extractor module learn more general features, and lead to an increase in model performance. Each module of the 3DStab-MS-TCN system 400, 420 performs their task separately. An end-to-end 3DStab-MS-TCN system 400, 420 could improve system performance, and speed up training. In order to do this, a fast stabilizer algorithm may be used, and an end-to-end I3D-MS-TCN architecture may be developed and optimized.

Methods

A system 400, 420 is provided that generates bleeding and thermal injury event predictions in laparoscopic videos based on extracted features from 3DCNN on stabilized frames. In some embodiments, this system 400, 420 uses a bundled camera path estimation algorithm to stabilize camera motion in laparoscopic views for every 50-frames window. Features of size of 1024 are extracted using I3D—a 3DCNN on a sliding window with a stride of 1 second (5 frames). As a result, the input size to the next module (i.e., MS-TCN) is N×1024, where N is the number of sliding windows in each video. MS-TCN module determines if an event happens in each window, and produces N predictions for each video. It is understood that the number of frames per window, feature sizes, sliding window, etc. may be modified for different uses/tests of different systems/models.

Implementation details of different aspects of this system 400, 420 will now be described, including data, system and training configurations, loss functions, stabilization, and evaluation metrics.

The data used in testing included laparoscopic gastric bypass procedure videos collected in an operating room of a hospital. An operating room system (e.g., see FIG. 9 below) was used to collect 45 laparoscopic gastric bypass procedures of 1280×720 resolution from the years 2016 to 2018. They are labelled with start- and end-time of each class (i.e., blood, burn, bleeding, thermal injury), and reviewed by three trained surgeons frame-by-frame. Identifiable information such as patient information and audio was excluded during data storage and processing of the testing.

For 2DCNN, the InceptionV3 network was used with pre-trained ImageNet weights. This network was fine-tuned using the collected dataset. A mini-batch size of 64 samples were used. Classes were randomly sampled from the dataset so that each mini-batch has a similar number of samples from each class. The model loss converges after 100 epochs. The I3D network is pre-trained on the ImageNet and Kinetics datasets. A mini-batch size of 10 windows was used. Similar to 2DCNN, each mini-batch has similar number of samples from each class. The model loss converges after 50 epochs.

With respect to segmentation methods, models such as fast region CNN (RCNN) (Fast-RCNN) and Mask RCNN may be used to segment specific thermal injury region in surgical videos. Fine-tuned Mask RCNN draws boundaries along the thermal injury region given predicted positive frames.

Partially supervised methods may be limited by the amount of data collected/annotated. The partially supervised methods, such as synthetic data, movement prediction, and colorization, may be used to address adverse event detection problem. With respect to synthetic data, surgical videos may be synthesized using networks such as generative adversarial network (GANs). This allows for the generation of data with enough diversity to train the models. With respect to movement prediction, existing unlabeled data and models may be used to predict future movements of objects (including adverse event detection) in the scene. This allows for the identification of unexpected adverse event. With respect to colorization, structure features may be extracted from neural network architecture with the ability to recolor a grey-level scene. This will provide the ability to identify unique objects in the scene. These features are then fed into a neural network for adverse event detection.

Configurations of SS-TCN and MS-TCN are different from the others. No mini-batch (i.e., batch size is 1) nor pre-trained weights are used in training. Class imbalance is solved by the objective functions. SS-TCN has one layer of TCN with 10 layers of dilated residuals. Each layer has 64-filters with a filter size of 3. The model converges after 50 to 200 epochs, depending on the loss function.

All models were trained with a stochastic gradient descent optimizer with an initial learning rate of 0.001, and a step-wise decay rate of 0.95 (i.e., learning rate of next epoch is 95% of the one in the current epoch). Ten-fold cross-validation was used to select the best epoch and threshold to use in the testing phase by computing the mean loss of every 10 epochs. All models have a sigmoid function as their final activation function to generate logits. The loss functions in optimization are different from the model's original implementation. Experiments were performed on a GTX Titan V GPU with 12 GB memory and 32 GB RAM.

A combination of a multi-task loss, a focal loss term, an uncertainty loss term, and a smoothing loss were used. The multi-task loss is a sigmoid binary cross entropy, and the smoothing loss is a truncated mean-square error (T-MSE) between log-probabilities of the current frame and the previous frame. The smoothing loss is only used in TCN training where the full video is used as an input. It should be understood that the use of a truncated mean-square error is optional as it generates a higher precision with a trade-off of recall rate.

For the multi-task loss, a binary cross entropy loss was used $$\mathcal{L}_{BCE} = \frac{1}{CN} \sum_c \sum_n y_{t_{cn}} \log(y_{p_{cn}}) + (1 - y_{t_{cn}}) \log(1 - y_{p_{cn}}), \quad (3)$$

where $y_{p_{cn}}$ is prediction probability and $y_{t_{cn}}$ is the true label of class c and sample n. The smoothing loss is in the form of its original implementation $$\mathcal{L}_{T\text{-}MSE} = \frac{1}{CN} \sum_c \sum_n \max(\tau, |\log y_{p_{cn}} - \log y_{p_{cn-1}}|), \quad (4)$$

where r is a hyper-parameter. The normal loss in the experiment is the sum of the two losses $$\mathcal{L}_{normal} = \mathcal{L}_{BCE} + \lambda \mathcal{L}_{T\text{-}MSE}, \quad (5)$$

where λ is a hyper-parameter. Focal loss scales $L_{BCE}$ for each sample so that the model will focus on learning harder examples.

$$\mathcal{L}_f = \frac{1}{CN} \sum_c \sum_n (1 - p_{cn})^\gamma \mathcal{L}_{BCE_{cn}} \quad (6)$$

where $$p_{cn} = \begin{cases} y_{p_{cn}} & y_{t_{cn}} = 1 \\ 1 - y_{p_{cn}} & y_{t_{cn}} = 0 \end{cases} \quad (7)$$

is the confidence of prediction, and $L_{BCE_{cn}}$ is binary cross-entropy loss of class c at sample n.

Task-dependent uncertainty depends on each task's representation or measurement units. In adverse event detection, each event has different representation and measurements. In order to model this task-dependent uncertainty that captures uncertainty embedded in each task, multi-task likelihoods were used, and scale it by a factor $1/\sigma^2$ similar to a Gibbs distribution where a is observation noise. The derivation of such model is done on classification and regression tasks. In some embodiments, the multi-task loss function may be derived based on negative log-likelihood of sigmoid activation L=−log (Sigmoid(f$^w$(x)). For single task, $$-\log(p(y | f^w(x), \sigma)) \quad (8)$$

$$= -\log\left(\text{Sigmoid}\left(\frac{1}{\sigma^2} f^w(x)\right)\right) \quad (9)$$

$$= \log\left(1 + \exp\left(-\frac{1}{\sigma^2} f^2(x)\right)\right) \quad (10)$$

$$= \frac{1}{\sigma^2} \mathcal{L} + \log\left(\frac{1 + \exp\left(-\frac{1}{\sigma^2} f^w(x)\right)}{(1 + \exp(-f^w(x)))^{\frac{1}{\sigma^2}}}\right) \quad (11)$$

$$\approx \frac{1}{\sigma^2} \mathcal{L} + \log(\sigma) \quad (12)$$

In equation 12, $$\left(1 + \exp(-f^w(x))^{\frac{1}{\sigma^2}} = \frac{1}{\sigma^2}(1 + \exp(-f^w(x))).$$

To generalize to multi-task problem, each class c has a scalar $\sigma_c$, and is embedded in the loss function $$\mathcal{L}_u = \left(\frac{1}{CN} \sum_c \sum_n \frac{1}{\sigma^2} \mathcal{L}_{BCE_{cn}} + \log \sigma_c\right). \quad (13)$$

Focal and uncertainty loss functions are used with the smoothing loss. The mean of all losses of each sample and each class plus the smoothing loss were taken $$\mathcal{L}_{focal} = \mathcal{L}_f + \lambda \mathcal{L}_{T\text{-}MSE} \quad (14)$$

$$\mathcal{L}_{uncertainty} = \mathcal{L}_u + \lambda \mathcal{L}_{T\_MSE} \quad (15)$$

$$\mathcal{L}_{focal\text{-}uncertainty} = \mathcal{L}_f + \mathcal{L}_u + \lambda \mathcal{L}_{T\text{-}MSE}, \quad (16)$$

where λ is a constant. In all experiments, γ=2, λ=0.15 and $\mathcal{T}$ =16 were used with the smoothing loss.

The bundled camera path algorithm divides a frame into several meshes. At each mesh, the algorithm estimates localized camera motion by computing local homography for each mesh. This homography is constrained by a shape-preserving term so that the final warp of the image is not strongly distorted.

In example embodiments, the amount of shape regularization can be controlled by a factor α. The factor α may be a threshold used to ensure smooth camera paths between cells, to improve occlusion and camera depth variation which happen very often in laparoscopic procedures. In some embodiments, for example, the factor α is fixed at a value of 3, providing a smoothness increase. Utilizing a fixed factor α, in comparison to an adapted factor α, which is determined empirically by computing the fitting error using a range, is more efficient or reduces latency to an acceptable threshold. In example embodiments, oriented FAST and Rotated BRIEF (Binary Robust Independent Elementary Features) (ORB) features are used for model estimation, potentially providing decreased latency when compared to SURF features.

Once camera paths are estimated by the bundled camera path algorithm, the camera paths are optimized so that the camera motion is smooth. According to some example embodiments, a discontinuity-preserving term (smoothing term) is used to preserve motion discontinuity ($G_m$). The discontinuity-preserving term prevents cropping for a quickly panning scene. In example embodiments, the discontinuity-preserving term is computed using a Gaussian distribution ($\sigma^2=800$) of the sum of transition in camera position which may produce smoother stabilized frames, and more consistent frames without the need of large cropping.

In example embodiments, the discontinuity-preserving term can be controlled by a parameter λ, that is not adapted. In example embodiments, the parameter λ is fixed value of λ=3, which may provide performance about a required threshold. The parameter λ with a fixed value of λ=3 may speed up the stabilization process threefold. The discontinuity-preserving term may be controlled by an adaptive parameter λ. Where an adapted parameter λ is used, cropping and distortion ratios as a measure of the stabilization quality are computed at each λ until the ratios are both below certain thresholds.

It was noted that the bundled camera path algorithm qualitatively generates the best results. The stabilization results are acceptable with some cropping and distortion to the original frames. These experiments were performed on an Intel i7-6850K 3.6 GHZ 12-Core machine with 32 GB RAM. The feature extraction, model estimation, camera path optimization, and warping and rendering take 107 ms, 11.7 ms, 82 ms, and 48 ms respectively. While stabilizing laparoscopic videos, each frame was divided into a 8×8 mesh grid for stabilization because the training image has a resolution of 224×400 as opposed to the original resolution of 1280×720. During camera optimization, all 50 frames were considered used in feature extraction in the smoothing term.

The evaluation metrics were grouped into frame-wise and event-wise metrics. For comparing task performance, results of individual detection were reported. For comparing model performance, the mean value of all tasks was used.

To report frame-wise metrics, area under ROC curves (AUC), and average precision (AP), were used. To compare model performance, the mean value of AUC and AP of all classes was considered.

$$mAUC = \frac{\sum_c AUC_c}{C}, mAP_{frame} = \frac{\sum_c AP_c}{C}, \quad (17)$$

where C is the number of classes.

For event-wise metrics, segmental F1 scores were used at intersection over union (IOU) thresholds of 0.1, 0.25, and 0.5, as used in MS-TCN evaluation and SS-TCN evaluation. In conformity with the experiment, it is found that the segmental F1 score is qualitatively more robust than mAP measuring at each IOU in action recognition evaluation.

In addition to these metrics, the mean value of the segmental F1 scores were taken for task-performance comparison and model-performance comparison.

$$mF1 = \frac{\sum_{IOU} \sum_c F1_{IOU,c}}{N_{IOU}C}, \quad (18)$$

where $N_{IOU}$ is the number of IOU thresholds, and C is the number of classes. It was shown that mF1 share the same performance comparison result as mAP@k metrics where k is an IOU threshold. Both mF1 and mAP are an indication of a model performance relative to another model. However, they do not reflect the model's real-world performance. The best precision and recall of each model were computed based on probability threshold and IOU threshold selected during validation.

OR Setting

FIG. 9 illustrates a schematic of an architectural platform 10 for data collection in a live OR setting or patient intervention area, in accordance with some embodiments. Further details regarding data collection and analysis are provided in International (PCT) Patent Application No. PCT/CA2016/000081 entitled "OPERATING ROOM BLACK-BOX DEVICE, SYSTEM, METHOD AND COMPUTER READABLE MEDIUM FOR EVENT AND ERROR PREDICTION" and filed Mar. 26, 2016 and International (PCT) Patent Application No. PCT/CA2015/000504, entitled "OPERATING ROOM BLACK-BOX DEVICE, SYSTEM, METHOD AND COMPUTER READABLE MEDIUM" and filed Sep. 23, 2015, the entire contents of each of which is hereby incorporated by reference.

The data collected relating to the handwashing activity may be correlated and/or synchronized with other data collected from the live OR setting by the platform 10. For example, a hand washing activity for a particular individual participating in a surgery can be linked and/or synchronized with other data collected from the live OR setting for the surgery. This can also include data post-surgery, such as data related to the outcome of the surgery.

The platform 10 can collect raw video data for processing in order to detect bleeding episodes and severity estimations as described herein. The output data (e.g., bleeding episodes and severity estimations) can be aggregated with other data collected from the live OR setting for the surgery or otherwise generated by platform 10 for analytics.

The platform 10 includes various hardware components such as a network communication server 12 (also "network server") and a network control interface 14 (including monitor, keyboard, touch interface, tablet, processor and storage device, web browser) for on-site private network administration.

Multiple processors may be configured with operating system and client software (e.g., Linux, Unix, Windows Server, or equivalent), scheduling software, and backup software. Data storage devices may be connected on a storage area network.

The platform 10 can include a surgical or medical data encoder 22. The encoder may be referred to herein as a data recorder, a "black-box" recorder, a "black-box" encoder, and so on. Further details will be described herein. The platform 10 may also have physical and logical security to prevent unintended or unapproved access. A network and signal router 16 connects components.

The platform 10 includes hardware units 20 that include a collection or group of data capture devices for capturing and generating medical or surgical data feeds for provision to encoder 22. The hardware units 20 may include cameras 30 (e.g., including cameras for capturing video for bleeding detection and severity estimation) internal to patient to capture video data for provision to encoder 22. The encoder 22 can implement the bleeding detection and severity estimation described herein in some embodiments. The video feed may be referred to as medical or surgical data. An example camera 30 is a laparoscopic or procedural view camera resident in the surgical unit, ICU, emergency unit or clinical intervention units. Example video hardware includes a distribution amplifier for signal splitting of Laparoscopic cameras. The hardware units 20 can have audio devices 32 mounted within the surgical unit, ICU, emergency unit or clinical intervention units to provide audio feeds as another example of medical or surgical data. Example sensors 34 installed or utilized in a surgical unit, ICU, emergency unit or clinical intervention units include but not limited to: environmental sensors (e.g., temperature, moisture, humidity, etc., acoustic sensors (e.g., ambient noise, decibel), electrical sensors (e.g., hall, magnetic, current, mems, capacitive, resistance), flow sensors (e.g., air, fluid, gas) angle/positional/displacement sensors (e.g., gyroscopes, altitude indicator, piezoelectric, photoelectric), and other sensor types (e.g., strain, level sensors, load cells, motion, pressure). The sensors 34 provide sensor data as another example of medical or surgical data. The hardware units 20 also include patient monitoring devices 36 and an instrument lot 18.

The customizable control interface 14 and GUI (may include tablet devices, PDA's, hybrid devices, convertibles, etc.) may be used to control configuration for hardware components of unit 20. The platform 10 has middleware and hardware for device-to-device translation and connection and synchronization on a private VLAN or other network. The computing device may be configured with anonymization software, data encryption software, lossless video and data compression software, voice distortion software, transcription software. The network hardware may include cables such as Ethernet, RJ45, optical fiber, SDI, HDMI, coaxial, DVI, component audio, component video, and so on to support wired connectivity between components. The network hardware may also have wireless base stations to support wireless connectivity between components.

The platform 10 can include anonymization software for anonymizing and protecting the identity of all medical professionals, patients, distinguishing objects or other features in a medical, clinical or emergency unit. This software implements methods and techniques to detect facial, distinguishing objects, or other features in a medical, clinical or emergency unit and may distort or blur the image of the distinguishing element. The extent of the distortion or blur is limited to a localized area, frame by frame, in which both protecting individual identity and the quality of the analytics are considered. The software can be used for anonymizing hand washing activity video data as well.

Data encryption software may execute to encrypt computer data in such a way that it cannot be recovered without access to the key. The content may be encrypted at source as individual streams of data or encrypted as a comprehensive container file for purposes of storage on an electronic medium (i.e., computer, storage system, electronic device) and/or transmission over internet 26. Encrypt/decrypt keys may either be embedded in the container file and accessible through a master key, or transmitted separately.

Lossless video and data compression software executes with a class of data compression techniques that allows the original data to be perfectly or near perfectly reconstructed from the compressed data.

Device middleware and hardware may be provided for translating, connecting, formatting and synchronizing of independent digital data streams from source devices. The platform 10 may include hardware, software, algorithms and methods for the purpose of establishing a secure and reliable connection and communication directly, or indirectly (via router, wireless base station), with the OR encoder 22, and third-party devices (open or proprietary) used in a surgical unit, ICU, emergency or other clinical intervention unit.

The hardware and middleware may assure data conformity, formatting and accurate synchronization. Synchronization may be attained by utilizing networking protocols for clock synchronization between computer systems and electronics devices over packet-switched networks like NTP, etc.

The encoder 22 can implement the bleeding detection and severity estimation described herein in some embodiments. The encoder 22 can provide video data and other data to another server for bleeding detection and severity estimation described herein in some embodiments. The OR or Surgical encoder (e.g., encoder 22) may be a multi-channel encoding device that records, integrates, ingests and/or synchronizes independent streams of audio, video, and digital data (quantitative, semi-quantitative, and qualitative data feeds) into a single digital container. The digital data may be ingested into the encoder as streams of metadata and is sourced from an array of potential sensor types and third-party devices (open or proprietary) that are used in surgical, ICU, emergency or other clinical intervention units. These sensors and devices may be connected through middleware and/or hardware devices which may act to translate, format and/or synchronize live streams of data from respected sources.

The Control Interface (e.g., 14) may include a Central control station (non-limiting examples being one or more computers, tablets, PDA's, hybrids, and/or convertibles, etc.) which may be located in the clinical unit or another customer designated location. The Customizable Control Interface and GUI may contain a customizable graphical user interface (GUI) that provides a simple, user friendly and functional control of the system.

The encoder 22 may be responsible for synchronizing all feeds, encoding them into a signal transport file using lossless audio/video/data compression software. Upon completion of the recording, the container file will be securely encrypted. Encrypt/decrypt keys may either be embedded in the container file and accessible through a master key, or transmitted separately. The encrypted file may either be stored on the encoder 22 or stored on a Storage area network until scheduled transmission.

According to some embodiments, this information then may be synchronized (e.g., by the encoder 22) and/or used to evaluate: technical performance of the healthcare providers; non-technical performance of the clinical team members; patient safety (through number of registered errors and/or adverse events); occupational safety; workflow; visual and/or noise distractions; and/or interaction between medical/surgical devices and/or healthcare professionals, etc. According to some embodiments, this may be achieved by using objective structured assessment tools and questionnaires and/or by retrieving one or more continuous data streams from sensors 34, audio devices 32, an anesthesia device, medical/surgical devices, implants, hospital patient administrative systems (electronic patient records), or other data capture devices of hardware unit 20. According to some embodiments, significant "events" may be detected, tagged, time-stamped and/or recorded as a time-point on a timeline that represents the entire duration of the procedure and/or clinical encounter. The timeline may overlay captured and processed data to tag the data with the time-points. In some embodiments, the events may be bleeding events or bleeding episodes.

Upon completion of data processing and analysis, one or more such events (and potentially all events) may be viewed on a single timeline represented in a GUI, for example, to allow an assessor to: (i) identify event clusters; (ii) analyze correlations between two or more registered parameters (and potentially between all of the registered parameters); (iii) identify underlying factors and/or patterns of events that lead up to adverse outcome; (iv) develop predictive models for one or more key steps of an intervention (which may be referred to herein as "hazard zones") that may be statistically correlated to error/adverse event/adverse outcomes, v) identify a relationship between performance outcomes and clinical costs. These are non-limiting examples of uses an assessor may make of a timeline presented by the GUI representing recorded events.

Analyzing these underlying factors according to some embodiments may allow one or more of: (i) proactive monitoring of clinical performance; and/or (ii) monitoring of performance of healthcare technology/devices (iii) creation of educational interventions—e.g., individualized structured feedback (or coaching), simulation-based crisis scenarios, virtual-reality training programs, curricula for certification/ re-certification of healthcare practitioners and institutions; and/or identify safety/performance deficiencies of medical/ surgical devices and develop recommendations for improvement and/or design of "intelligent" devices and implants—to curb the rate of risk factors in future procedures and/or ultimately to improve patient safety outcomes and clinical costs.

The device, system, method and computer readable medium according to some embodiments, may combine capture and synchronization, and secure transport of video/ audio/metadata with rigorous data analysis to achieve/demonstrate certain values. The device, system, method and computer readable medium according to some embodiments may combine multiple inputs, enabling recreation of a full picture of what takes place in a clinical area, in a synchronized manner, enabling analysis and/or correlation of these factors (e.g., between factors or with external outcome parameters, such as clinical or economical parameters). The system may bring together analysis tools and/or processes and using this approach for one or more purposes, examples of which are provided herein.

Beyond development of a data platform 10, some embodiments may also include comprehensive data collection and/ or analysis techniques that evaluate multiple aspects of any procedure including video data internal to the patient for adverse event detection and severity estimation. One or more aspects of embodiments may include recording and analysis of video, audio and metadata feeds in a synchronized fashion. The data platform 10 may be a modular system and not limited in terms of data feeds—any measurable parameter in the OR/patient intervention areas (e.g., data captured by various environmental acoustic, electrical, flow, angle/positional/displacement and other sensors, wearable technology video/data stream, etc.) may be added to the data platform 10. One or more aspects of embodiments may include analyzing data using validated rating tools which may look at different aspects of a clinical intervention.

According to example embodiments, a distribution of labelled frames representative of laparoscopic procedures is shown in Table 7 below:

TABLE 7

Distribution of events, frames, and windows in each task. The number of windows indicates the number of 10-second (50 frames) sliding windows

| Task | Blood | | Bleeding | | Burn | | Thermal Injury | | Background | |
| --- | --- | --- | --- | --- | --- | --- | --- | --- | --- | --- |
| # Events | N/A | N/A | 1,450 | 11.6% | N/A | N/A | 11,079 | 88.4% | N/A | N/A |
| # Frames | 13,940,462 | 51.8% | 203,809 | 0.8% | 1,723,831 | 6.4% | 938,583 | 3.5% | 10,118,163 | 37.6% |
| # Windows | 2,788,092 | 51.8% | 40,762 | 0.8% | 344,766 | 6.4% | 187,717 | 3.5% | 2,023,633 | 37.6% |

The dataset of Table 7 includes 130 gastric bypass laparoscopic procedures using OR BlackBox™. The procedures range from 45 minutes to 3 hours long. Three trained surgeons labelled every frame of these cases with the labels. As a result, 24,637,433 frames, and 12,529 unique bleeding and thermal events are represented in Table 7. Table 7 shows the distribution of each label. Blood labels dominate the distribution, accounting for 51.8% of all frames, whereas bleeding, burn, and thermal injuries combine for less than 11%. Among individual active events, the majority are thermal injury (88.4%). The four labels can appear simultaneously in the same frame. If a frame has none of the above, it is a no-event background frame. Therefore, this detection is a multi-task problem.

In an example embodiment, similar to the systems described in FIGS. 4A and 4B, for 2DCNN, the InceptionV3 network was used with pre-trained ImageNet weights. This network was fine-tuned using the dataset described in Tables 7. A mini-batch size of 64 samples was used. Classes were randomly sampled from the dataset so that each mini-batch has a similar number of samples from each class. The model loss converges after 100 epochs.

The I3D network is pre-trained on the ImageNet and Kinetics datasets. 10-second window (50 frames) were sampled as one training sample at 5 fps with a stride of 1 frame. To balance the dataset, samples were categorized by combined labels, as listed in Table 8 (shown below) instead of by each label. There are 12 possible combinations of labels, or 'classes'. For example, class [1 1 1 0] has positive blood, positive bleeding, positive burn, and no thermal injury. The impossible combinations are discarded (e.g., a frame with no blood, but positive bleeding is not possible). Classes with fewer frames were over sampled using random over-sampling, randomly selecting a sample to duplicate, and the rest of the classes were under-sampled so to ensure the same number of frames (150,000 frames). A mini-batch size of 8 windows was used for training the systems. Similar to 2DCNN, each mini-batch has similar number of samples from each class. The model loss converges after 50 epochs.

TABLE 8

Distribution of frames in each class. Each class represents a unique combination of tasks

| Class | Blood | Bleeding | Burn | Thermal Injury | # Frames |
|---|---|---|---|---|---|
| 0 0 0 0 | Off | Off | Off | Off | 10,113,103 |
| 0 0 0 1 | Off | Off | Off | On | 277,806 |
| 0 0 1 0 | Off | Off | On | Off | 272,719 |
| 0 0 1 1 | Off | Off | On | On | 98,983 |
| 1 0 0 0 | On | Off | Off | Off | 10,941,450 |
| 1 0 0 1 | On | Off | Off | On | 445,355 |
| 1 0 1 0 | On | Off | On | Off | 1,203,348 |
| 1 0 1 1 | On | Off | On | On | 127,454 |
| 1 1 0 0 | On | On | Off | Off | 1,080,771 |
| 1 1 0 1 | On | On | Off | On | 50,057 |
| 1 1 1 0 | On | On | On | Off | 82,399 |
| 1 1 1 1 | On | On | On | On | 9,628 |
| | | | | Total | 24,637,433 |

Table 8, shown below, provides the sample distribution of the highly unbalanced data set wherein the categories shown in Table 7 are not shown as independent events.

All models were trained with a stochastic gradient descent optimizer with an initial learning rate of 0.001, and a step-wise decay rate of 0.95 (i.e., learning rate of next epoch is 95% of the one in the current epoch). Five-fold cross-validation was used to select the best epoch and threshold to use in the testing phase. All models have a sigmoid function as their final activation function to generate logits. The loss functions in optimization are different from the model's original implementation. Experiments were performed on a GTX Titan V GPU with 12 GB memory and 32 GB RAM.

An ablation study was performed to show the effect of various terms of the loss function, including focal, uncertainty, normal, and a regular focal-uncertainty loss term less a term for truncated mean square error loss (referred to herein as a "notmse" loss term) on the performance of various models.

Figure 10A:
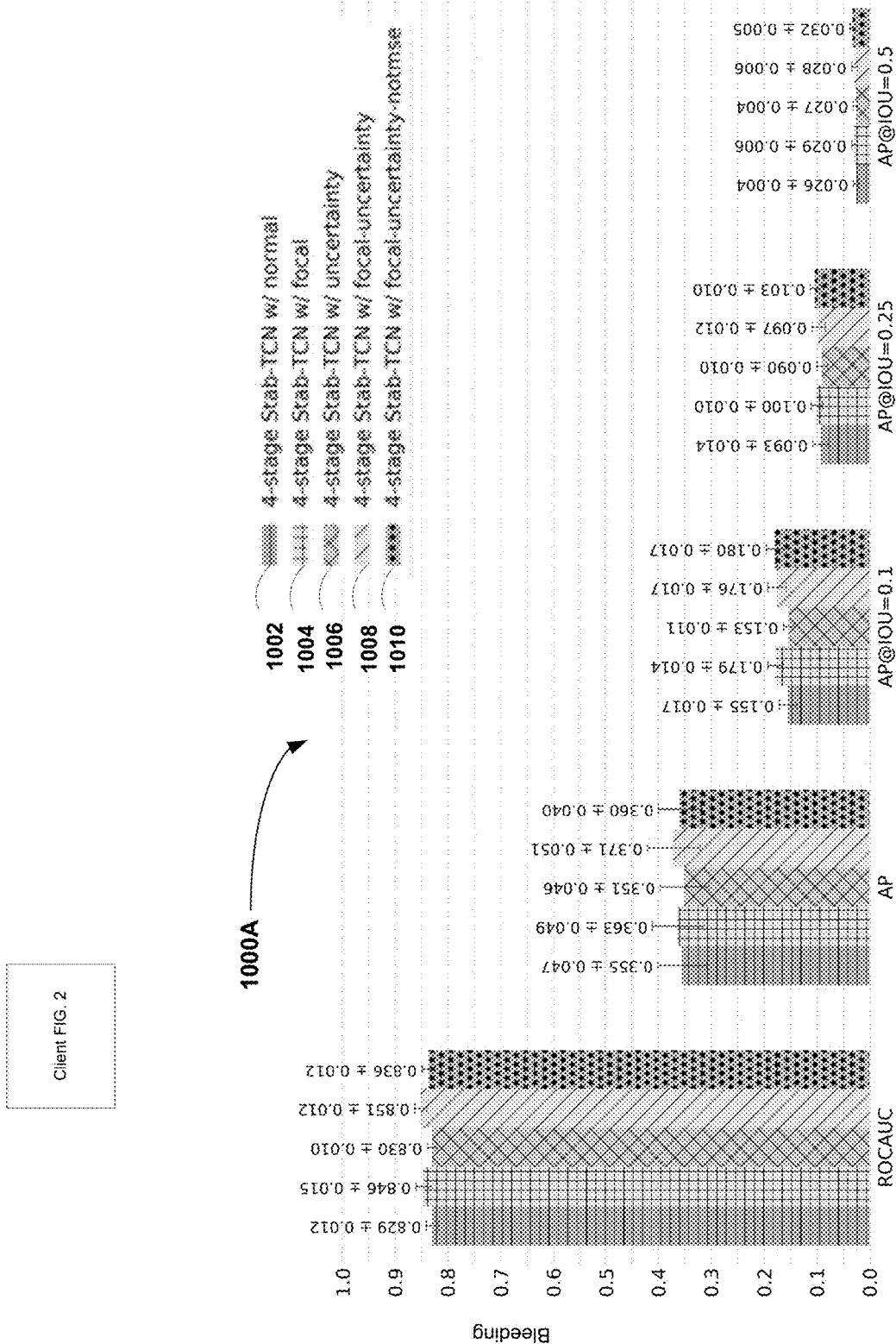
FIG. 10A illustrates, in a bar diagram, an example loss function bar comparison for bleeding detection with different loss functions, in accordance with some embodiments.

FIG. 10A shows a comparison bar diagram 1000A, illustrating the loss from various models for detection of thermal injury detection where the models are configured with different loss functions and thresholds, based on the dataset of Table 7. Bars 1002, 1004, 1006, 1008, and 1010, represent a four stage TCN with stabilization and a normal term loss function, a four stage TCN with stabilization and a focal term loss function, a four stage TCN with stabilization and an uncertainty term loss function, a four stage TCN with stabilization and a normal and focal loss term in the loss function, a four stage TCN with stabilization and a normal and focal loss term less a notmse loss term in the loss function, respectively.

The losses represented in FIG. 10A are computed over a five-fold cross validation. The performances shown in FIG. 10A are shown using frame-wise area under the ROC curve (ROCAUC), average precision (AP), and event-wise AP at intersections-over-union (IOUs) of 0.1, 0.25, and 0.5 (AP at IOU (AP@IOU)=0.1, 0.25, 0.5). Model performance was evaluated in segmental precision, and recall (i.e., sensitivity).

As shown in FIG. 10A, based on the dataset of Table 7, the focal and uncertainty less T-MSE loss (focal-uncertainty-notmse) has the best overall frame-wise and event-wise metrics with a slightly smaller ROCAUC and AP in bleeding detection. For bleeding detection, combining focal and uncertainty losses achieves a ROCAUC of 0.851, and an AP of 0.371. Compared to a normal loss function, combining the two losses provides a gain of 2.2% in ROCAUC, 1.6% in AP, 2.1% in AP@IOU=0.1, 0.4% in AP@IOU=0.25, and 0.2% in AP@IOU=0.5. Using uncertainty loss alone decreases the model performance in all metrics, and a combination of focal and uncertainty loss provides an increase in ROCAUC by 0.5%, and AP by 0.8%, and a similar performance in AP@k. Moreover, removing the T-MSE loss from the focal and uncertainty loss gives a 0.4%-0.6% increase in event-wise metric AP@k, and a decrease of around 1% in ROCAUC and AP. Overall, the focal loss, the focal and uncertainty loss, and the focal and uncertainty less T-MSE loss provide an increase in model performance compared to the model with normal loss, while they share similar performance in both frame-wise and event-wise metrics.

Figure 10B:
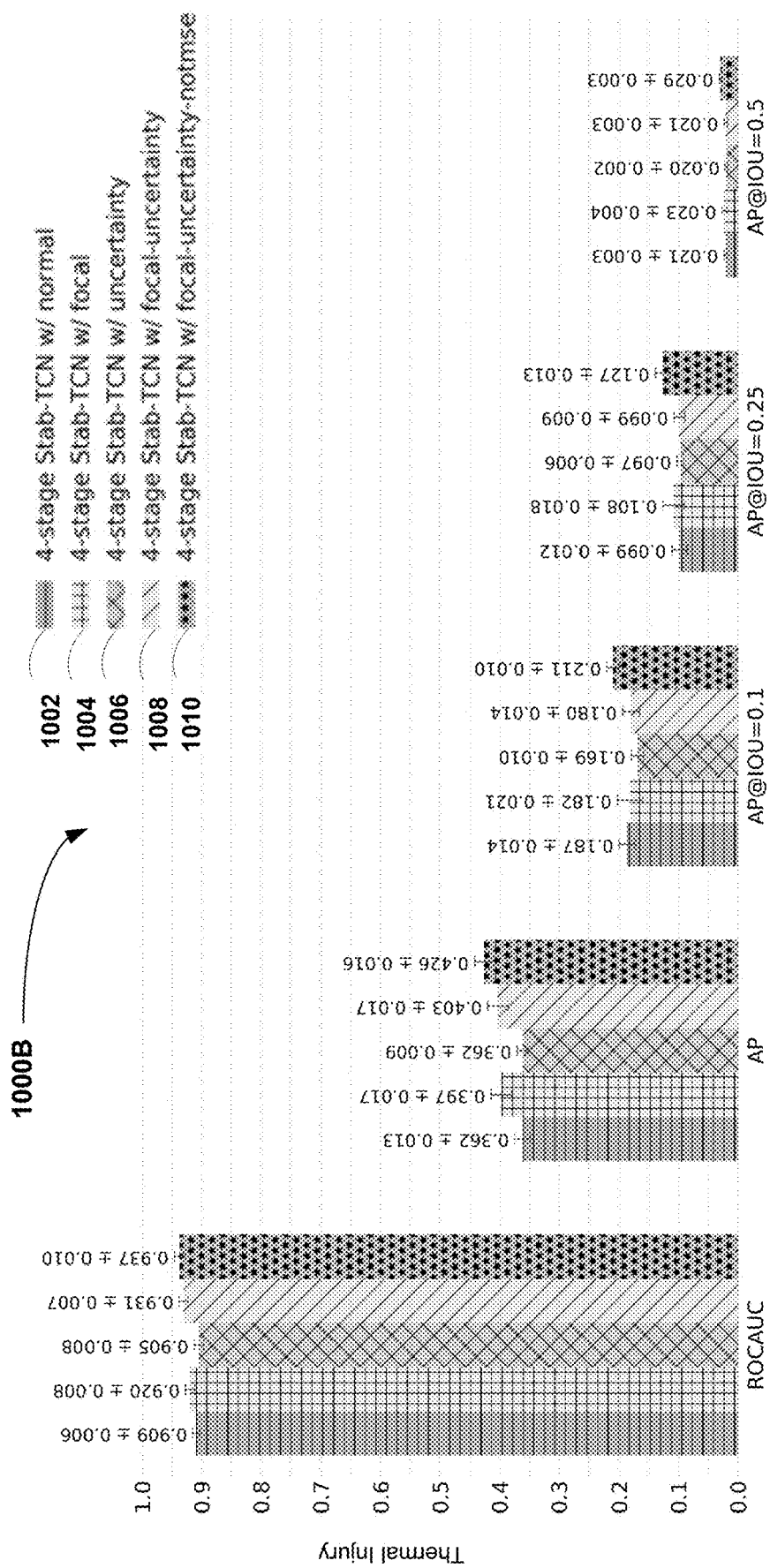
FIG. 10B illustrates, in a bar diagram, an example loss function bar comparison for thermal injury detection with different loss functions, in accordance with some embodiments.

FIG. 10B, which shows a comparison bar diagram 1000B of model performance in thermal injury detection, shares a similar trend to bleeding detection, with the exception of the model with the focal and uncertainty less T-MSE loss, represented by bar 1010. The model with the focal and uncertainty less T-MSE loss, represented by bar 1010 outperforms all the other loss terms significantly in thermal injury detection. Compared to the next best loss, the focal and uncertainty loss, represented by the bar 1008, the focal and uncertainty less T-MSE loss leads to a gain of 0.6% in ROCAUC, 2.3% in AP, 3.1% in AP@IOU=0.1, 2.8% in AP@IOU=0.25, and 0.8% in AP@IOU=0.5, and it achieves a ROCAUC of 0.937, and an AP of 0.426.

Based on the dataset of Table 7, the uncertainty loss does not significantly increase model performance in both tasks. However, removing the T-MSE loss improves the model performance. The T-MSE loss corrects over-segmentation errors by forcing the model to generate as few transitions between events as possible. This leads to the removal of short event segments in detection, acting like a smoothing filter. Unlike action recognition, which always has a long period of actions next to each other, the data set includes long background gap between instances. Using the T-MSE loss eliminates those short instances along with the false positives. As the MS-TCN is already correcting over-segmentation errors over each stage, the T-MSE actually over-corrects the errors and leads to a poorer performance. Therefore, the model without T-MSE may perform better.

Figure 11A:
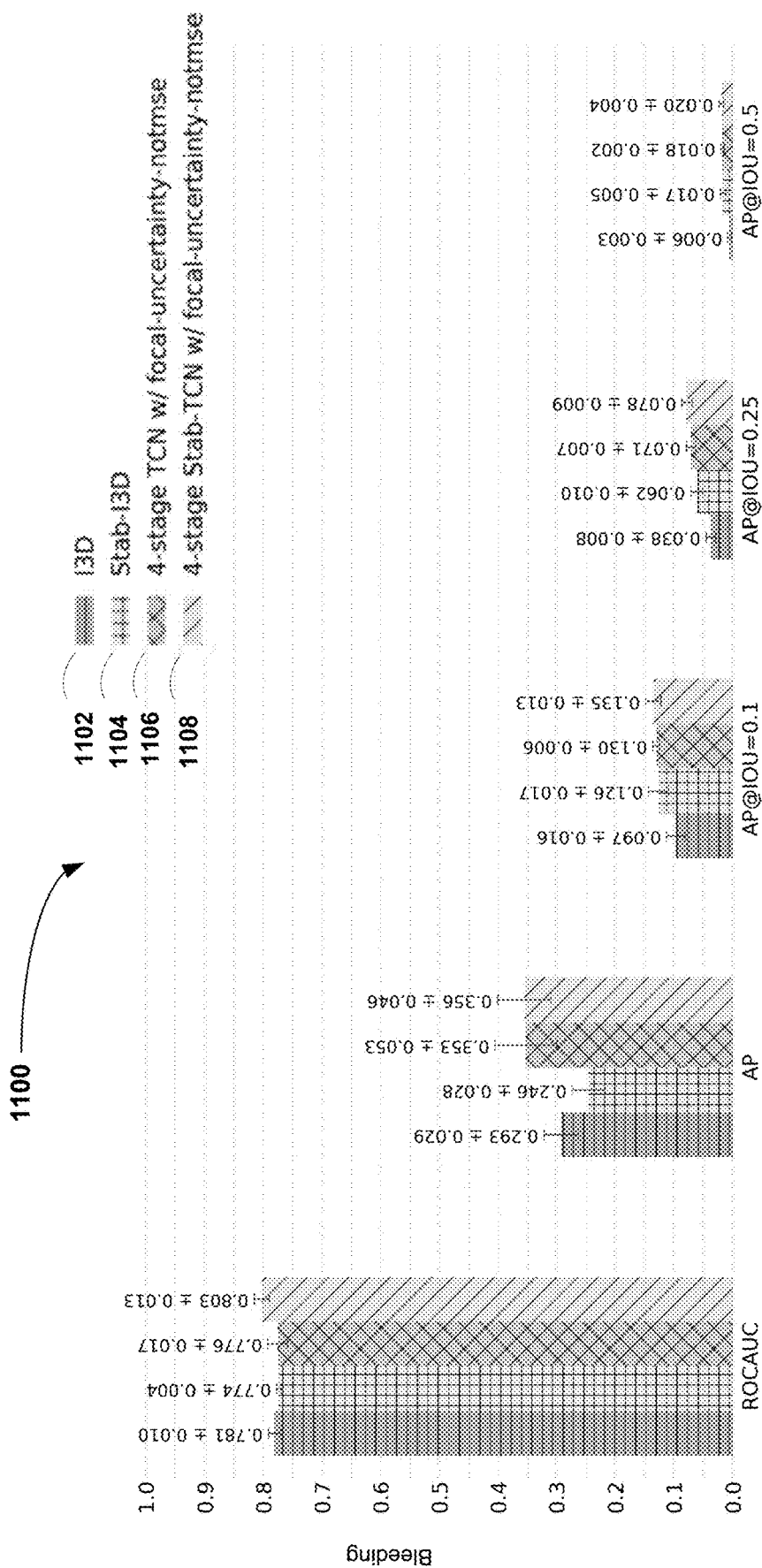
FIG. 11A illustrates, in a bar diagram, an example loss function bar comparison for bleeding injury detection with stabilization incorporated with different loss functions, in accordance with some embodiments.
Figure 11B:
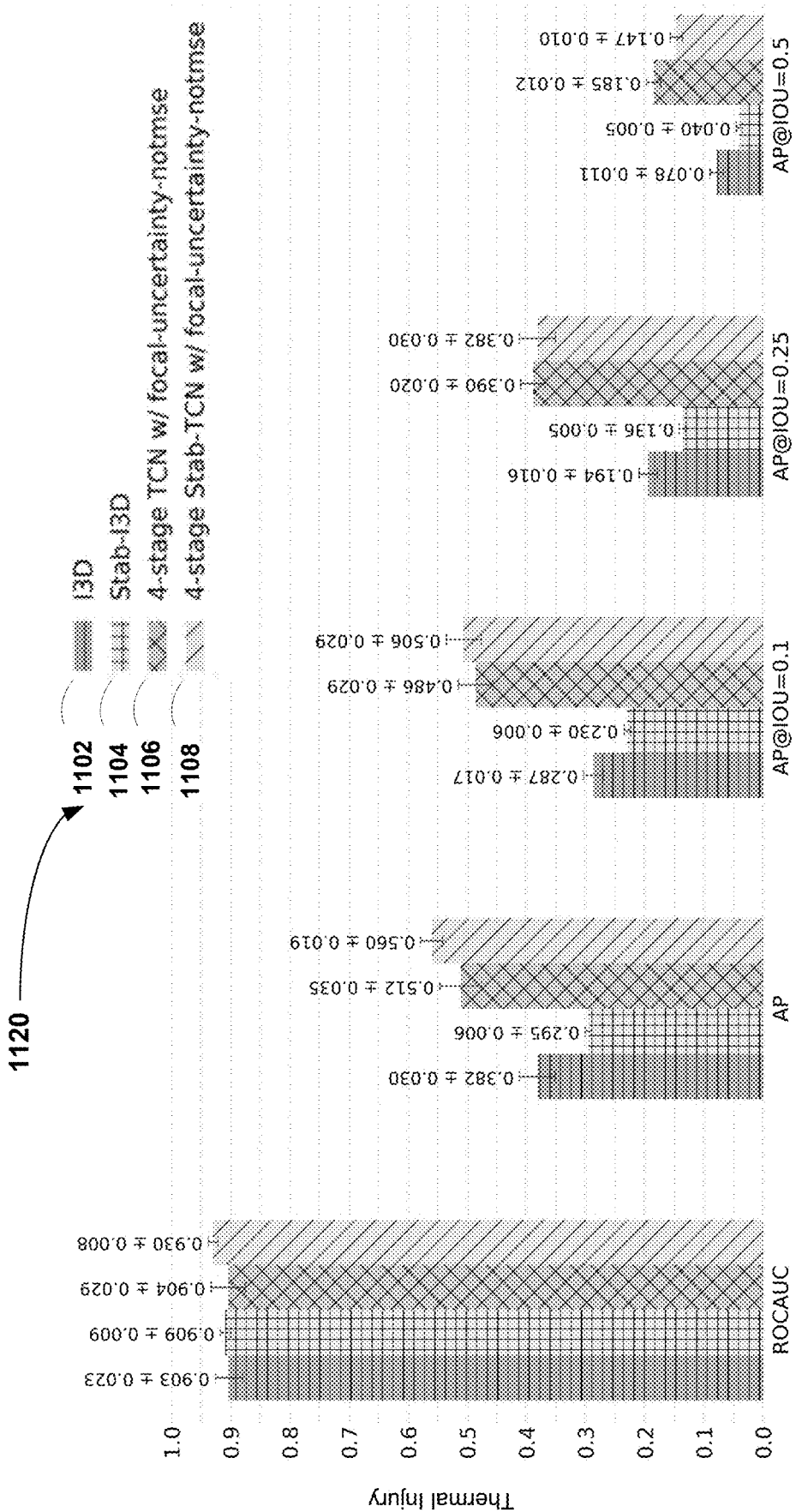
FIG. 11B illustrates, in a bar diagram, an example loss function bar comparison for thermal injury detection with stabilization incorporated with different loss functions, in accordance with some embodiments.
Figure 12A:
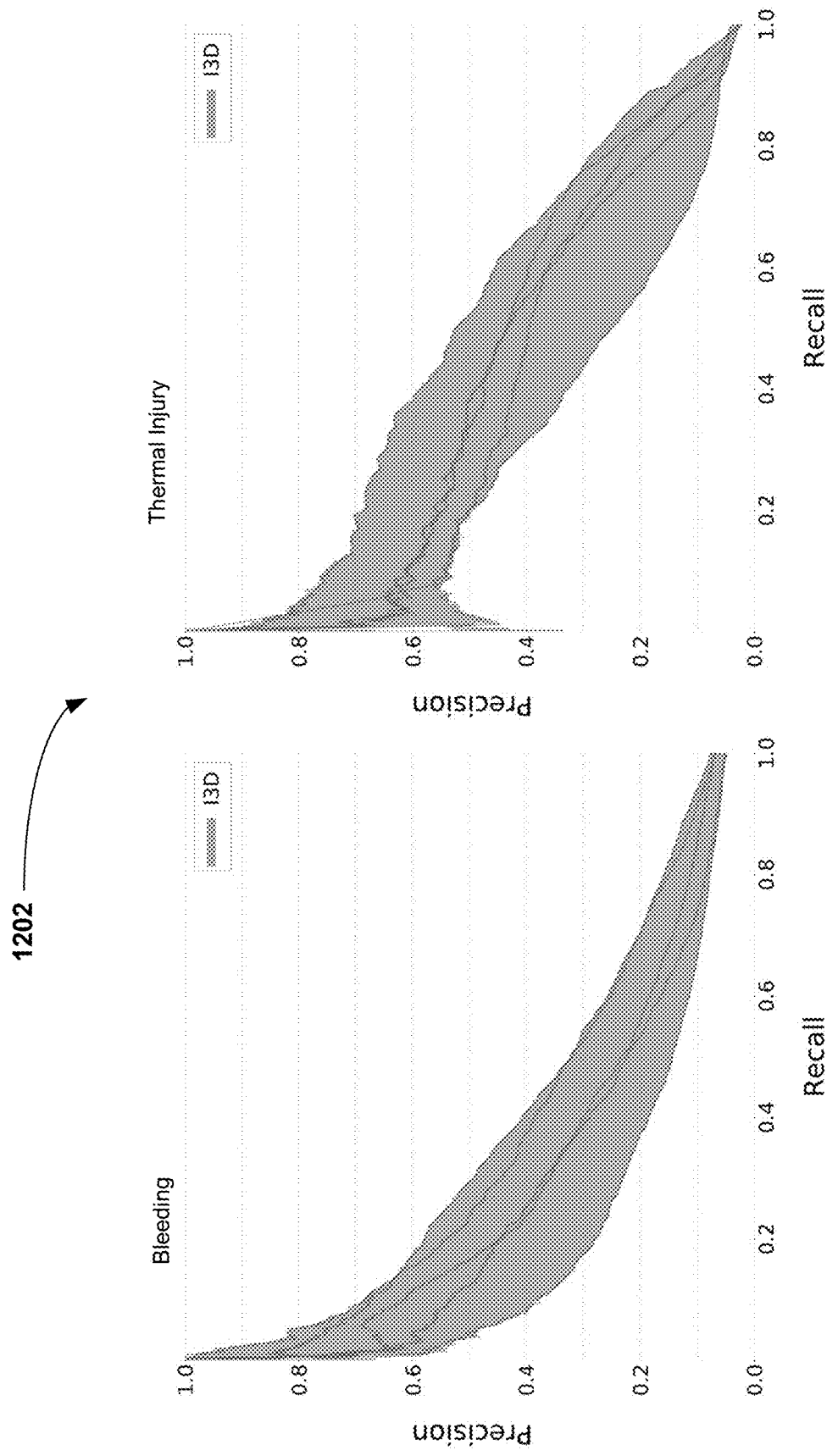
FIG. 12A illustrates, in a plot diagram, an example of a precision-recall curve for an I3D model over all procedures, in accordance with some embodiments.
Figure 12B:
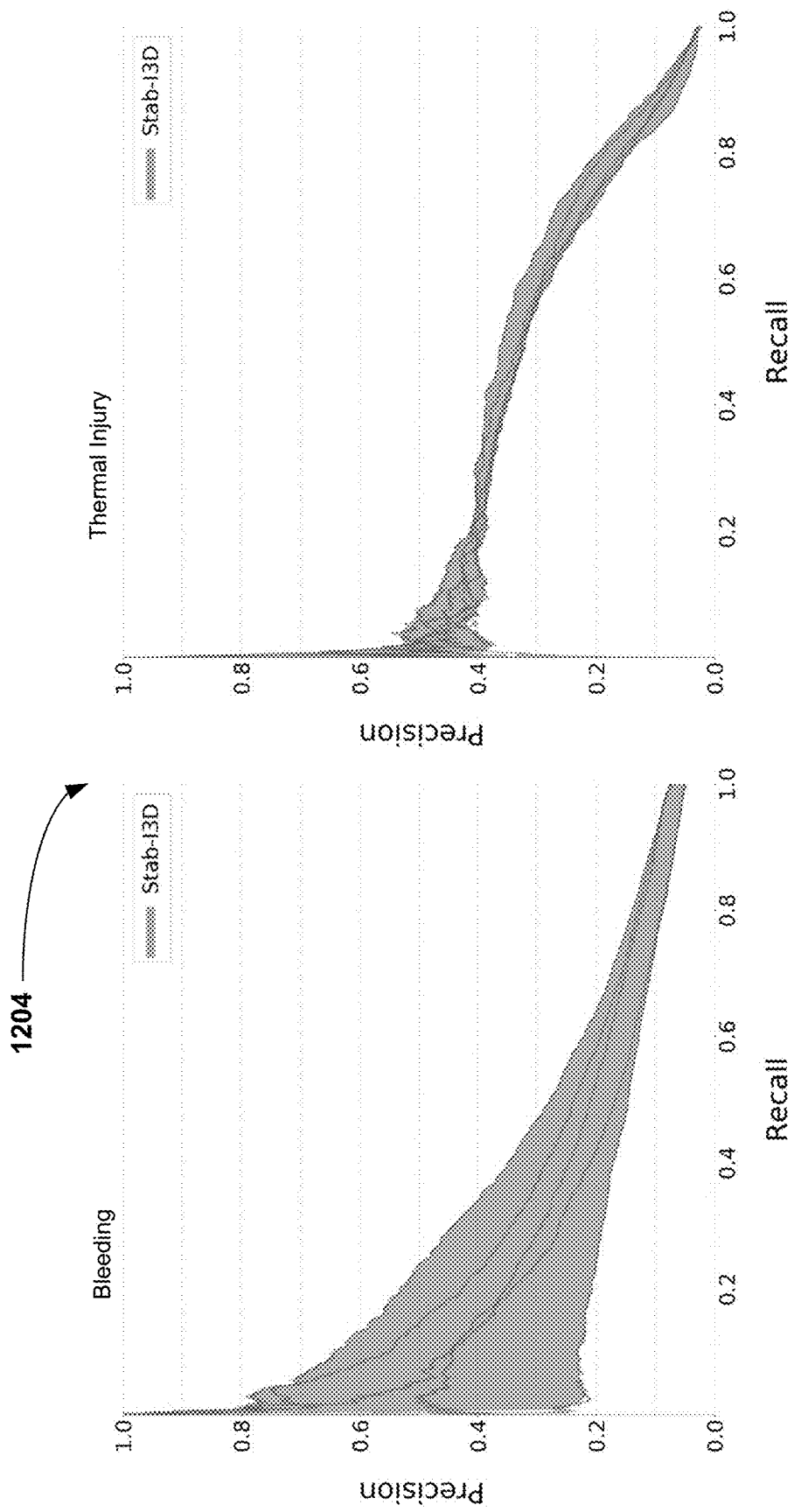
FIG. 12B illustrates, in a plot diagram, an example of a stabilization precision-recall curve for an Stab-I3D model, in accordance with some embodiments.
Figure 12C:
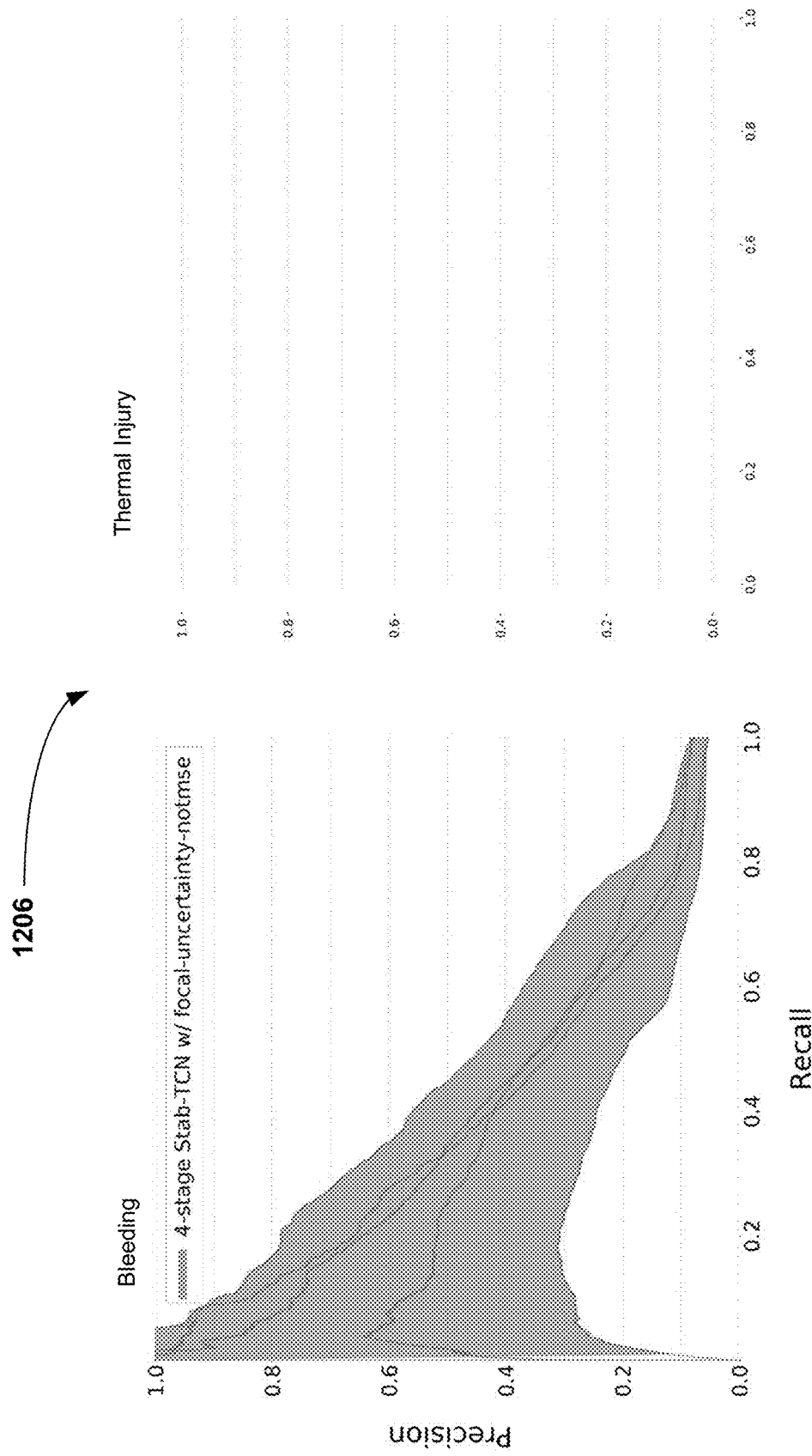
FIG. 12C illustrates, in a plot diagram, an example of a precision-recall curve for a four stage Stab-TCN model with an example loss term for bleeding detection in a test set, in accordance with some embodiments.
Figure 12D:
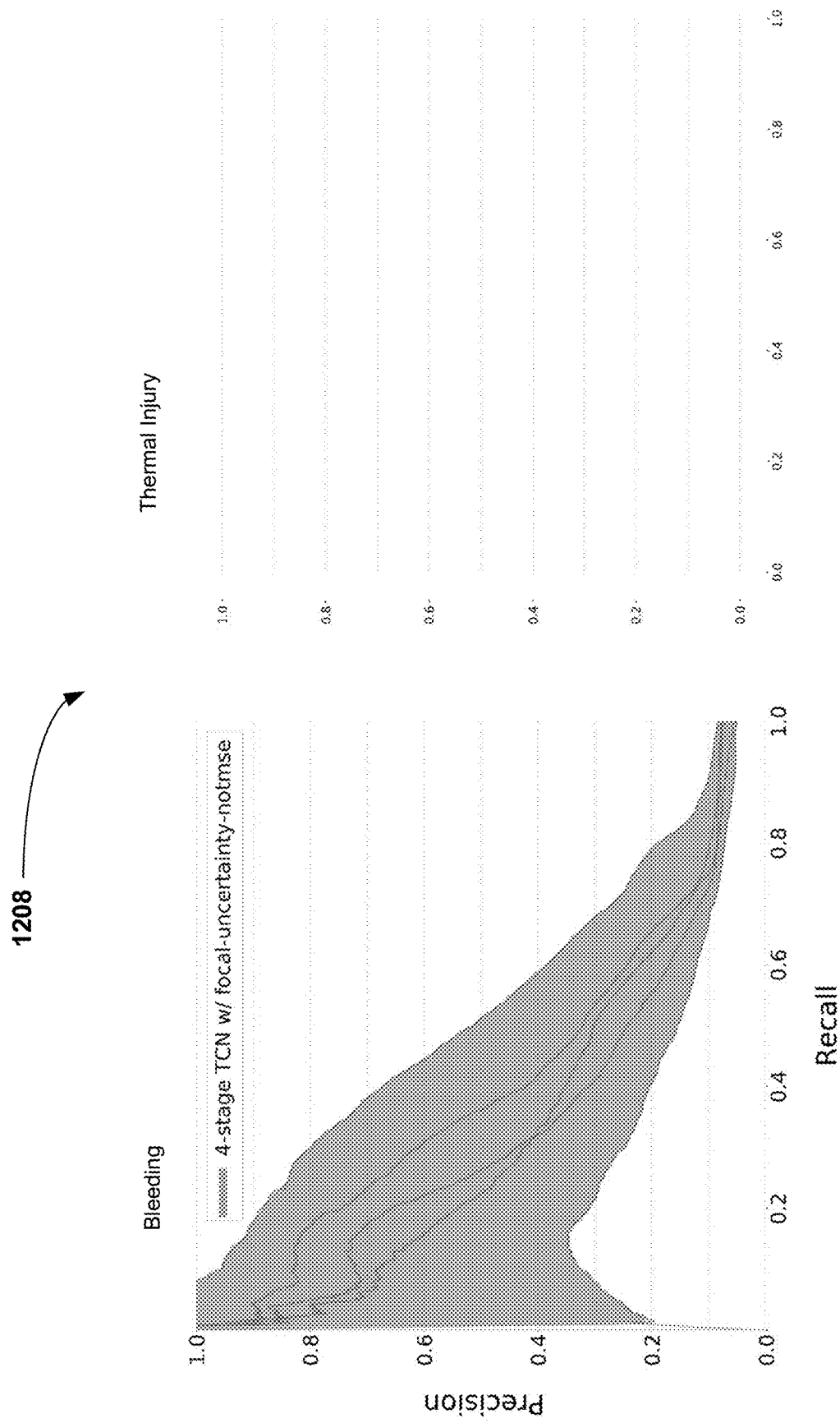
FIG. 12D illustrates, in a plot diagram, an example of a precision-recall curve for a four stage TCN model with another example loss term for bleeding detection, in accordance with some embodiments.
Figure 12E:
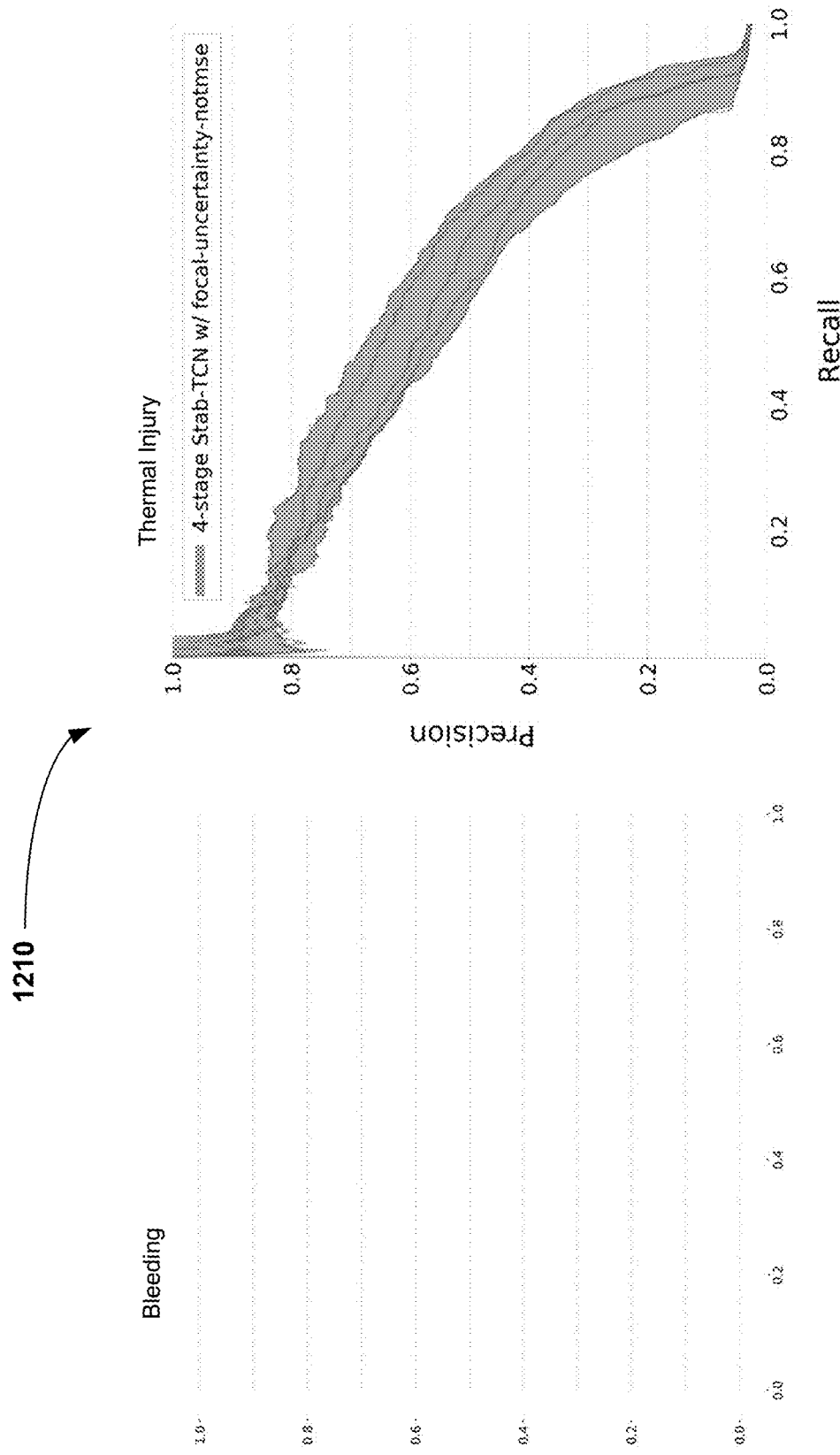
FIG. 12E illustrates, in a plot diagram, an example of a precision-recall curve for a four stage Stab-TCN model with an example loss term for thermal injury detection, in accordance with some embodiments.
Figure 12F:
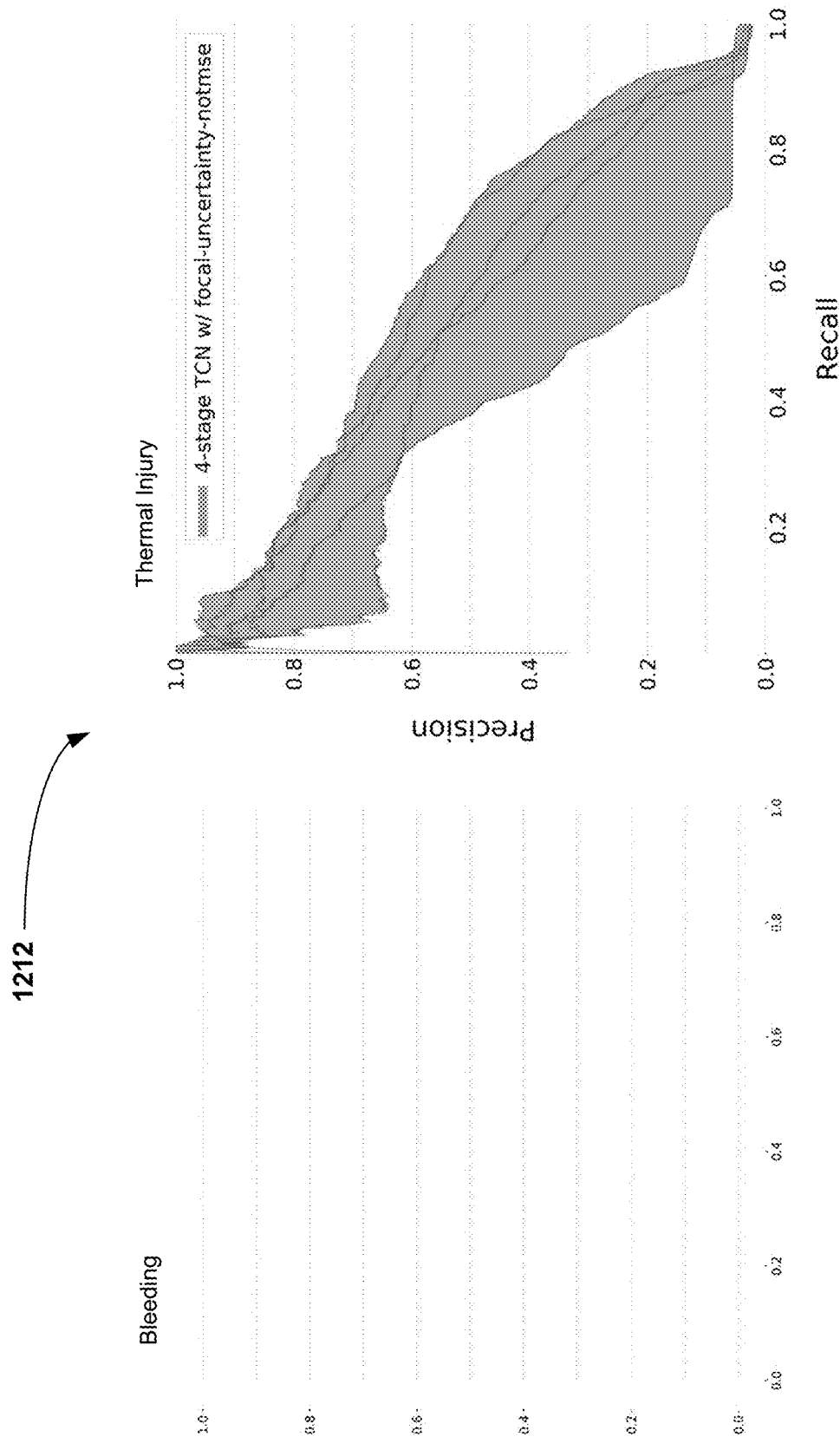
FIG. 12F illustrates, in a plot diagram, an example of a precision-recall curve for a four stage TCN model with another example loss term for thermal injury detection pursuant to a five-fold cross-validation, in accordance with some embodiments.

FIGS. 11A and 11B show comparison bar diagrams 1100A and 1100B for bleeding injury detection with models incorporation stabilization with different loss functions and thresholds for bleeding and thermal injury detection, respectively. Bars 1102, 1104, 1106, and 1108 represent the performance of the I3D model, the Stab-I3D model, a MS-TCN with four stages (four stage TCN) with focal-uncertainty-notmse loss, and a four stage TCN with stabilization with focal-uncertainty-notmse loss, respectively.

Based on the dataset of Table 7, and as shown in FIG. 11A in bleeding detection the I3D model, represented by bar 1102, achieves a ROCAUC of 0.781, and an AP of 0.293, which is 0.7%, and 4.7% higher than those of the Stab-I3D, represented by bar 1104, respectively. However, the Stab-I3D has higher event-wise metric values, with an AP@k of 0.126, 0.062, and 0.017, which are 2.9%, 2.4%, and 1.1% higher than those of the I3D. Both the four stage TCN, and the four stage Stab-TCN have better performance than the I3D, and the Stab-I3D. The four stage Stab-TCN achieves a ROCAUC of 0.803, and an AP of 0.356, which are 2.7%, and 0.3% higher than those of the four stage TCN. With respect to the event-wise metrics, the AP@k of the four stage Stab-TCN are 0.2%-0.7% higher than those of the four stage TCN at 0.35, 0.078, and 0.020.

FIGS. 12A-12F illustrate precision-recall curves of the models for the test data set discussed in FIGS. 11A and 11B with the curves on the left plot representing the precision-recall curves of the models for bleeding detection, and the curves on the right plot representing the precision-recall curves of the models for thermal injury detection. Each of FIGS. 12A-12F provide the results of five cross validations for each model. The shaded area between the five precision recall curves is also shown. As shown in FIGS. 12A-12F the models with stabilization exhibit a smaller area compared the models without stabilization. For example, plot 1206 in FIG. 12C, which shows the precision recall curves for the I3D model, has a larger area compared to the shaded area shown in plot 1208 in FIG. 12D.

Stabilization may generate more consistent results across the folds. Stabilization may increases the event-wise performance of bleeding detection of both the I3D and the four stage TCN, although it can decrease frame-wise performance of the I3D. One possible cause of the decrease is the distortion and cropping of the stabilization algorithm. The bundled-camera path estimation relies on local homography, where small distortion and cropping is inevitable. The over segmentation error correction of the four stage TCN may help to reduce the effect of distortion. Therefore, this effect may not be reflected in the performance of the four stage Stab-TCN.

The model performance in thermal injury detection, as shown on the right side of FIGS. 12A-12F, represents similar results to bleeding detection results for frame-wise metrics. The four stage Stab-TCN has the best frame-wise performance, with a ROCAUC of 0.930, an AP of 0.560. Unlike bleeding detection, the AP@IOU=0.1 of the four stage Stab-TCN is 2% higher than that of the four stage TCN at a value of 0.506. However, the four stage Stab-TCN's AP@IOU=0.25, and AP@IOU=0.5 are down by 0.8%, and 3.8% compared to the four stage TCN. The Stab-I3D has event-wise performance that is poorer than those of the I3D.

On the right of FIGS. 12A-12F are the precision-recall curves of the models on thermal injury detection. Similar to bleeding detection, the models with stabilization has more consistent results across folds with less area in between precision-recall curves of folds.

Stabilization leads to an increase in performance of the four stage TCN, and a decrease in the I3D both frame-wise and event-wise. The possibility that the smoke generated by a thermal device causes distortion in the stabilized clips, and leads to the decrease is unlikely. The size of the window, for example a 10-second window, might be too long for short thermal injury instances to be detected. The performance of the four stage TCN increases in ROCAUC, AP, and AP@IOU=0.1 by using stabilization. However, it drops in AP@IOU=0.25 and AP@IOU=0.5. This is reflected in FIG. 15, discussed herein, where the four stage Stab-TCN is able to detect shorter instances, and break the longer events down to a few shorter events.

Figure 19:
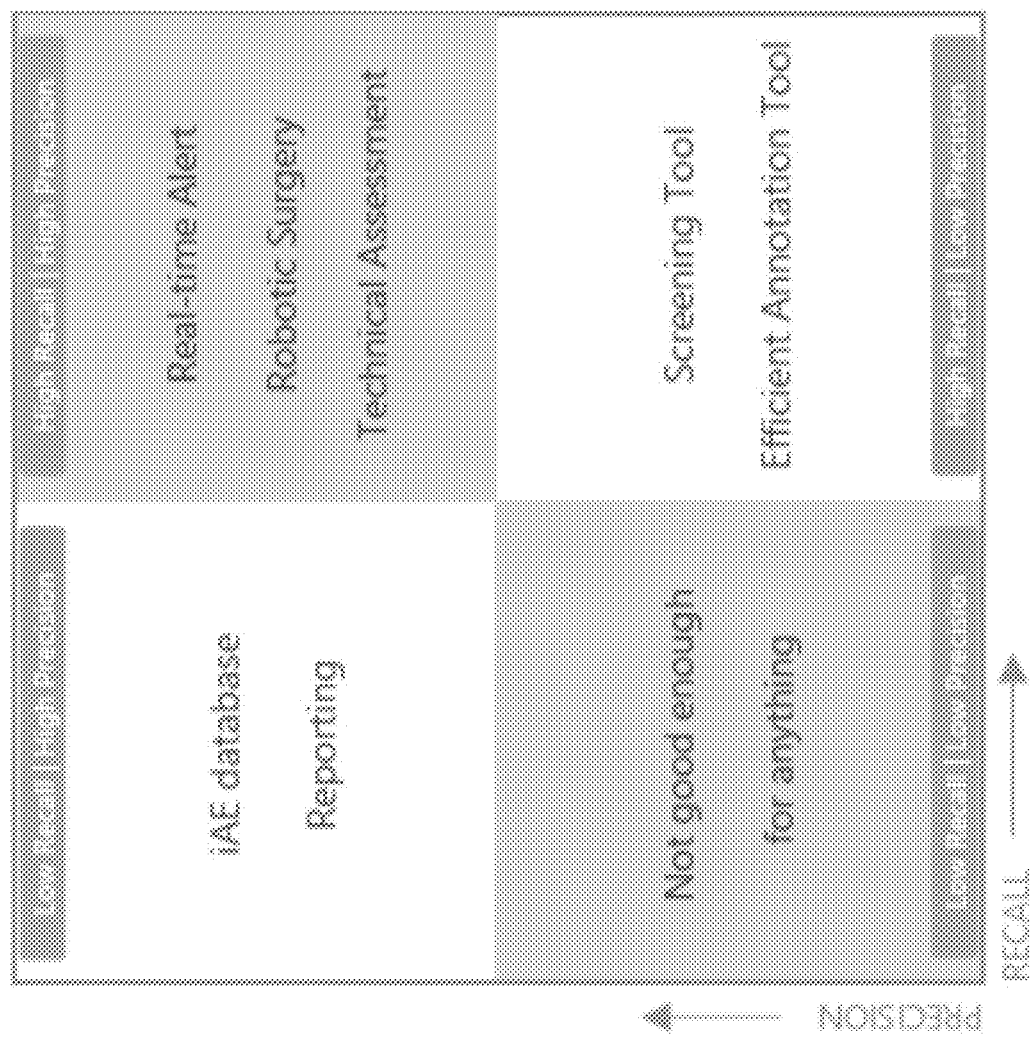
FIG. 19 illustrates, in a diagram, an example of a precision recall plot is shown, according to example embodiments.

Referring now to FIG. 19, a sample precision recall plot having use case quadrants with respect to precision and recall is shown. A high precision indicates that a high fraction of the detection are true positives; a high recall indicates that a high fraction of the true events are detected. Perfect precision and recall gives users confidence to use the system in all scenarios.

With low recall and high precision, the system will miss many true events, but the detection has a high probability to be a true positive. Systems exhibiting low recall and high precision characteristics can be configured to mine data and to collect an intraoperative adverse event database, or as a reporting tool to identify severe adverse events for management team. A model according to example embodiments tested on the dataset of Table 7 has a segmental precision of 0.865±0.076 and a segmental recall of 0.250±0.130 for thermal injury detection, and 0.440±0.106 and 0.143±0.032 for bleeding detection.

Incorporating experts to filter out 13.5% of the thermal injury events and 56% of the bleeding events, which may constitute a few minutes of a procedure, a perfect database may be collected depending on a threshold recall rates that is use case specific.

Systems which exhibit high recall and low precision may detect most true events, but the detection has a high probability of being a false positive. Systems exhibiting high recall and low precision can be configured as a screening tool, to identify all possible events needed to be identified for human review to make the final decisions. For this scenario, an example model based on the dataset of Table 7 results in a segmental precision of 0.698±0.043 and a segmental recall of 0.626±0.064 for thermal injury detection, and 0.241±0.042 and 0.414±0.022 for bleeding detection. In the example model scenario, where a missing rate of 37.4% is acceptable in thermal injury detection, only 30% of the short thermal injury clips will need to be filtered out by the labellers. Example configurations herein may reduce the screening time to review data labelled for review to a few seconds per procedure.

For bleeding detection, in example embodiments, an example system based on the dataset of Table 7 which generates a precision of 41.4%, only 60% of a few minutes of clips may need to be fileted. In circumstances where, the missing rate for bleeding detection is high at a recall of 24.1%, representing a system exhibiting high recall and low precision, the full procedure may require review to achieve perfect recall.

Figure 13A:
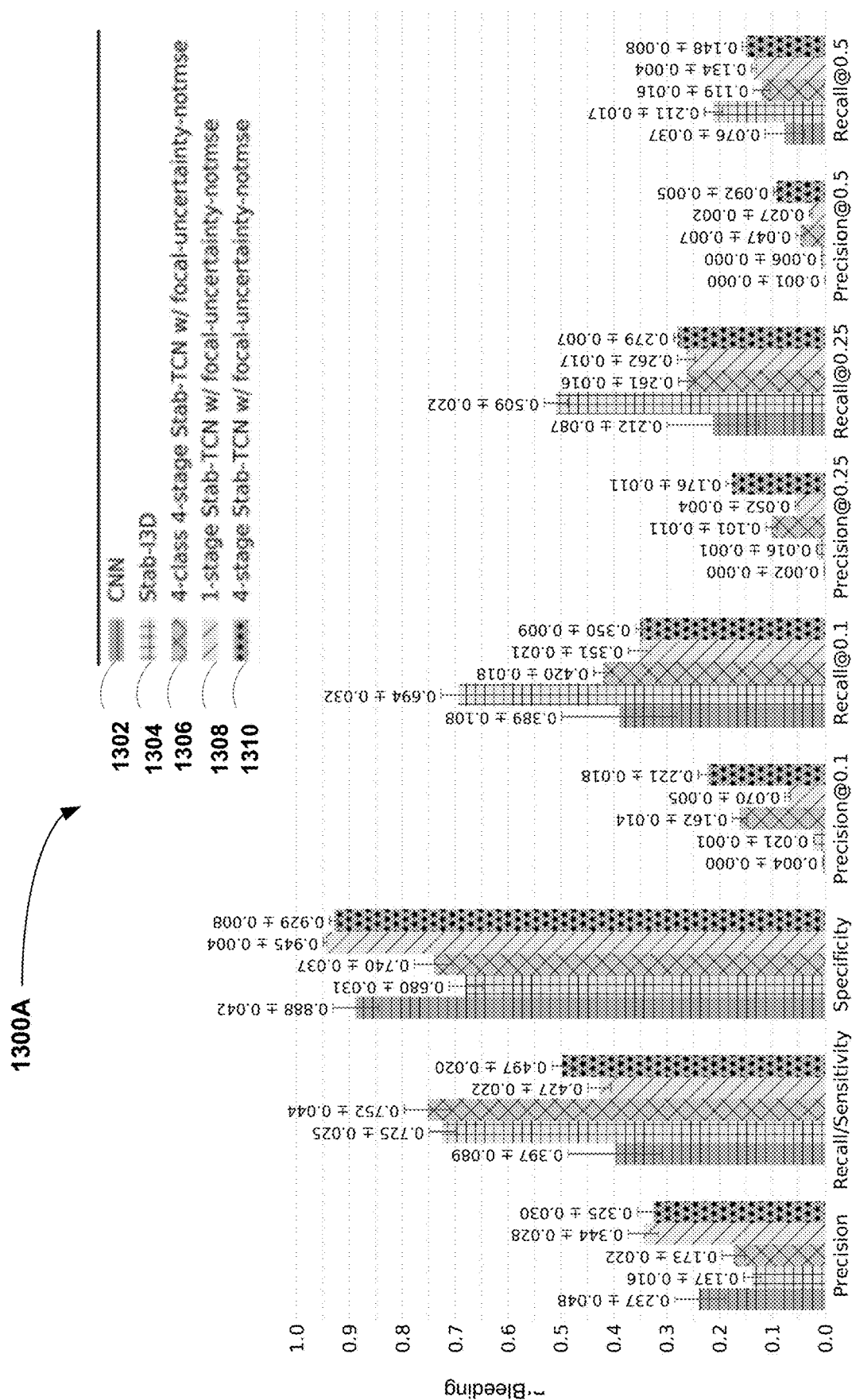
FIG. 13A illustrates, in a bar diagram, an example loss function bar comparison for bleeding injury detection with various models with different loss functions, in accordance with some embodiments.
Figure 13B:
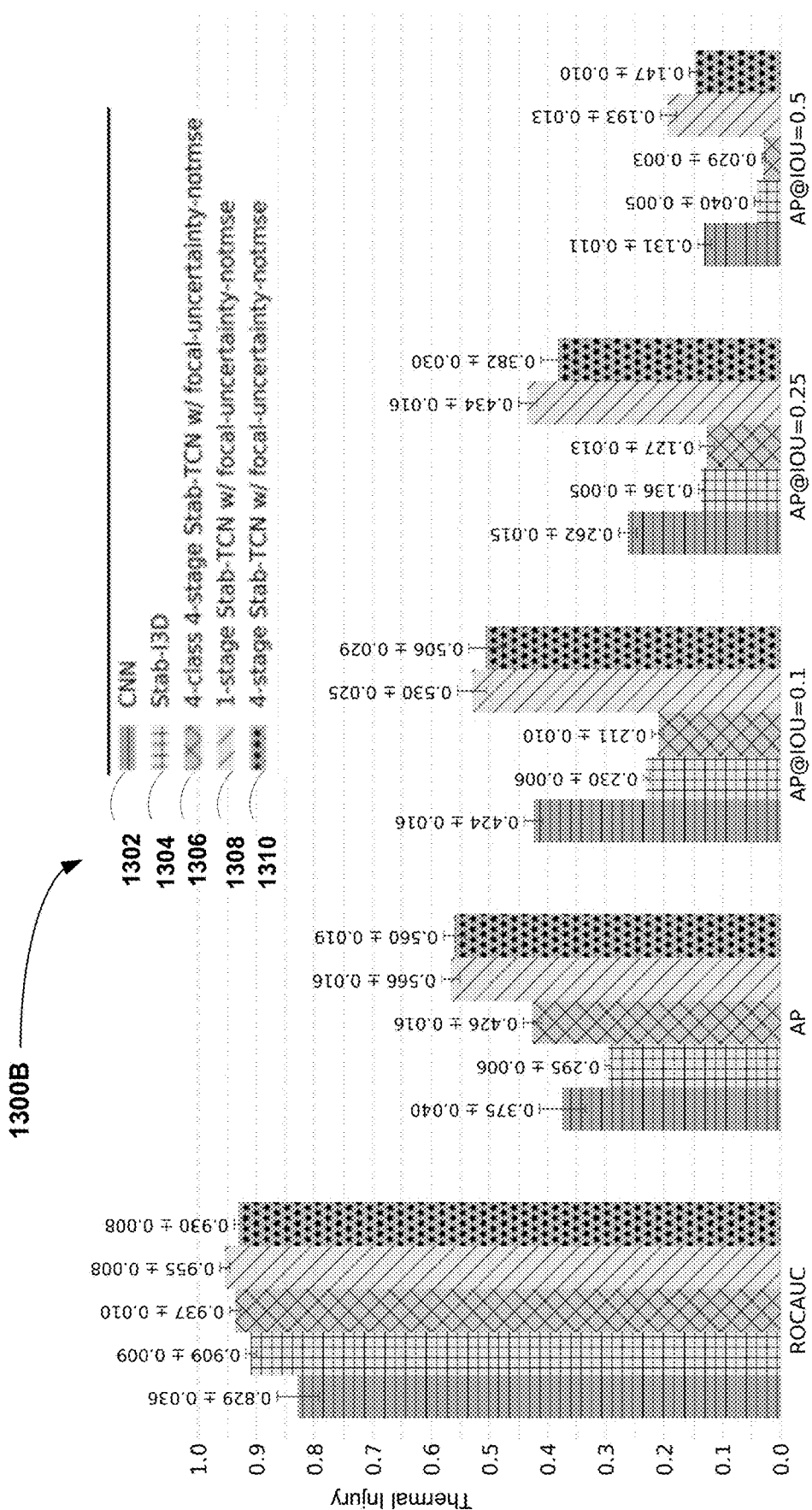
FIG. 13B illustrates, in a bar diagram, an example loss function bar comparison for thermal injury detection with various models with different loss functions, in accordance with some embodiments.
Figure 14A:
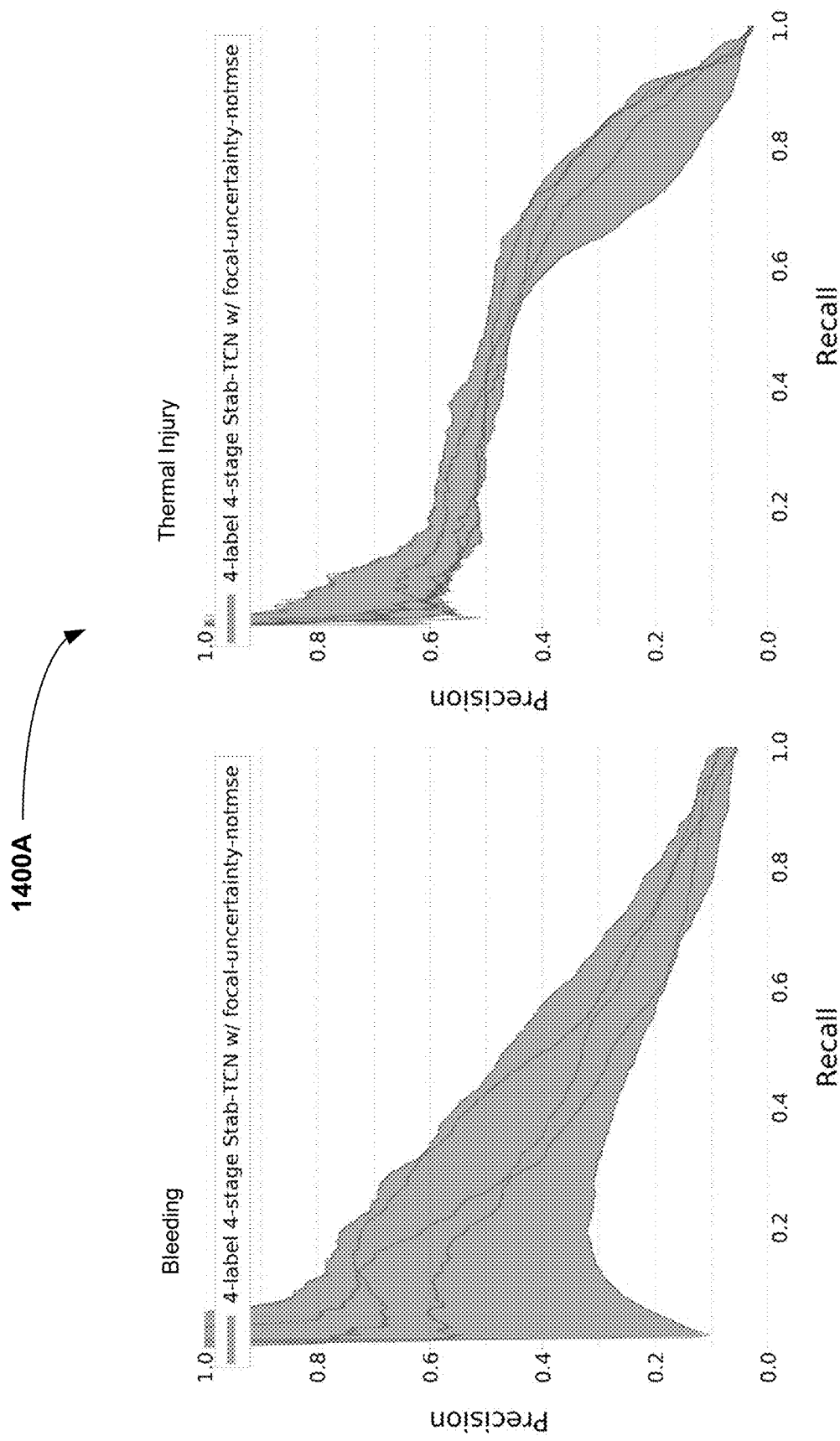
FIG. 14A illustrates, in a plot diagram, an example of a precision-recall curve for a four label, four stage Stab-TCN model with an example loss term over all procedures, in accordance with some embodiments.
Figure 14B:
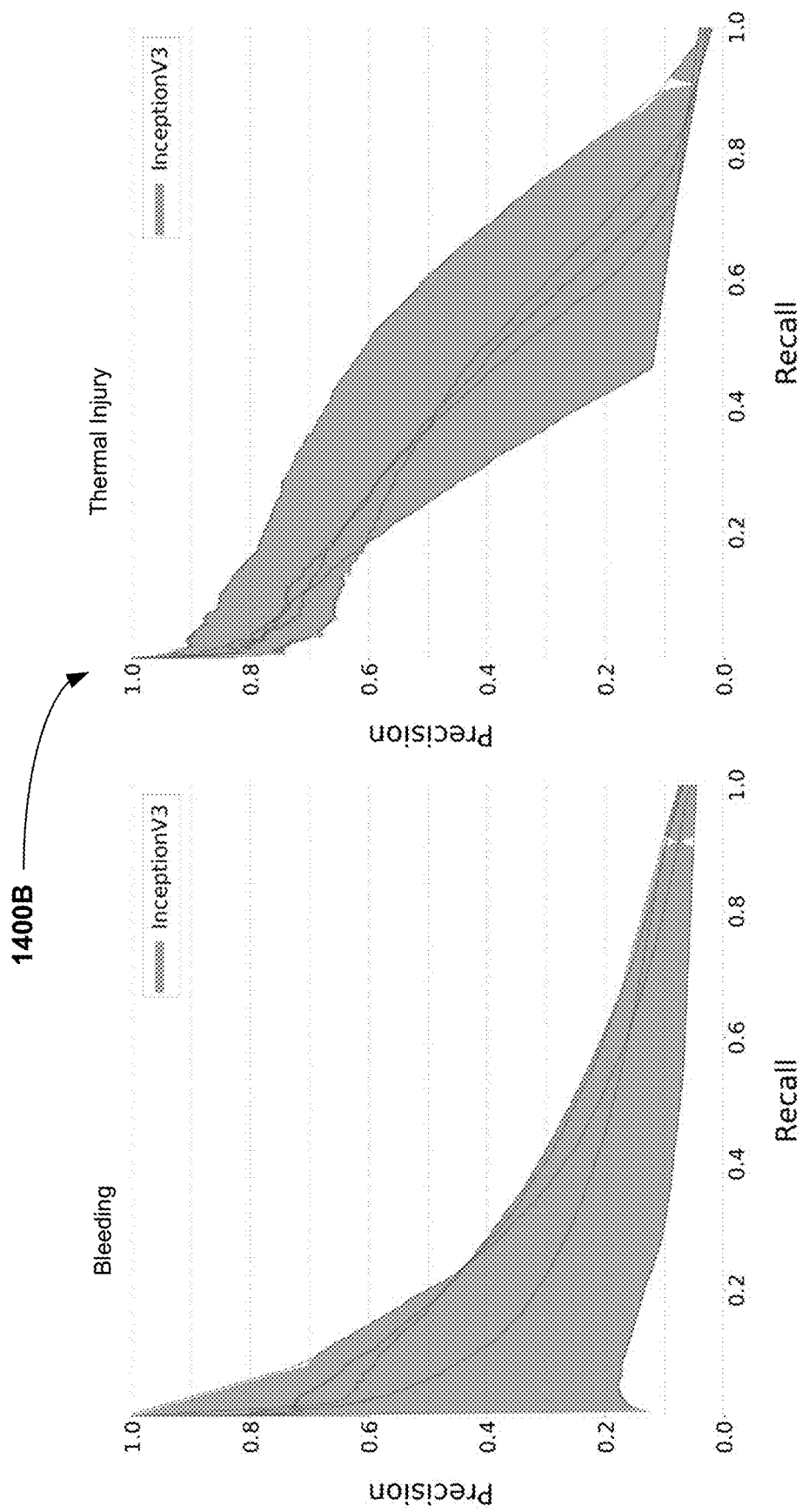
FIG. 14B illustrates, in a plot diagram, an example of a precision-recall curve for a InceptionV3 model over all procedures, in accordance with some embodiments.
Figure 14C:
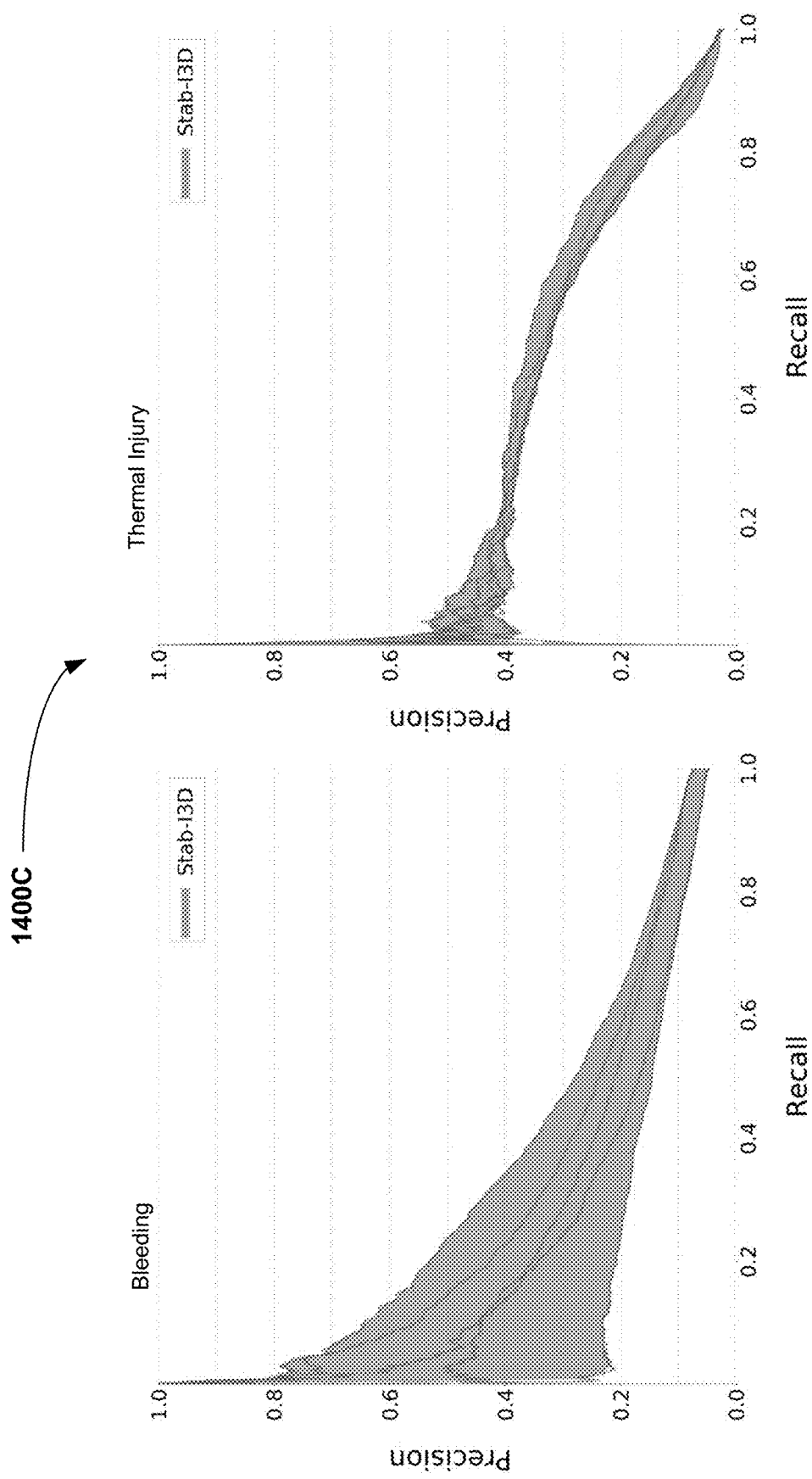
FIG. 14C illustrates, in a plot diagram, an example of a precision-recall curve for a Stab-I3D with an example loss term over all procedures, in accordance with some embodiments.
Figure 14D:
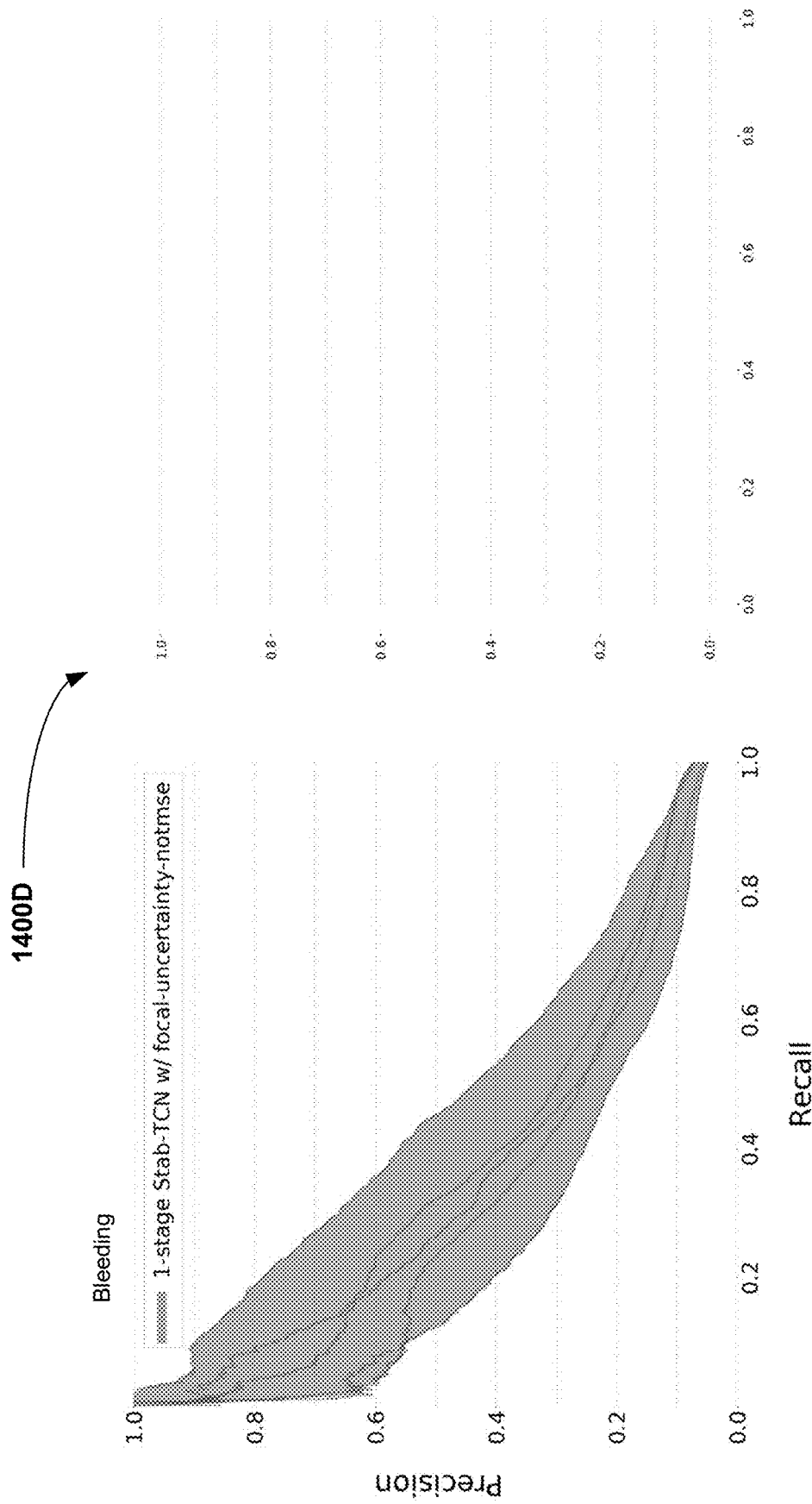
FIG. 14D illustrates, in a plot diagram, an example of a precision-recall curve for a one stage Stab-TCN model an example loss term for bleeding detection, in accordance with some embodiments.
Figure 14E:
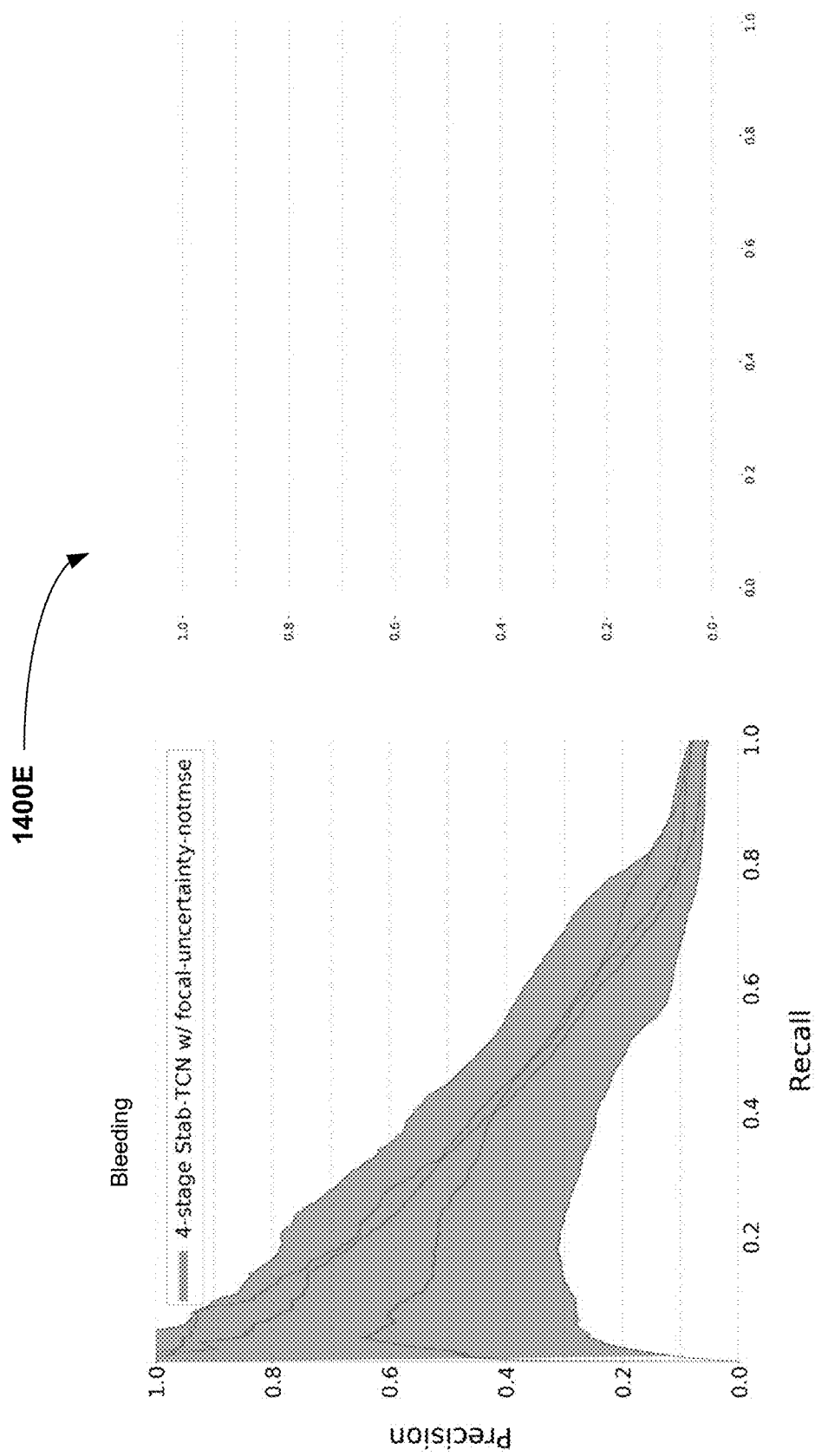
FIG. 14E illustrates, in a plot diagram, an example of a precision-recall curve for a four stage Stab-TCN with an example loss term for bleeding detection, in accordance with some embodiments.
Figure 14F:
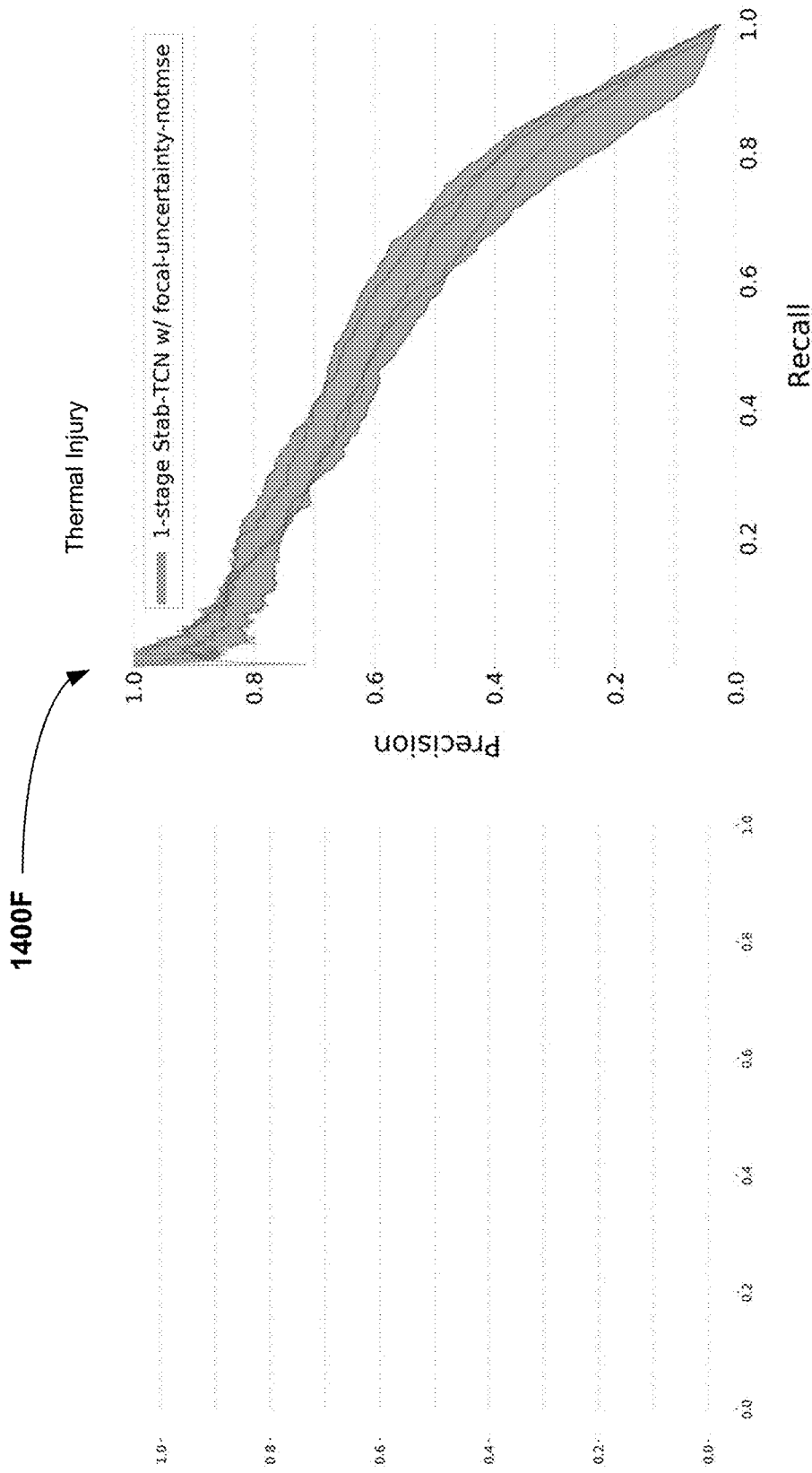
FIG. 14F illustrates, in a plot diagram, an example of a precision-recall curve for a one stage TCN with an example loss term for thermal injury detection, in accordance with some embodiments.
Figure 14G:
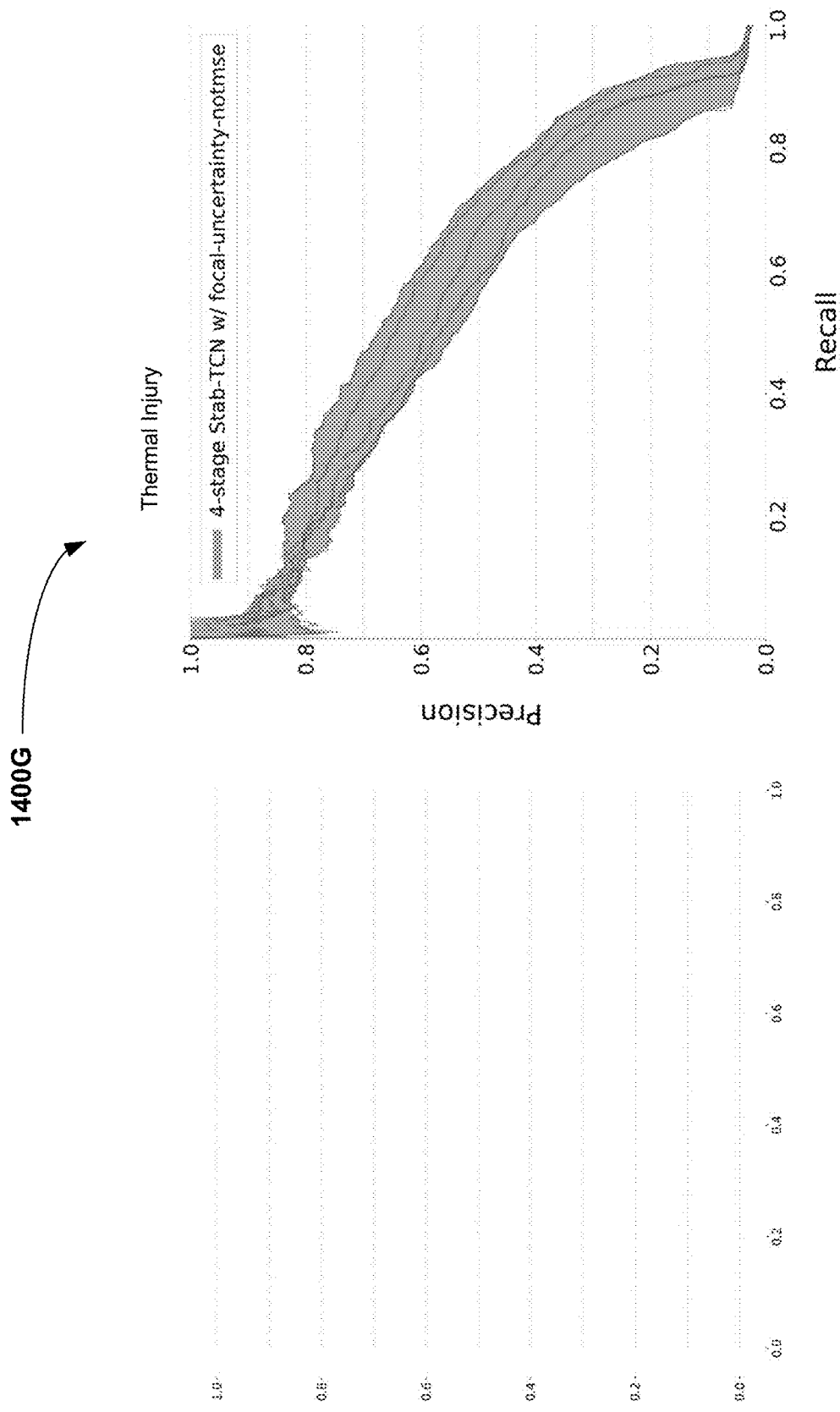
FIG. 14G illustrates, in a plot diagram, an example of a precision-recall curve for a four stage TCN with an example loss term for thermal injury detection, in accordance with some embodiments.

Reference is now made to FIGS. 13A-13B, which show in a bar diagram, an example loss function bar comparison for bleeding injury detection with various models with different loss functions and thresholds, in accordance with some embodiments. Bars 1302, 1304, 1306, 1308, and 1310 illustrate the performance of the InceptionV3 model (also referred to as CNN), the Stab-I3D model, a four stage Stab-TCN with all labels (the 4-label four stage Stab-TCN), a single-stage TCN with stabilization model, and a single class four stage Stab-TCN, respectively. The four stage Stab-TCN, and the 1-stage Stab-TCN are trained on bleeding, and thermal injury separately based on the dataset of Table 7.

FIGS. 14A-14G, show the corresponding respective precision-recall curves for the models described in FIGS. 13A and 13, where each model has a shaded area corresponding to 5 lines from five fold cross-validation. Plots 1400A, 1400B, 1400C, 14000, 1400E, 1400F show the results for the four stage Stab-TCN with all labels (the 4-label four stage Stab-TCN) for both bleeding and thermal injury detection, the InceptionV3 model (also referred to as CNN) for both bleeding and thermal injury detection, the Stab-I3D mode bleeding and thermal injury detection, the single-stage TCN with stabilization model for bleeding detection, and a single class four stage Stab-TCN with stabilization model for bleeding detection, the single-stage TCN with stabilization model for thermal injury detection, and a single class four stage Stab-TCN with stabilization model for thermal injury detection, respectively.

Based on the dataset of Table 7, the four stage Stab-TCN systems outperform the InceptionV3, and the Stab-I3D by a 2.9%-18.5% margin in ROCAUC and AP, and a 0.35%-12% margin in AP@k. The 4-label four stage Stab-TCN has better bleeding detection performance than the four stage Stab-TCN with a 0.4%-3.3% margin among all metrics, however, its AP and AP@k is 11.8%-29.5% lower than those of the four stage Stab-TCN. Incorporating a focal-uncertainty loss may not fully address class imbalance, and systems incorporating task-specific classifiers may be desirable. The four stage Stab-TCN has the best overall performance among the four models.

Compared to the 1-stage Stab-TCN, the four stage Stab-TCN has better performance in bleeding detection with an increase of 1.2%-7.1% in AP@k, and poorer performance in thermal injury detection with a decrease of 2.4%-5.2% in AP@k. In example embodiments where the dataset of Table 7 includes many thermal injury event last for 2 to 3 seconds instead of 10 seconds, four stage Stab-TCN may outperform 1-stage Stab-TCN in thermal injury detection. A 1-stage Stab-TCN or the four stage Stab-TCN may be configured to require 5-10 seconds to detect an event, similar to a human expert, or in example embodiments the networks may require more or less time to detect an event.

Tables 9, 10 and 11, show the numeric values of the frame-wise precision, recall, and specificity, event-wise precision, and recall at shown thresholds chosen at the best validation segmental recall for selected models. The numeric results and thresholds are shown in Table 9, Table 10 shows a model's hard event-wise metrics, and Table 11 indicates the model's real-world performance.

TABLE 9

Performance metrics are computed as mean ± standard error based on five-fold cross-validation at thresholds shown in frame-wise performance.

| | model | Precision | Recall/Sensitivity | Specificity | Threshold |
|---|---|---|---|---|---|
| bleeding | InceptionV3 | 0.237 ± 0.106 | 0.397 ± 0.199 | 0.888 ± 0.095 | 0.01 |
| | Stab-I3D | 0.137 ± 0.037 | 0.725 ± 0.055 | 0.68 ± 0.07 | 0.11 |
| | 4-label 4-stage Stab-TCN w/ focal-uncertainty-notmse | 0.173 ± 0.048 | 0.752 ± 0.099 | 0.74 ± 0.083 | 0.1 |
| | 1-stage Stab-TCN w/ focal-uncertainty-notmse | 0.344 ± 0.064 | 0.427 ± 0.048 | 0.945 ± 0.008 | 0.24 |
| | 4-stage Stab-TCN w/ focal-uncertainty-notmse | 0.325 ± 0.068 | 0.497 ± 0.044 | 0.929 ± 0.019 | 0.13 |
| thermal injury | InceptionV3 | 0.439 ± 0.1 | 0.454 ± 0.107 | 0.984 ± 0.006 | 0.01 |
| | Stab-I3D | 0.183 ± 0.056 | 0.774 ± 0.064 | 0.898 ± 0.043 | 0.11 |
| | 4-label 4-stage Stab-TCN w/ focal-uncertainty-notmse | 0.206 ± 0.039 | 0.842 ± 0.078 | 0.913 ± 0.02 | 0.1 |
| | 1-stage Stab-TCN w/ focal-uncertainty-notmse | 0.633 ± 0.026 | 0.459 ± 0.042 | 0.993 ± 0.001 | 0.48 |
| | 4-stage Stab-TCN w/ focal-uncertainty-notmse | 0.625 ± 0.028 | 0.463 ± 0.035 | 0.993 ± 0.001 | 0.51 |

TABLE 10

Performance metrics are computed as mean ± standard error based on five-fold cross-validation at thresholds shown in standard event-wise performance.

| | model | Precision@0.1 | Recall@0.1 | Precision@0.25 | Recall @0.25 | Precision@0.5 | Recall @0.5 |
|---|---|---|---|---|---|---|---|
| bleeding | InceptionV3 | 0.004 ± 0.001 | 0.389 ± 0.243 | 0.002 ± 0.001 | 0.212 ± 0.194 | 0.001 ± 0.000 | 0.076 ± 0.083 |
| | Stab-I3D | 0.021 ± 0.002 | 0.694 ± 0.073 | 0.016 ± 0.002 | 0.509 ± 0.050 | 0.006 ± 0.001 | 0.211 ± 0.038 |
| | 4-label 4-stage Stab-TCN w/ focal-uncertainty-notmse | 0.162 ± 0.03 | 0.420 ± 0.04 | 0.101 ± 0.024 | 0.261 ± 0.036 | 0.047 ± 0.016 | 0.119 ± 0.035 |
| | 1-stage Stab-TCN w/ focal-uncertainty-notmse | 0.070 ± 0.011 | 0.351 ± 0.048 | 0.052 ± 0.008 | 0.262 ± 0.038 | 0.027 ± 0.005 | 0.134 ± 0.01 |
| | 4-stage Stab-TCN w/ focal-uncertainty-notmse | 0.221 ± 0.041 | 0.350 ± 0.019 | 0.176 ± 0.025 | 0.279 ± 0.015 | 0.092 ± 0.010 | 0.148 ± 0.018 |
| thermal injury | InceptionV3 | 0.122 ± 0.057 | 0.690 ± 0.060 | 0.097 ± 0.046 | 0.549 ± 0.053 | 0.059 ± 0.030 | 0.333 ± 0.052 |
| | Stab-I3D | 0.080 ± 0.042 | 0.271 ± 0.027 | 0.054 ± 0.032 | 0.176 ± 0.021 | 0.023 ± 0.016 | 0.072 ± 0.013 |
| | 4-label 4-stage Stab-TCN w/ focal-uncertainty-notmse | 0.277 ± 0.073 | 0.098 ± 0.014 | 0.093 ± 0.052 | 0.032 ± 0.013 | 0.016 ± 0.017 | 0.006 ± 0.003 |
| | 1-stage Stab-TCN w/ focal-uncertainty-notmse | 0.622 ± 0.015 | 0.603 ± 0.061 | 0.575 ± 0.017 | 0.557 ± 0.055 | 0.382 ± 0.022 | 0.370 ± 0.045 |
| | 4-stage Stab-TCN w/ focal-uncertainty-notmse | 0.659 ± 0.042 | 0.602 ± 0.061 | 0.620 ± 0.037 | 0.567 ± 0.062 | 0.420 ± 0.025 | 0.384 ± 0.039 |

TABLE 11

Performance metrics are computed as mean ± standard error based on five-fold cross-validation at thresholds shown in soft event-wise performance.

| | model | Precision@0.1 | Recall@0.1 | Precision@0.25 | Recall @0.25 | Precision@0.5 | Recall @0.5 |
|---|---|---|---|---|---|---|---|
| bleeding | InceptionV3 | 0.009 ± 0.009 | 0.750 ± 0.143 | 0.006 ± 0.002 | 0.663 ± 0.192 | 0.003 ± 0.001 | 0.500 ± 0.284 |
| | Stab-I3D | 0.024 ± 0.003 | 0.807 ± 0.080 | 0.019 ± 0.003 | 0.775 ± 0.083 | 0.011 ± 0.001 | 0.661 ± 0.117 |
| | 4-label 4-stage Stab-TCN w/ focal-uncertainty-notmse | 0.173 ± 0.035 | 0.623 ± 0.097 | 0.100 ± 0.027 | 0.490 ± 0.083 | 0.045 ± 0.016 | 0.301 ± 0.095 |
| | 1-stage Stab-TCN w/ focal-uncertainty-notmse | 0.090 ± 0.013 | 0.433 ± 0.044 | 0.067 ± 0.010 | 0.364 ± 0.048 | 0.039 ± 0.008 | 0.247 ± 0.026 |
| | 4-stage Stab-TCN w/ focal-uncertainty-notmse | 0.241 ± 0.042 | 0.414 ± 0.022 | 0.182 ± 0.022 | 0.350 ± 0.015 | 0.096 ± 0.013 | 0.220 ± 0.013 |
| thermal injury | InceptionV3 | 0.157 ± 0.082 | 0.780 ± 0.050 | 0.137 ± 0.072 | 0.756 ± 0.060 | 0.095 ± 0.052 | 0.682 ± 0.080 |
| | Stab-I3D | 0.081 ± 0.040 | 0.721 ± 0.075 | 0.048 ± 0.024 | 0.606 ± 0.099 | 0.022 ± 0.013 | 0.415 ± 0.108 |
| | 4-label 4-stage Stab-TCN w/ focal-uncertainty-notmse | 0.120 ± 0.019 | 0.535 ± 0.136 | 0.031 ± 0.014 | 0.225 ± 0.105 | 0.005 ± 0.002 | 0.062 ± 0.042 |
| | 1-stage Stab-TCN w/ focal-uncertainty-notmse | 0.680 ± 0.018 | 0.631 ± 0.067 | 0.619 ± 0.014 | 0.609 ± 0.067 | 0.432 ± 0.018 | 0.523 ± 0.076 |
| | 4-stage Stab-TCN w/ focal-uncertainty-notmse | 0.698 ± 0.043 | 0.626 ± 0.064 | 0.645 ± 0.037 | 0.607 ± 0.067 | 0.443 ± 0.020 | 0.517 ± 0.072 |

Figure 15:
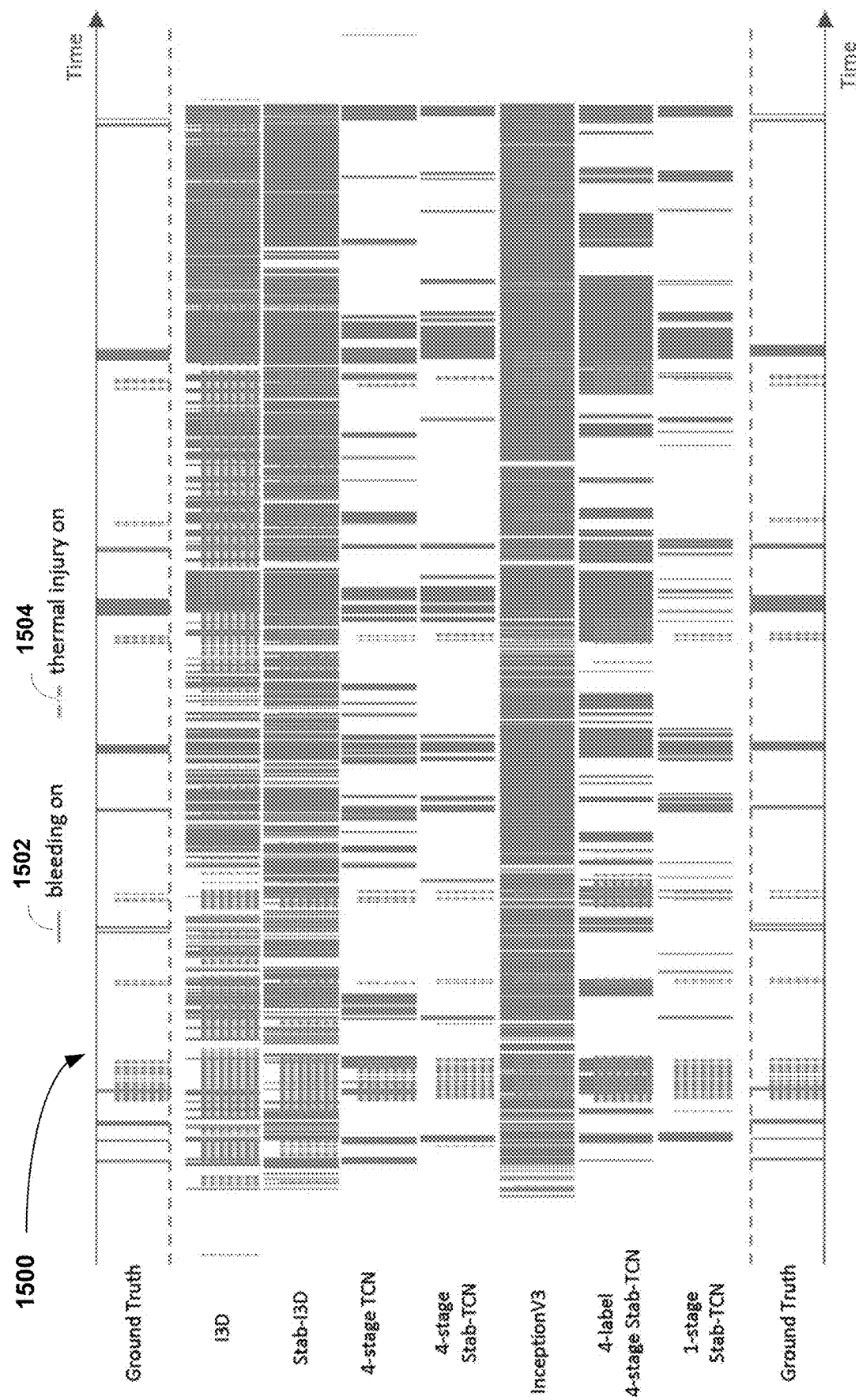
FIG. 15 illustrates, in a plot diagram, an example of prediction plot comparison of models with different loss functions for all procedures in a test procedure, in accordance with some embodiments.
Figure 16:
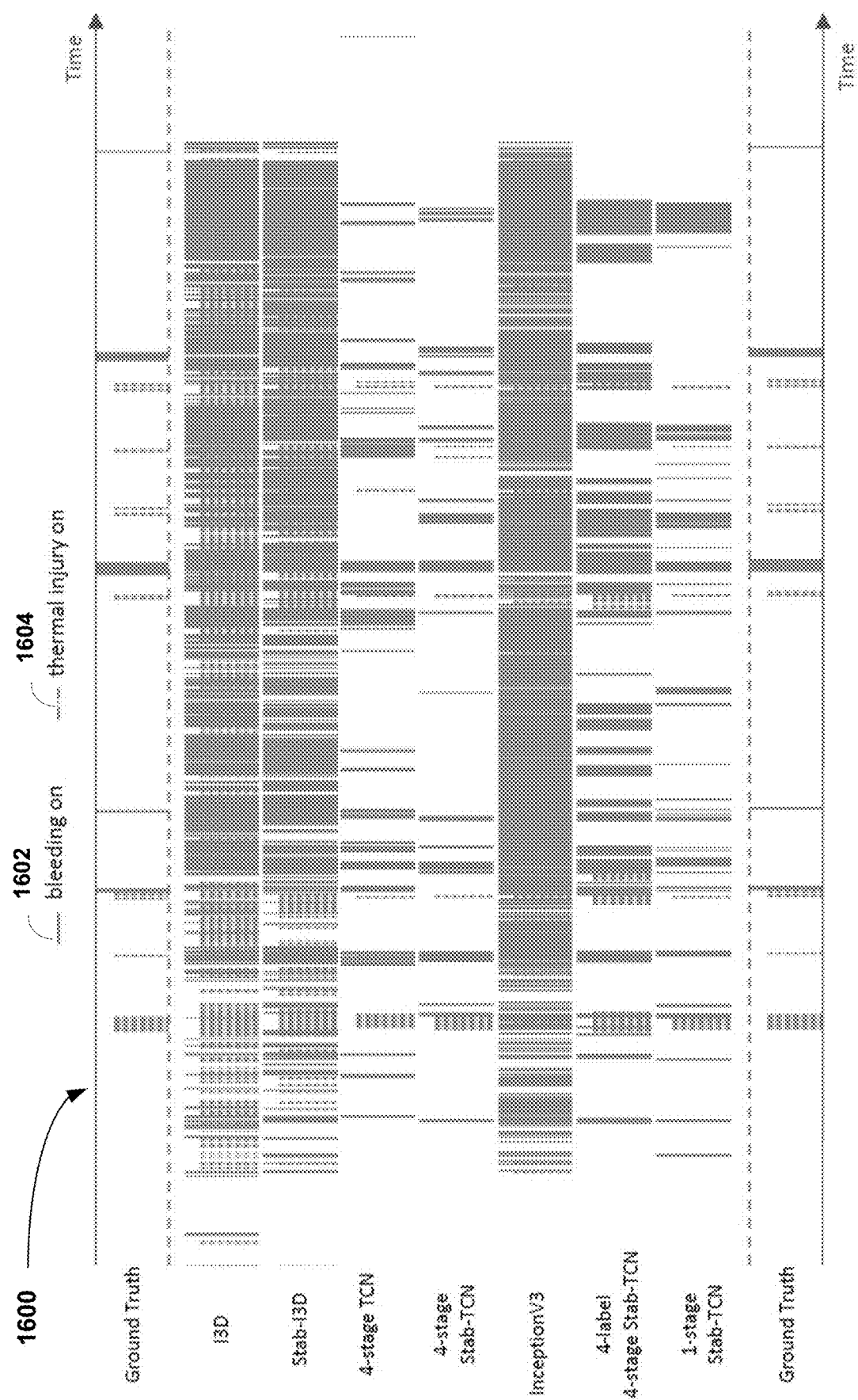
FIG. 16 illustrates, in a plot diagram, another example of prediction plot comparison of models with different loss functions for all procedures in a test set, in accordance with some embodiments.
Figure 17:
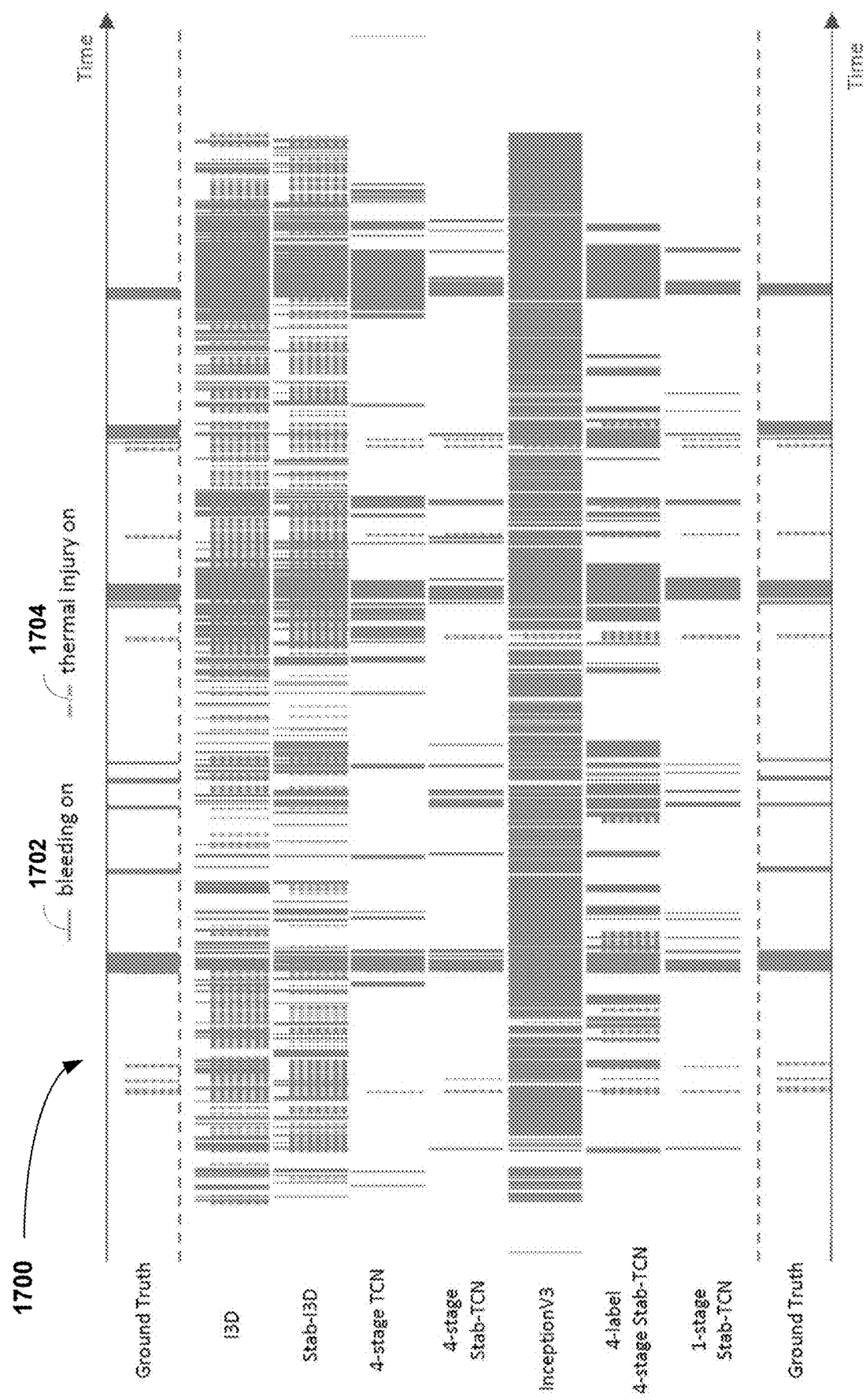
FIG. 17 illustrates, in a plot diagram, another example of prediction plot comparison of models with different loss functions for all procedures in a test set, in accordance with some embodiments.
Figure 18:
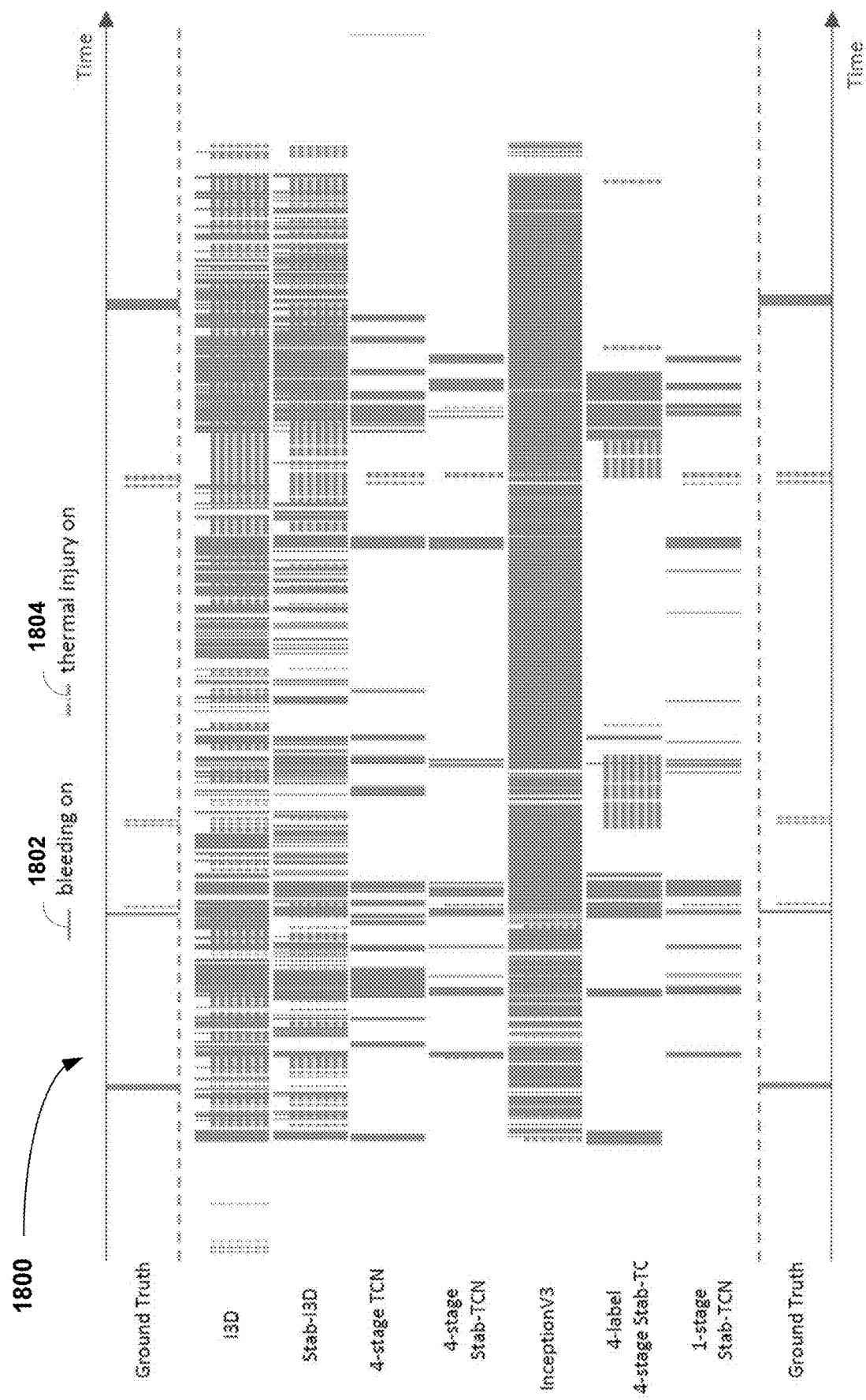
FIG. 18 illustrates, in a plot diagram, another example of prediction plot comparison of models with different loss functions for all procedures in a test set, in accordance with some embodiments.

In example embodiments, the performance represented by Table 11 may be suitable for measuring screening-tool use performance. As shown in Tables 10 and 11, the Stab-TCN models may have better frame-wise and event-wise precision with lower recall compared to those of the InceptionV3, and the Stab-I3D. FIG. 15, shows that, in the example embodiment shown, the Stab-TCN model has the best readability and usability. It has less transitions, and more correctly and precisely detected events.

In example embodiments, the four stage Stab-TCN is performs better than the four stage Stab-TCN and the 1-stage Stab-TCN, when compared according to the event-wise metrics in Table 10. The four stage Stab-TCN has better hard and soft segmental precision in every task, and less than 1% short on the recall at IOU of 0.1.

The event-wise metric values in Table 10 are more conforming to the qualitative performance shown in the event plot. The models with higher frame-wise performance do not always have higher event-wise performance. For example, the thermal injury frame-wise precision of the InceptionV3, shown in Table 9, is 18.6% lower than that of the Stab-TCN, and the margin increases to 55% in event-wise precision, shown in Table 10. Furthermore, it is hard to read the rows of the InceptionV3 and identify probable iAEs in FIG. 15.

Similar to Tables 9, 10 and 11, comparison of model performance is described Tables 12, 13 and 14, shown below, for frame wise performance, hard event-wise performance, and soft event-wise performance, respectively for all models.

TABLE 12

Performance metrics are computed as mean ± standard error based on five-fold cross-validation at thresholds shown in frame-wise performance.

| | model | Precision | Recall/Sensitivity | Specificity | Threshold |
|---|---|---|---|---|---|
| bleeding | 1-stage Stab-TCN w/ focal-uncertainty | 0.299 ± 0.075 | 0.542 ± 0.042 | 0.911 ± 0.022 | 0.18 |
| | 1-stage Stab-TCN w/ focal-uncertainty-notmse | 0.344 ± 0.064 | 0.427 ± 0.048 | 0.945 ± 0.008 | 0.24 |
| | 1-stage TCN w/ focal-uncertainty | 0.143 ± 0.030 | 0.769 ± 0.080 | 0.683 ± 0.077 | 0.1 |
| | 1-stage TCN w/ focal-uncertainty-notmse | 0.140 ± 0.031 | 0.766 ± 0.080 | 0.664 ± 0.119 | 0.01 |
| | 4-label 1-stage Stab-TCN w/ normal | 0.167 ± 0.026 | 0.784 ± 0.052 | 0.734 ± 0.047 | 0.02 |
| | 4-label 1-stage Stab-TCN w/ focal | 0.130 ± 0.025 | 0.865 ± 0.071 | 0.603 ± 0.086 | 0.13 |
| | 4-label 1-stage Stab-TCN w/ focal-uncertainty | 0.153 ± 0.027 | 0.839 ± 0.033 | 0.688 ± 0.013 | 0.14 |
| | 4-label 1-stage Stab-TCN w/ uncertainty | 0.209 ± 0.069 | 0.68 ± 80.140 | 0.804 ± 0.079 | 0.02 |
| | 4-label 1-stage TCN w/ normal | 0.470 ± 0.138 | 0.368 ± 0.077 | 0.969 ± 0.014 | 0.33 |
| | 4-label 1-stage TCN w/ focal | 0.444 ± 0.109 | 0.397 ± 0.058 | 0.965 ± 0.011 | 0.42 |
| | 4-label 1-stage TCN w/ focal-uncertainty | 0.414 ± 0.135 | 0.432 ± 0.061 | 0.956 ± 0.016 | 0.41 |
| | 4-label 1-stage TCN w/ uncertainty | 0.49 ± 30.136 | 0.375 ± 0.078 | 0.972 ± 0.011 | 0.3 |
| | 4-label 4-stage Stab-TCN w/ normal | 0.455 ± 0.104 | 0.360 ± 0.079 | 0.970 ± 0.011 | 0.45 |

TABLE 12-continued

Performance metrics are computed as mean ± standard error based on five-fold cross-validation at thresholds shown in frame-wise performance.

| | model | Precision | Recall/Sensitivity | Specificity | Threshold |
|---|---|---|---|---|---|
| | 4-label 4-stage Stab-TCN w/ focal | 0.221 ± 0.072 | 0.695 ± 0.074 | 0.820 ± 0.064 | 0.17 |
| | 4-label 4-stage Stab-TCN w/ focal-uncertainty | 0.221 ± 0.059 | 0.714 ± 0.029 | 0.825 ± 0.034 | 0.17 |
| | 4-label 4-stage Stab-TCN w/ focal-uncertainty-notmse | 0.173 ± 0.048 | 0.752 ± 0.099 | 0.740 ± 0.083 | 0.1 |
| | 4-label 4-stage TCN w/ uncertainty | 0.468 ± 0.109 | 0.357 ± 0.086 | 0.972 ± 0.010 | 0.39 |
| | 4-label 4-stage TCN w/ normal | 0.494 ± 0.118 | 0.356 ± 0.092 | 0.976 ± 0.004 | 0.4 |
| | 4-label 4-stage TCN w/ focal | 0.434 ± 0.146 | 0.389 ± 0.040 | 0.963 ± 0.016 | 0.46 |
| | 4-label 4-stage TCN w/ focal-uncertainty | 0.438 ± 0.139 | 0.420 ± 0.058 | 0.960 ± 0.018 | 0.41 |
| | 4-label 4-stage TCN w/ uncertainty | 0.488 ± 0.147 | 0.385 ± 0.056 | 0.970 ± 0.015 | 0.5 |
| | 4-stage Stab-TCN w/ focal-uncertainty | 0.243 ± 0.080 | 0.611 ± 0.105 | 0.856 ± 0.066 | 0.09 |
| | 4-stage Stab-TCN w/ focal-uncertainty-notmse | 0.325 ± 0.068 | 0.497 ± 0.044 | 0.929 ± 0.019 | 0.13 |
| | 4-stage TCN w/ focal-uncertainty | 0.312 ± 0.056 | 0.493 ± 0.099 | 0.928 ± 0.013 | 0.11 |
| | 4-stage TCN w/ focal-uncertainty-notmse | 0.248 ± 0.035 | 0.543 ± 0.105 | 0.890 ± 0.026 | 0.04 |
| | I3D | 0.130 ± 0.035 | 0.768 ± 0.075 | 0.627 ± 0.133 | 0.01 |
| | InceptionV3 | 0.237 ± 0.106 | 0.397 ± 0.199 | 0.888 ± 0.095 | 0.01 |
| | Stab-I3D | 0.137 ± 0.037 | 0.725 ± 0.055 | 0.680 ± 0.070 | 0.11 |
| thermal injury | 1-stage Stab-TCN w/ focal-uncertainty | 0.599 ± 0.019 | 0.509 ± 0.038 | 0.991 ± 0.001 | 0.4 |
| | 1-stage Stab-TCN w/ focal-uncertainty-notmse | 0.633 ± 0.026 | 0.459 ± 0.042 | 0.993 ± 0.001 | 0.48 |
| | 1-stage TCN w/ focal-uncertainty | 0.625 ± 0.064 | 0.445 ± 0.090 | 0.993 ± 0.002 | 0.47 |
| | 1-stage TCN w/ focal-uncertainty-notmse | 0.667 ± 0.059 | 0.396 ± 0.080 | 0.995 ± 0.001 | 0.57 |
| | 4-label 1-stage Stab-TCN w/ normal | 0.230 ± 0.045 | 0.827 ± 0.068 | 0.922 ± 0.035 | 0.02 |
| | 4-label 1-stage Stab-TCN w/ focal | 0.209 ± 0.036 | 0.870 ± 0.052 | 0.913 ± 0.016 | 0.13 |
| | 4-label 1-stage Stab-TCN w/ focal-uncertainty | 0.233 ± 0.021 | 0.861 ± 0.052 | 0.927 ± 0.006 | 0.14 |
| | 4-label 1-stage Stab-TCN w/ uncertainty | 0.253 ± 0.035 | 0.820 ± 0.037 | 0.936 ± 0.012 | 0.02 |
| | 4-label 1-stage TCN w/ normal | 0.516 ± 0.024 | 0.438 ± 0.071 | 0.989 ± 0.002 | 0.33 |
| | 4-label 1-stage TCN w/ focal | 0.519 ± 0.052 | 0.489 ± 0.086 | 0.988 ± 0.003 | 0.42 |
| | 4-label 1-stage TCN w/ focal-uncertainty | 0.514 ± 0.039 | 0.504 ± 0.109 | 0.987 ± 0.003 | 0.41 |
| | 4-label 1-stage TCN w/ uncertainty | 0.506 ± 0.035 | 0.468 ± 0.103 | 0.988 ± 0.003 | 0.3 |
| | 4-label 4-stage Stab-TCN w/ normal | 0.447 ± 0.036 | 0.419 ± 0.068 | 0.986 ± 0.005 | 0.45 |
| | 4-label 4-stage Stab-TCN w/ focal | 0.218 ± 0.039 | 0.783 ± 0.049 | 0.925 ± 0.016 | 0.17 |
| | 4-label 4-stage Stab-TCN w/ focal-uncertainty | 0.228 ± 0.023 | 0.799 ± 0.061 | 0.930 ± 0.007 | 0.17 |
| | 4-label 4-stage Stab-TCN w/ focal-uncertainty-notmse | 0.206 ± 0.039 | 0.842 ± 0.078 | 0.913 ± 0.020 | 0.1 |
| | 4-label 4-stage TCN w/ uncertainty | 0.504 ± 0.084 | 0.299 ± 0.133 | 0.991 ± 0.005 | 0.39 |
| | 4-label 4-stage TCN w/ normal | 0.504 ± 0.046 | 0.429 ± 0.100 | 0.989 ± 0.002 | 0.4 |
| | 4-label 4-stage TCN w/ focal | 0.476 ± 0.065 | 0.465 ± 0.094 | 0.986 ± 0.004 | 0.46 |
| | 4-label 4-stage TCN w/ focal-uncertainty | 0.481 ± 0.039 | 0.485 ± 0.125 | 0.986 ± 0.003 | 0.41 |
| | 4-label 4-stage TCN w/ uncertainty | 0.477 ± 0.124 | 0.421 ± 0.126 | 0.984 ± 0.012 | 0.5 |
| | 4-stage Stab-TCN w/ focal-uncertainty | 0.554 ± 0.042 | 0.560 ± 0.022 | 0.988 ± 0.002 | 0.35 |
| | 4-stage Stab-TCN w/ focal-uncertainty-notmse | 0.625 ± 0.028 | 0.463 ± 0.035 | 0.993 ± 0.001 | 0.51 |
| | 4-stage TCN w/ focal-uncertainty | 0.598 ± 0.046 | 0.455 ± 0.124 | 0.992 ± 0.002 | 0.4 |

TABLE 12-continued

Performance metrics are computed as mean ± standard error based on five-fold cross-validation at thresholds shown in frame-wise performance.

| model | Precision | Recall/Sensitivity | Specificity | Threshold |
|---|---|---|---|---|
| 4-stage TCN w/ focal-uncertainty-notmse | 0.616 ± 0.039 | 0.447 ± 0.106 | 0.993 ± 0.001 | 0.47 |
| I3D | 0.144 ± 0.060 | 0.818 ± 0.153 | 0.831 ± 0.084 | 0.01 |
| InceptionV3 | 0.439 ± 0.190 | 0.454 ± 0.107 | 0.984 ± 0.006 | 0.01 |
| Stab-I3D | 0.183 ± 0.056 | 0.774 ± 0.064 | 0.898 ± 0.043 | 0.11 |

TABLE 13

Performance metrics are computed as mean ± standard error based on five-fold cross-validation at thresholds shown in standard event-wise performance.

| | model | Precision@0.1 | Recall@0.1 | Precision@0.25 | Recall@0.25 | Precision@0.5 | Recall@0.5 |
|---|---|---|---|---|---|---|---|
| bleeding | 1-stage Stab-TCN w/ focal-uncertainty | 0.083 ± 0.010 | 0.381 ± 0.012 | 0.062 ± 0.009 | 0.284 ± 0.030 | 0.029 ± 0.006 | 0.134 ± 0.022 |
| | 1-stage Stab-TCN w/ focal-uncertainty-notmse | 0.070 ± 0.011 | 0.351 ± 0.048 | 0.052 ± 0.008 | 0.263 ± 0.038 | 0.027 ± 0.005 | 0.134 ± 0.010 |
| | 1-stage TCN w/ focal-uncertainty | 0.048 ± 0.011 | 0.448 ± 0.039 | 0.030 ± 0.008 | 0.280 ± 0.050 | 0.012 ± 0.004 | 0.113 ± 0.020 |
| | 1-stage TCN w/ focal-uncertainty-notmse | 0.033 ± 0.003 | 0.568 ± 0.050 | 0.022 ± 0.002 | 0.377 ± 0.054 | 0.010 ± 0.002 | 0.170 ± 0.033 |
| | 4-label 1-stage Stab-TCN w/ normal | 0.080 ± 0.011 | 0.450 ± 0.033 | 0.049 ± 0.010 | 0.273 ± 0.030 | 0.021 ± 0.003 | 0.120 ± 0.023 |
| | 4-label 1-stage Stab-TCN w/ focal | 0.051 ± 0.011 | 0.478 ± 0.049 | 0.021 ± 0.008 | 0.293 ± 0.046 | 0.013 ± 0.003 | 0.125 ± 0.027 |
| | 4-label 1-stage Stab-TCN w/ focal-uncertainty | 0.060 ± 0.008 | 0.496 ± 0.030 | 0.037 ± 0.005 | 0.308 ± 0.032 | 0.015 ± 0.003 | 0.127 ± 0.023 |
| | 4-label 1-stage Stab-TCN w/ uncertainty | 0.103 ± 0.037 | 0.421 ± 0.046 | 0.070 ± 0.024 | 0.288 ± 0.042 | 0.033 ± 0.017 | 0.129 ± 0.022 |
| | 4-label 1-stage TCN w/ normal | 0.232 ± 0.038 | 0.237 ± 0.032 | 0.176 ± 0.041 | 0.178 ± 0.025 | 0.089 ± 0.014 | 0.091 ± 0.012 |
| | 4-label 1-stage TCN w/ focal | 0.175 ± 0.043 | 0.277 ± 0.021 | 0.126 ± 0.032 | 0.201 ± 0.024 | 0.068 ± 0.015 | 0.109 ± 0.020 |
| | 4-label 1-stage TCN w/ focal-uncertainty | 0.153 ± 0.028 | 0.287 ± 0.045 | 0.113 ± 0.036 | 0.208 ± 0.029 | 0.063 ± 0.019 | 0.113 ± 0.015 |
| | 4-label 1-stage TCN w/ uncertainty | 0.225 ± 0.027 | 0.233 ± 0.056 | 0.178 ± 0.028 | 0.182 ± 0.038 | 0.092 ± 0.013 | 0.094 ± 0.019 |
| | 4-label 4-stage Stab-TCN w/ normal | 0.242 ± 0.048 | 0.409 ± 0.010 | 0.172 ± 0.047 | 0.285 ± 0.036 | 0.080 ± 0.036 | 0.129 ± 0.037 |
| | 4-label 4-stage Stab-TCN w/ focal | 0.231 ± 0.031 | 0.397 ± 0.020 | 0.159 ± 0.039 | 0.274 ± 0.054 | 0.078 ± 0.031 | 0.131 ± 0.038 |
| | 4-label 4-stage Stab-TCN w/ focal-uncertainty | 0.162 ± 0.030 | 0.420 ± 0.040 | 0.101 ± 0.024 | 0.261 ± 0.036 | 0.047 ± 0.016 | 0.119 ± 0.035 |
| | 4-label 4-stage Stab-TCN w/ focal-uncertainty-notmse | 0.436 ± 0.053 | 0.206 ± 0.015 | 0.356 ± 0.042 | 0.169 ± 0.010 | 0.213 ± 0.016 | 0.101 ± 0.012 |
| | 4-label 4-stage TCN w/ uncertainty | 0.481 ± 0.058 | 0.210 ± 0.045 | 0.372 ± 0.028 | 0.165 ± 0.028 | 0.225 ± 0.035 | 0.101 ± 0.032 |
| | 4-label 4-stage TCN w/ normal | 0.462 ± 0.044 | 0.206 ± 0.015 | 0.378 ± 0.074 | 0.167 ± 0.028 | 0.234 ± 0.062 | 0.102 ± 0.023 |
| | 4-label 4-stage TCN w/ focal | 0.358 ± 0.079 | 0.240 ± 0.024 | 0.300 ± 0.097 | 0.197 ± 0.026 | 0.167 ± 0.063 | 0.108 ± 0.013 |
| | 4-label 4-stage TCN w/ focal-uncertainty | 0.388 ± 0.076 | 0.252 ± 0.051 | 0.329 ± 0.076 | 0.212 ± 0.044 | 0.183 ± 0.048 | 0.115 ± 0.018 |
| | 4-label 4-stage TCN w/ uncertainty | 0.448 ± 0.084 | 0.228 ± 0.022 | 0.349 ± 0.015 | 0.181 ± 0.037 | 0.197 ± 0.043 | 0.101 ± 0.024 |
| | 4-stage Stab-TCN w/ focal-uncertainty | 0.252 ± 0.085 | 0.311 ± 0.061 | 0.169 ± 0.069 | 0.198 ± 0.028 | 0.075 ± 0.038 | 0.086 ± 0.019 |
| | 4-stage Stab-TCN w/ focal-uncertainty-notmse | 0.221 ± 0.041 | 0.350 ± 0.019 | 0.176 ± 0.025 | 0.279 ± 0.015 | 0.092 ± 0.010 | 0.148 ± 0.018 |
| | 4-stage TCN w/ focal-uncertainty | 0.276 ± 0.053 | 0.300 ± 0.030 | 0.205 ± 0.042 | 0.323 ± 0.035 | 0.102 ± 0.019 | 0.111 ± 0.018 |
| | 4-stage TCN w/ focal-uncertainty-notmse | 0.182 ± 0.029 | 0.381 ± 0.053 | 0.130 ± 0.019 | 0.278 ± 0.064 | 0.064 ± 0.020 | 0.137 ± 0.045 |
| | InceptionV3 | 0.004 ± 0.001 | 0.389 ± 0.243 | 0.002 ± 0.001 | 0.212 ± 0.194 | 0.001 ± 0.000 | 0.076 ± 0.083 |
| | I3D | 0.023 ± 0.003 | 0.663 ± 0.042 | 0.017 ± 0.003 | 0.474 ± 0.044 | 0.007 ± 0.001 | 0.211 ± 0.016 |
| | Stab-I3D | 0.021 ± 0.002 | 0.694 ± 0.073 | 0.016 ± 0.002 | 0.509 ± 0.050 | 0.006 ± 0.001 | 0.211 ± 0.038 |
| thermal injury | 1-stage Stab-TCN w/ focal-uncertainty | 0.700 ± 0.022 | 0.581 ± 0.059 | 0.635 ± 0.021 | 0.527 ± 0.055 | 0.419 ± 0.025 | 0.350 ± 0.055 |
| | 1-stage Stab-TCN w/ focal-uncertainty-notmse | 0.622 ± 0.015 | 0.603 ± 0.061 | 0.575 ± 0.017 | 0.557 ± 0.055 | 0.382 ± 0.022 | 0.370 ± 0.045 |
| | 1-stage TCN w/ focal-uncertainty | 0.728 ± 0.086 | 0.601 ± 0.053 | 0.689 ± 0.063 | 0.569 ± 0.053 | 0.508 ± 0.048 | 0.419 ± 0.044 |

TABLE 13-continued

Performance metrics are computed as mean ± standard error based on five-fold cross-validation at thresholds shown in standard event-wise performance.

| model | Precision@0.1 | Recall@0.1 | Precision@0.25 | Recall@0.25 | Precision@0.5 | Recall@0.5 |
|---|---|---|---|---|---|---|
| 1-stage TCN w/ focal-uncertainty-notmse | 0.695 ± 0.077 | 0.609 ± 0.061 | 0.647 ± 0.076 | 0.567 ± 0.064 | 0.466 ± 0.052 | 0.409 ± 0.046 |
| 4-label 1-stage Stab-TCN w/ normal | 0.187 ± 0.062 | 0.111 ± 0.026 | 0.082 ± 0.044 | 0.045 ± 0.023 | 0.023 ± 0.017 | 0.012 ± 0.006 |
| 4-label 1-stage Stab-TCN w/ focal | 0.143 ± 0.049 | 0.134 ± 0.032 | 0.070 ± 0.033 | 0.065 ± 0.024 | 0.023 ± 0.015 | 0.020 ± 0.009 |
| 4-label 1-stage Stab-TCN w/ focal-uncertainty | 0.157 ± 0.023 | 0.134 ± 0.028 | 0.076 ± 0.016 | 0.066 ± 0.022 | 0.020 ± 0.009 | 0.017 ± 0.011 |
| 4-label 1-stage Stab-TCN w/ uncertainty | 0.226 ± 0.058 | 0.113 ± 0.020 | 0.095 ± 0.037 | 0.047 ± 0.012 | 0.023 ± 0.011 | 0.011 ± 0.005 |
| 4-label 1-stage TCN w/ normal | 0.713 ± 0.055 | 0.482 ± 0.044 | 0.633 ± 0.033 | 0.429 ± 0.051 | 0.388 ± 0.041 | 0.286 ± 0.059 |
| 4-label 1-stage TCN w/ focal | 0.697 ± 0.072 | 0.585 ± 0.057 | 0.022 ± 0.001 | 0.478 ± 0.059 | 0.414 ± 0.045 | 0.319 ± 0.048 |
| 4-label 1-stage TCN w/ focal-uncertainty | 0.683 ± 0.648 | 0.532 ± 0.070 | 0.599 ± 0.024 | 0.470 ± 0.075 | 0.396 ± 0.024 | 0.311 ± 0.058 |
| 4-label 1-stage TCN w/ uncertainty | 0.709 ± 0.060 | 0.471 ± 0.087 | 0.612 ± 0.040 | 0.412 ± 0.097 | 0.379 ± 0.048 | 0.261 ± 0.088 |
| 4-label 4-stage Stab-TCN w/ normal | 0.379 ± 0.093 | 0.092 ± 0.016 | 0.167 ± 0.056 | 0.041 ± 0.016 | 0.035 ± 0.026 | 0.008 ± 0.005 |
| 4-label 4-stage Stab-TCN w/ focal | 0.402 ± 0.048 | 0.097 ± 0.013 | 0.155 ± 0.034 | 0.037 ± 0.008 | 0.037 ± 0.022 | 0.009 ± 0.005 |
| 4-label 4-stage Stab-TCN w/ focal-uncertainty | 0.277 ± 0.073 | 0.098 ± 0.014 | 0.093 ± 0.052 | 0.032 ± 0.013 | 0.016 ± 0.007 | 0.006 ± 0.003 |
| 4-label 4-stage Stab-TCN w/ focal-uncertainty-notmse | 0.793 ± 0.025 | 0.224 ± 0.038 | 0.544 ± 0.093 | 0.156 ± 0.045 | 0.208 ± 0.067 | 0.061 ± 0.027 |
| 4-label 4-stage TCN w/ uncertainty | 0.837 ± 0.648 | 0.170 ± 0.072 | 0.625 ± 0.118 | 0.120 ± 0.048 | 0.239 ± 0.068 | 0.044 ± 0.017 |
| 4-label 4-stage TCN w/ normal | 0.763 ± 0.056 | 0.413 ± 0.060 | 0.670 ± 0.040 | 0.365 ± 0.067 | 0.402 ± 0.068 | 0.222 ± 0.060 |
| 4-label 4-stage TCN w/ focal | 0.729 ± 0.080 | 0.460 ± 0.077 | 0.649 ± 0.051 | 0.413 ± 0.083 | 0.395 ± 0.039 | 0.254 ± 0.061 |
| 4-label 4-stage TCN w/ focal-uncertainty | 0.771 ± 0.080 | 0.426 ± 0.085 | 0.651 ± 0.081 | 0.364 ± 0.096 | 0.406 ± 0.069 | 0.230 ± 0.075 |
| 4-label 4-stage TCN w/ uncertainty | 0.721 ± 0.132 | 0.434 ± 0.111 | 0.024 ± 0.118 | 0.378 ± 0.106 | 0.385 ± 0.072 | 0.240 ± 0.082 |
| 4-stage Stab-TCN w/ focal-uncertainty | 0.739 ± 0.039 | 0.600 ± 0.061 | 0.670 ± 0.044 | 0.545 ± 0.066 | 0.414 ± 0.048 | 0.338 ± 0.060 |
| 4-stage Stab-TCN w/ focal-uncertainty-notmse | 0.659 ± 0.042 | 0.602 ± 0.061 | 0.620 ± 0.037 | 0.567 ± 0.062 | 0.420 ± 0.025 | 0.384 ± 0.039 |
| 4-stage TCN w/ focal-uncertainty | 0.744 ± 0.073 | 0.574 ± 0.084 | 0.706 ± 0.061 | 0.546 ± 0.086 | 0.530 ± 0.040 | 0.413 ± 0.079 |
| 4-stage TCN w/ focal-uncertainty-notmse | 0.726 ± 0.083 | 0.609 ± 0.102 | 0.680 ± 0.068 | 0.573 ± 0.109 | 0.494 ± 0.033 | 0.420 ± 0.092 |
| InceptionV3 | 0.122 ± 0.057 | 0.690 ± 0.060 | 0.097 ± 0.046 | 0.549 ± 0.053 | 0.059 ± 0.035 | 0.333 ± 0.052 |
| I3D | 0.050 ± 0.024 | 0.242 ± 0.030 | 0.033 ± 0.018 | 0.155 ± 0.028 | 0.017 ± 0.012 | 0.072 ± 0.028 |
| Stab-I3D | 0.080 ± 0.042 | 0.271 ± 0.027 | 0.054 ± 0.032 | 0.176 ± 0.021 | 0.023 ± 0.016 | 0.072 ± 0.013 |

TABLE 14

Performance metrics are computed as mean ± standard error based on five-fold cross-validation at thresholds shown in soft event-wise performance.

| | model | Precision@0.1 | Recall@0.1 | Precision@0.25 | Recall@0.25 | Precision@0.5 | Recall@0.5 |
|---|---|---|---|---|---|---|---|
| bleeding | 1-stage Stab-TCN w/ focal-uncertainty | 0.104 ± 0.016 | 0.475 ± 0.034 | 0.073 ± 0.010 | 0.388 ± 0.017 | 0.037 ± 0.008 | 0.241 ± 0.034 |
| | 1-stage Stab-TCN w/ focal-uncertainty-notmse | 0.090 ± 0.013 | 0.433 ± 0.044 | 0.067 ± 0.010 | 0.364 ± 0.048 | 0.039 ± 0.008 | 0.247 ± 0.026 |
| | 1-stage TCN w/ focal-uncertainty | 0.056 ± 0.016 | 0.682 ± 0.055 | 0.033 ± 0.010 | 0.561 ± 0.059 | 0.013 ± 0.004 | 0.340 ± 0.074 |
| | 1-stage TCN w/ focal-uncertainty-notmse | 0.039 ± 0.004 | 0.798 ± 0.084 | 0.025 ± 0.002 | 0.718 ± 0.112 | 0.012 ± 0.002 | 0.569 ± 0.130 |
| | 4-label 1-stage Stab-TCN w/ normal | 0.089 ± 0.010 | 0.651 ± 0.033 | 0.051 ± 0.008 | 0.515 ± 0.033 | 0.021 ± 0.004 | 0.306 ± 0.043 |
| | 4-label 1-stage Stab-TCN w/ focal | 0.057 ± 0.012 | 0.782 ± 0.044 | 0.033 ± 0.009 | 0.678 ± 0.050 | 0.015 ± 0.004 | 0.481 ± 0.030 |
| | 4-label 1-stage Stab-TCN w/ focal-uncertainty | 0.067 ± 0.009 | 0.743 ± 0.018 | 0.040 ± 0.006 | 0.634 ± 0.028 | 0.018 ± 0.003 | 0.434 ± 0.031 |
| | 4-label 1-stage Stab-TCN w/ uncertainty | 0.117 ± 0.043 | 0.588 ± 0.105 | 0.075 ± 0.029 | 0.480 ± 0.104 | 0.038 ± 0.024 | 0.301 ± 0.065 |

TABLE 14-continued

Performance metrics are computed as mean ± standard error based on five-fold cross-validation at thresholds shown in soft event-wise performance.

|  | model | Precision@0.1 | Recall@0.1 | Precision@0.25 | Recall@0.25 | Precision@0.5 | Recall@0.5 |
|---|---|---|---|---|---|---|---|
|  | 4-label 1-stage TCN w/ normal | 0.285 ± 0.001 | 0.280 ± 0.048 | 0.202 ± 0.058 | 0.213 ± 0.035 | 0.108 ± 0.032 | 0.126 ± 0.017 |
|  | 4-label 1-stage TCN w/ focal | 0.228 ± 0.059 | 0.328 ± 0.033 | 0.166 ± 0.058 | 0.259 ± 0.031 | 0.092 ± 0.026 | 0.163 ± 0.015 |
|  | 4-label 1-stage TCN w/ focal-uncertainty | 0.202 ± 0.062 | 0.352 ± 0.059 | 0.141 ± 0.067 | 0.264 ± 0.033 | 0.084 ± 0.044 | 0.172 ± 0.010 |
|  | 4-label 1-stage TCN w/ uncertainty | 0.295 ± 0.059 | 0.275 ± 0.059 | 0.222 ± 0.056 | 0.220 ± 0.050 | 0.127 ± 0.036 | 0.137 ± 0.027 |
|  | 4-label 4-stage Stab-TCN w/ normal | 0.454 ± 0.053 | 0.239 ± 0.028 | 0.351 ± 0.047 | 0.195 ± 0.022 | 0.208 ± 0.025 | 0.126 ± 0.018 |
|  | 4-label 4-stage Stab-TCN w/ focal | 0.253 ± 0.052 | 0.542 ± 0.050 | 0.164 ± 0.051 | 0.428 ± 0.032 | 0.076 ± 0.032 | 0.251 ± 0.035 |
|  | 4-label 4-stage Stab-TCN w/ focal-uncertainty | 0.239 ± 0.035 | 0.560 ± 0.026 | 0.151 ± 0.035 | 0.442 ± 0.039 | 0.071 ± 0.029 | 0.204 ± 0.035 |
|  | 4-label 4-stage Stab-TCN w/ focal-uncertainty-notmse | 0.173 ± 0.035 | 0.623 ± 0.097 | 0.100 ± 0.027 | 0.490 ± 0.083 | 0.045 ± 0.016 | 0.301 ± 0.005 |
|  | 4-label 4-stage TCN w/ uncertainty | 0.483 ± 0.060 | 0.244 ± 0.052 | 0.356 ± 0.023 | 0.193 ± 0.044 | 0.218 ± 0.040 | 0.129 ± 0.040 |
|  | 4-label 4-stage TCN w/ normal | 0.505 ± 0.053 | 0.245 ± 0.030 | 0.374 ± 0.089 | 0.192 ± 0.031 | 0.234 ± 0.058 | 0.129 ± 0.022 |
|  | 4-label 4-stage TCN w/ focal | 0.394 ± 0.078 | 0.294 ± 0.037 | 0.306 ± 0.109 | 0.237 ± 0.026 | 0.168 ± 0.064 | 0.145 ± 0.017 |
|  | 4-label 4-stage TCN w/ focal-uncertainty | 0.424 ± 0.100 | 0.302 ± 0.064 | 0.327 ± 0.083 | 0.250 ± 0.058 | 0.180 ± 0.055 | 0.156 ± 0.026 |
|  | 4-label 4-stage TCN w/ uncertainty | 0.484 ± 0.075 | 0.271 ± 0.035 | 0.339 ± 0.058 | 0.208 ± 0.040 | 0.205 ± 0.069 | 0.133 ± 0.032 |
|  | 4-stage Stab-TCN w/ focal-uncertainty | 0.264 ± 0.089 | 0.414 ± 0.101 | 0.162 ± 0.062 | 0.297 ± 0.058 | 0.070 ± 0.036 | 0.153 ± 0.050 |
|  | 4-stage Stab-TCN w/ focal-uncertainty-notmse | 0.241 ± 0.042 | 0.414 ± 0.022 | 0.182 ± 0.022 | 0.350 ± 0.015 | 0.096 ± 0.013 | 0.220 ± 0.013 |
|  | 4-stage TCN w/ focal-uncertainty | 0.298 ± 0.053 | 0.370 ± 0.041 | 0.201 ± 0.039 | 0.284 ± 0.041 | 0.099 ± 0.018 | 0.165 ± 0.037 |
|  | 4-stage TCN w/ focal-uncertainty-notmse | 0.199 ± 0.030 | 0.463 ± 0.052 | 0.132 ± 0.020 | 0.367 ± 0.063 | 0.065 ± 0.018 | 0.225 ± 0.065 |
|  | I3D | 0.027 ± 0.003 | 0.815 ± 0.060 | 0.020 ± 0.004 | 0.764 ± 0.075 | 0.010 ± 0.001 | 0.038 ± 0.098 |
|  | InceptionV3 | 0.009 ± 0.003 | 0.750 ± 0.143 | 0.006 ± 0.002 | 0.563 ± 0.192 | 0.003 ± 0.001 | 0.500 ± 0.284 |
|  | Stab-I3D | 0.024 ± 0.003 | 0.807 ± 0.080 | 0.019 ± 0.003 | 0.775 ± 0.083 | 0.011 ± 0.001 | 0.661 ± 0.117 |
| thermal injury | 1-stage Stab-TCN w/ focal-uncertainty | 0.743 ± 0.017 | 0.649 ± 0.062 | 0.630 ± 0.018 | 0.011 ± 0.068 | 0.411 ± 0.034 | 0.508 ± 0.079 |
|  | 1-stage Stab-TCN w/ focal-uncertainty-notmse | 0.680 ± 0.018 | 0.631 ± 0.007 | 0.019 ± 0.014 | 0.009 ± 0.007 | 0.432 ± 0.018 | 0.523 ± 0.076 |
|  | 1-stage TCN w/ focal-uncertainty | 0.758 ± 0.059 | 0.639 ± 0.062 | 0.697 ± 0.050 | 0.020 ± 0.003 | 0.511 ± 0.045 | 0.546 ± 0.063 |
|  | 1-stage TCN w/ focal-uncertainty-notmse | 0.741 ± 0.078 | 0.628 ± 0.061 | 0.686 ± 0.064 | 0.610 ± 0.064 | 0.504 ± 0.034 | 0.536 ± 0.070 |
|  | 4-label 1-stage Stab-TCN w/ normal | 0.099 ± 0.020 | 0.541 ± 0.130 | 0.035 ± 0.017 | 0.272 ± 0.103 | 0.009 ± 0.006 | 0.107 ± 0.060 |
|  | 4-label 1-stage Stab-TCN w/ focal | 0.096 ± 0.022 | 0.660 ± 0.118 | 0.038 ± 0.013 | 0.448 ± 0.164 | 0.013 ± 0.006 | 0.224 ± 0.120 |
|  | 4-label 1-stage Stab-TCN w/ focal-uncertainty | 0.103 ± 0.011 | 0.653 ± 0.114 | 0.042 ± 0.010 | 0.445 ± 0.150 | 0.011 ± 0.007 | 0.201 ± 0.153 |
|  | 4-label 1-stage Stab-TCN w/ uncertainty | 0.109 ± 0.012 | 0.530 ± 0.093 | 0.038 ± 0.009 | 0.288 ± 0.090 | 0.009 ± 0.004 | 0.090 ± 0.053 |
|  | 4-label 1-stage TCN w/ normal | 0.722 ± 0.047 | 0.587 ± 0.047 | 0.572 ± 0.037 | 0.530 ± 0.050 | 0.343 ± 0.054 | 0.403 ± 0.062 |
|  | 4-label 1-stage TCN w/ focal | 0.716 ± 0.063 | 0.640 ± 0.066 | 0.575 ± 0.048 | 0.589 ± 0.068 | 0.371 ± 0.049 | 0.482 ± 0.071 |
|  | 4-label 1-stage TCN w/ focal-uncertainty | 0.695 ± 0.023 | 0.653 ± 0.070 | 0.545 ± 0.047 | 0.596 ± 0.073 | 0.351 ± 0.043 | 0.489 ± 0.075 |
|  | 4-label 1-stage TCN w/ uncertainty | 0.691 ± 0.039 | 0.600 ± 0.057 | 0.527 ± 0.078 | 0.532 ± 0.067 | 0.322 ± 0.079 | 0.407 ± 0.084 |
|  | 4-label 4-stage Stab-TCN w/ normal | 0.621 ± 0.136 | 0.378 ± 0.033 | 0.331 ± 0.129 | 0.236 ± 0.044 | 0.122 ± 0.061 | 0.100 ± 0.033 |
|  | 4-label 4-stage Stab-TCN w/ focal | 0.130 ± 0.031 | 0.409 ± 0.054 | 0.047 ± 0.018 | 0.202 ± 0.077 | 0.009 ± 0.005 | 0.046 ± 0.027 |
|  | 4-label 4-stage Stab-TCN w/ focal-uncertainty | 0.135 ± 0.002 | 0.455 ± 0.078 | 0.041 ± 0.007 | 0.205 ± 0.053 | 0.009 ± 0.002 | 0.055 ± 0.029 |
|  | 4-label 4-stage Stab-TCN w/ focal-uncertainty-notmse | 0.120 ± 0.019 | 0.535 ± 0.136 | 0.031 ± 0.014 | 0.225 ± 0.105 | 0.005 ± 0.002 | 0.062 ± 0.042 |
|  | 4-label 4-stage TCN w/ uncertainty | 0.076 ± 0.011 | 0.286 ± 0.135 | 0.411 ± 0.197 | 0.178 ± 0.085 | 0.155 ± 0.092 | 0.072 ± 0.033 |
|  | 4-label 4-stage TCN w/ normal | 0.770 ± 0.042 | 0.517 ± 0.065 | 0.584 ± 0.061 | 0.448 ± 0.074 | 0.340 ± 0.078 | 0.322 ± 0.079 |
|  | 4-label 4-stage TCN w/ focal | 0.727 ± 0.049 | 0.571 ± 0.065 | 0.569 ± 0.041 | 0.512 ± 0.090 | 0.334 ± 0.050 | 0.384 ± 0.092 |

TABLE 14-continued

Performance metrics are computed as mean ± standard error based on five-fold cross-validation at thresholds shown in soft event-wise performance.

| model | Precision@0.1 | Recall@0.1 | Precision@0.25 | Recall@0.25 | Precision@0.5 | Recall@0.5 |
|---|---|---|---|---|---|---|
| 4-label 4-stage TCN w/ focal-uncertainty | 0.722 ± 0.056 | 0.581 ± 0.094 | 0.514 ± 0.104 | 0.494 ± 0.091 | 0.313 ± 0.083 | 0.373 ± 0.096 |
| 4-label 4-stage TCN w/ uncertainty | 0.718 ± 0.116 | 0.539 ± 0.126 | 0.550 ± 0.129 | 0.474 ± 0.129 | 0.331 ± 0.094 | 0.359 ± 0.137 |
| 4-stage Stab-TCN w/ focal-uncertainty | 0.766 ± 0.045 | 0.087 ± 0.055 | 0.637 ± 0.060 | 0.646 ± 0.066 | 0.391 ± 0.059 | 0.529 ± 0.084 |
| 4-stage Stab-TCN w/ focal-uncertainty-notmse | 0.698 ± 0.043 | 0.026 ± 0.064 | 0.645 ± 0.037 | 0.007 ± 0.067 | 0.443 ± 0.020 | 0.517 ± 0.072 |
| 4-stage TCN w/ focal-uncertainty | 0.763 ± 0.070 | 0.613 ± 0.080 | 0.698 ± 0.052 | 0.593 ± 0.091 | 0.524 ± 0.028 | 0.525 ± 0.100 |
| 4-stage TCN w/ focal-uncertainty-notmse | 0.760 ± 0.077 | 0.645 ± 0.084 | 0.682 ± 0.041 | 0.621 ± 0.099 | 0.508 ± 0.013 | 0.552 ± 0.112 |
| I3D | 0.052 ± 0.022 | 0.841 ± 0.061 | 0.030 ± 0.016 | 0.748 ± 0.089 | 0.016 ± 0.010 | 0.594 ± 0.158 |
| InceptionV3 | 0.157 ± 0.082 | 0.780 ± 0.050 | 0.137 ± 0.072 | 0.756 ± 0.060 | 0.095 ± 0.052 | 0.682 ± 0.080 |
| Stab-I3D | 0.081 ± 0.640 | 0.721 ± 0.075 | 0.048 ± 0.024 | 0.006 ± 0.099 | 0.022 ± 0.013 | 0.415 ± 0.108 |

Table 15, shown below, represents the performance metrics shown in, for example FIGS. 11A and 11B, numerically for example models.

TABLE 15

Model comparison. Model comparison with the following metrics computed as mean ± standard error based on five-fold cross-validation, ROCAUC (area under the ROC curve), AP (average precision) and IOU is intersection over union.

| | model | ROCAUC | AP | AP@IOU = 0.1 | AP@IOU = 0.25 | AP@IOU = 0.5 |
|---|---|---|---|---|---|---|
| bleeding | 1-stage Stab-TCN w/ focal-uncertainty | 0.830 ± 0.029 | 0.377 ± 0.088 | 0.053 ± 0.011 | 0.026 ± 0.008 | 0.007 ± 0.002 |
| | 1-stage Stab-TCN w/ focal-uncertainty-notmse | 0.814 ± 0.018 | 0.350 ± 0.074 | 0.064 ± 0.010 | 0.033 ± 0.005 | 0.008 ± 0.004 |
| | 1-stage TCN w/ focal-uncertainty | 0.821 ± 0.030 | 0.384 ± 0.111 | 0.058 ± 0.007 | 0.025 ± 0.006 | 0.006 ± 0.001 |
| | 1-stage TCN w/ focal-uncertainty-notmse | 0.810 ± 0.028 | 0.368 ± 0.100 | 0.074 ± 0.008 | 0.035 ± 0.004 | 0.008 ± 0.002 |
| | 4-label 1-stage Stab-TCN w/ normal | 0.847 ± 0.023 | 0.375 ± 0.103 | 0.088 ± 0.016 | 0.043 ± 0.009 | 0.010 ± 0.003 |
| | 4-label 1-stage Stab-TCN w/ focal | 0.850 ± 0.029 | 0.388 ± 0.112 | 0.070 ± 0.007 | 0.038 ± 0.006 | 0.012 ± 0.004 |
| | 4-label 1-stage Stab-TCN w/ focal-uncertainty | 0.853 ± 0.023 | 0.376 ± 0.097 | 0.068 ± 0.013 | 0.034 ± 0.009 | 0.008 ± 0.003 |
| | 4-label 1-stage Stab-TCN w/ uncertainty | 0.844 ± 0.023 | 0.374 ± 0.112 | 0.094 ± 0.021 | 0.052 ± 0.019 | 0.012 ± 0.001 |
| | 4-label 1-stage TCN w/ normal | 0.843 ± 0.030 | 0.390 ± 0.121 | 0.127 ± 0.010 | 0.065 ± 0.009 | 0.016 ± 0.007 |
| | 4-label 1-stage TCN w/ focal | 0.844 ± 0.029 | 0.394 ± 0.113 | 0.077 ± 0.018 | 0.041 ± 0.012 | 0.011 ± 0.004 |
| | 4-label 1-stage TCN w/ focal-uncertainty | 0.841 ± 0.029 | 0.384 ± 0.117 | 0.080 ± 0.012 | 0.042 ± 0.009 | 0.012 ± 0.006 |
| | 4-label 1-stage TCN w/ uncertainty | 0.845 ± 0.032 | 0.399 ± 0.117 | 0.116 ± 0.015 | 0.058 ± 0.012 | 0.018 ± 0.005 |
| | 4-label 4-stage Stab-TCN w/ normal | 0.846 ± 0.033 | 0.363 ± 0.109 | 0.179 ± 0.032 | 0.100 ± 0.023 | 0.029 ± 0.012 |
| | 4-label 4-stage Stab-TCN w/ focal | 0.851 ± 0.026 | 0.371 ± 0.113 | 0.176 ± 0.039 | 0.097 ± 0.028 | 0.028 ± 0.013 |
| | 4-label 4-stage Stab-TCN w/ focal-uncertainty | 0.836 ± 0.027 | 0.360 ± 0.090 | 0.180 ± 0.037 | 0.103 ± 0.022 | 0.032 ± 0.011 |
| | 4-label 4-stage Stab-TCN w/ focal-uncertainty-notmse | 0.829 ± 0.026 | 0.355 ± 0.104 | 0.155 ± 0.038 | 0.093 ± 0.032 | 0.026 ± 0.010 |
| | 4-label 4-stage TCN w/ uncertainty | 0.830 ± 0.021 | 0.351 ± 0.104 | 0.153 ± 0.024 | 0.096 ± 0.023 | 0.027 ± 0.009 |
| | 4-label 4-stage TCN w/ normal | 0.826 ± 0.043 | 0.393 ± 0.125 | 0.166 ± 0.026 | 0.096 ± 0.029 | 0.035 ± 0.019 |
| | 4-label 4-stage TCN w/ focal | 0.844 ± 0.036 | 0.373 ± 0.133 | 0.167 ± 0.032 | 0.086 ± 0.024 | 0.028 ± 0.014 |
| | 4-label 4-stage TCN w/ focal-uncertainty | 0.851 ± 0.031 | 0.387 ± 0.126 | 0.175 ± 0.023 | 0.097 ± 0.021 | 0.030 ± 0.008 |
| | 4-label 4-stage TCN w/ uncertainty | 0.836 ± 0.032 | 0.383 ± 0.126 | 0.177 ± 0.019 | 0.102 ± 0.022 | 0.029 ± 0.009 |
| | 4-stage Stab-TCN w/ focal-uncertainty | 0.798 ± 0.030 | 0.356 ± 0.105 | 0.130 ± 0.019 | 0.074 ± 0.008 | 0.020 ± 0.004 |

TABLE 15-continued

Model comparison. Model comparison with the following metrics computed as mean ± standard error based on five-fold cross-validation, ROCAUC (area under the ROC curve), AP (average precision) and IOU is intersection over union.

|  | model | ROCAUC | AP | AP@IOU = 0.1 | AP@IOU = 0.25 | AP@IOU = 0.5 |
|---|---|---|---|---|---|---|
|  | 4-stage Stab-TCN w/ focal-uncertainty-notmse | 0.803 ± 0.030 | 0.356 ± 0.102 | 0.135 ± 0.029 | 0.078 ± 0.019 | 0.030 ± 0.008 |
|  | 4-stage TCN w/ focal-uncertainty | 0.792 ± 0.046 | 0.360 ± 0.117 | 0.121 ± 0.018 | 0.064 ± 0.011 | 0.015 ± 0.003 |
|  | 4-stage TCN w/ focal-uncertainty-notmse | 0.776 ± 0.038 | 0.353 ± 0.118 | 0.130 ± 0.013 | 0.071 ± 0.017 | 0.018 ± 0.005 |
|  | I3D | 0.740 ± 0.065 | 0.237 ± 0.080 | 0.111 ± 0.114 | 0.043 ± 0.056 | 0.016 ± 0.028 |
|  | InceptionV3 | 0.781 ± 0.023 | 0.293 ± 0.065 | 0.097 ± 0.036 | 0.038 ± 0.018 | 0.006 ± 0.007 |
|  | Stab-I3D | 0.774 ± 0.008 | 0.246 ± 0.062 | 0.126 ± 0.037 | 0.062 ± 0.022 | 0.017 ± 0.010 |
| thermal injury | 1-stage Stab-TCN w/ focal-uncertainty | 0.947 ± 0.016 | 0.533 ± 0.033 | 0.426 ± 0.047 | 0.321 ± 0.025 | 0.131 ± 0.012 |
|  | 1-stage Stab-TCN w/ focal-uncertainty-notmse | 0.955 ± 0.018 | 0.566 ± 0.035 | 0.530 ± 0.056 | 0.434 ± 0.035 | 0.193 ± 0.029 |
|  | 1-stage TCN w/ focal-uncertainty | 0.929 ± 0.040 | 0.501 ± 0.082 | 0.461 ± 0.038 | 0.387 ± 0.039 | 0.175 ± 0.025 |
|  | 1-stage TCN w/ focal-uncertainty-notmse | 0.932 ± 0.062 | 0.525 ± 0.090 | 0.517 ± 0.046 | 0.423 ± 0.061 | 0.209 ± 0.047 |
|  | 4-label 1-stage Stab-TCN w/ normal | 0.943 ± 0.015 | 0.434 ± 0.030 | 0.242 ± 0.051 | 0.147 ± 0.037 | 0.031 ± 0.007 |
|  | 4-label 1-stage Stab-TCN w/ focal | 0.951 ± 0.017 | 0.467 ± 0.026 | 0.255 ± 0.063 | 0.174 ± 0.052 | 0.046 ± 0.020 |
|  | 4-label 1-stage Stab-TCN w/ focal-uncertainty | 0.953 ± 0.017 | 0.480 ± 0.030 | 0.268 ± 0.049 | 0.179 ± 0.042 | 0.049 ± 0.018 |
|  | 4-label 1-stage Stab-TCN w/ uncertainty | 0.948 ± 0.014 | 0.437 ± 0.039 | 0.241 ± 0.069 | 0.152 ± 0.052 | 0.039 ± 0.018 |
|  | 4-label 1-stage TCN w/ normal | 0.913 ± 0.067 | 0.454 ± 0.073 | 0.398 ± 0.032 | 0.304 ± 0.037 | 0.127 ± 0.021 |
|  | 4-label 1-stage TCN w/ focal | 0.933 ± 0.045 | 0.493 ± 0.073 | 0.416 ± 0.022 | 0.320 ± 0.018 | 0.145 ± 0.017 |
|  | 4-label 1-stage TCN w/ focal-uncertainty | 0.935 ± 0.043 | 0.491 ± 0.070 | 0.398 ± 0.038 | 0.302 ± 0.038 | 0.127 ± 0.018 |
|  | 4-label 1-stage TCN w/ uncertainty | 0.937 ± 0.045 | 0.461 ± 0.073 | 0.389 ± 0.036 | 0.301 ± 0.038 | 0.123 ± 0.019 |
|  | 4-label 4-stage Stab-TCN w/ normal | 0.920 ± 0.017 | 0.397 ± 0.038 | 0.182 ± 0.048 | 0.108 ± 0.041 | 0.023 ± 0.010 |
|  | 4-label 4-stage Stab-TCN w/ focal | 0.931 ± 0.016 | 0.403 ± 0.039 | 0.180 ± 0.031 | 0.099 ± 0.020 | 0.021 ± 0.007 |
|  | 4-label 4-stage Stab-TCN w/ focal-uncertainty | 0.937 ± 0.022 | 0.426 ± 0.036 | 0.211 ± 0.023 | 0.127 ± 0.028 | 0.029 ± 0.006 |
|  | 4-label 4-stage Stab-TCN w/ focal-uncertainty-notmse | 0.909 ± 0.013 | 0.362 ± 0.029 | 0.187 ± 0.030 | 0.099 ± 0.028 | 0.021 ± 0.006 |
|  | 4-label 4-stage TCN w/ uncertainty | 0.905 ± 0.018 | 0.362 ± 0.020 | 0.169 ± 0.023 | 0.097 ± 0.013 | 0.020 ± 0.004 |
|  | 4-label 4-stage TCN w/ normal | 0.881 ± 0.040 | 0.382 ± 0.043 | 0.312 ± 0.037 | 0.229 ± 0.035 | 0.094 ± 0.024 |
|  | 4-label 4-stage TCN w/ focal | 0.903 ± 0.049 | 0.409 ± 0.073 | 0.328 ± 0.042 | 0.258 ± 0.029 | 0.104 ± 0.023 |
|  | 4-label 4-stage TCN w/ focal-uncertainty | 0.895 ± 0.062 | 0.426 ± 0.081 | 0.332 ± 0.063 | 0.257 ± 0.052 | 0.109 ± 0.030 |
|  | 4-label 4-stage TCN w/ uncertainty | 0.894 ± 0.039 | 0.349 ± 0.096 | 0.292 ± 0.049 | 0.210 ± 0.033 | 0.084 ± 0.023 |
|  | 4-stage Stab-TCN w/ focal-uncertainty | 0.930 ± 0.026 | 0.518 ± 0.030 | 0.442 ± 0.052 | 0.352 ± 0.040 | 0.134 ± 0.21 |
|  | 4-stage Stab-TCN w/ focal-uncertainty-notmse | 0.930 ± 0.019 | 0.560 ± 0.041 | 0.506 ± 0.066 | 0.382 ± 0.068 | 0.147 ± 0.023 |
|  | 4-stage TCN w/ focal-uncertainty | 0.885 ± 0.064 | 0.467 ± 0.090 | 0.429 ± 0.033 | 0.351 ± 0.030 | 0.174 ± 0.023 |
|  | 4-stage TCN w/ focal-uncertainty-notmse | 0.904 ± 0.065 | 0.512 ± 0.079 | 0.486 ± 0.068 | 0.390 ± 0.045 | 0.185 ± 0.027 |
|  | I3D | 0.829 ± 0.081 | 0.375 ± 0.088 | 0.424 ± 0.035 | 0.262 ± 0.033 | 0.131 ± 0.025 |
|  | InceptionV3 | 0.903 ± 0.082 | 0.382 ± 0.067 | 0.287 ± 0.037 | 0.194 ± 0.038 | 0.078 ± 0.026 |
|  | Stab-I3D | 0.909 ± 0.020 | 0.298 ± 0.012 | 0.239 ± 0.012 | 0.186 ± 0.012 | 0.040 ± 0.011 |

FIGS. 15-18, in a plot diagrams 1500, 1600, 1700, and 1800, each show an example of prediction plot comparison of models with different loss functions for a full procedure, in accordance with some embodiments. The event plots include vertical bar elements 1502, 1602, 1702, and 1802, representing detection of bleeding events and vertical bar elements 1504, 1604, 1704, and 1804 representing detection of thermal injury events. The threshold values used by the models to generate the event plots in FIGS. 15-18, are shown in Table 12.

In example embodiments, a four stage Stab-TCN system that stabilizes videos to capture object motion and eliminate camera motion in laparoscopic videos, extract spatial-temporal features, and predict and refine event boundaries using multi-stage temporal convolutional layers is proposed. This system, along with a loss function as set out in Equation 2, may accommodate an imbalanced dataset. The proposed four stage Stab-TCN in example embodiments outperforms the baseline models by a large margin.

The four stage Stab-TCN system, in example embodiments, is configured to detect two major types of adverse events in surgical procedures—bleeding and thermal injury. In some example embodiments, this system can be configured to detect other adverse events, for example, mechanical injury. Example embodiments of the system trained to detect multiple adverse events may help a feature extractor module learn more general features, and lead to an increase in model performance.

In example embodiments, the four stage Stab-TCN system is modular, and each module performs a task separately from other modules. An end-to-end four stage Stab-TCN system could improve system performance, and speed up training. A fast stabilizer algorithm may be required to achieve the improved performance of an end-to-end four stage Stab-TCN. An end-to-end I3D-MS-TCN architecture may need to be developed and optimized.

Figure 20:
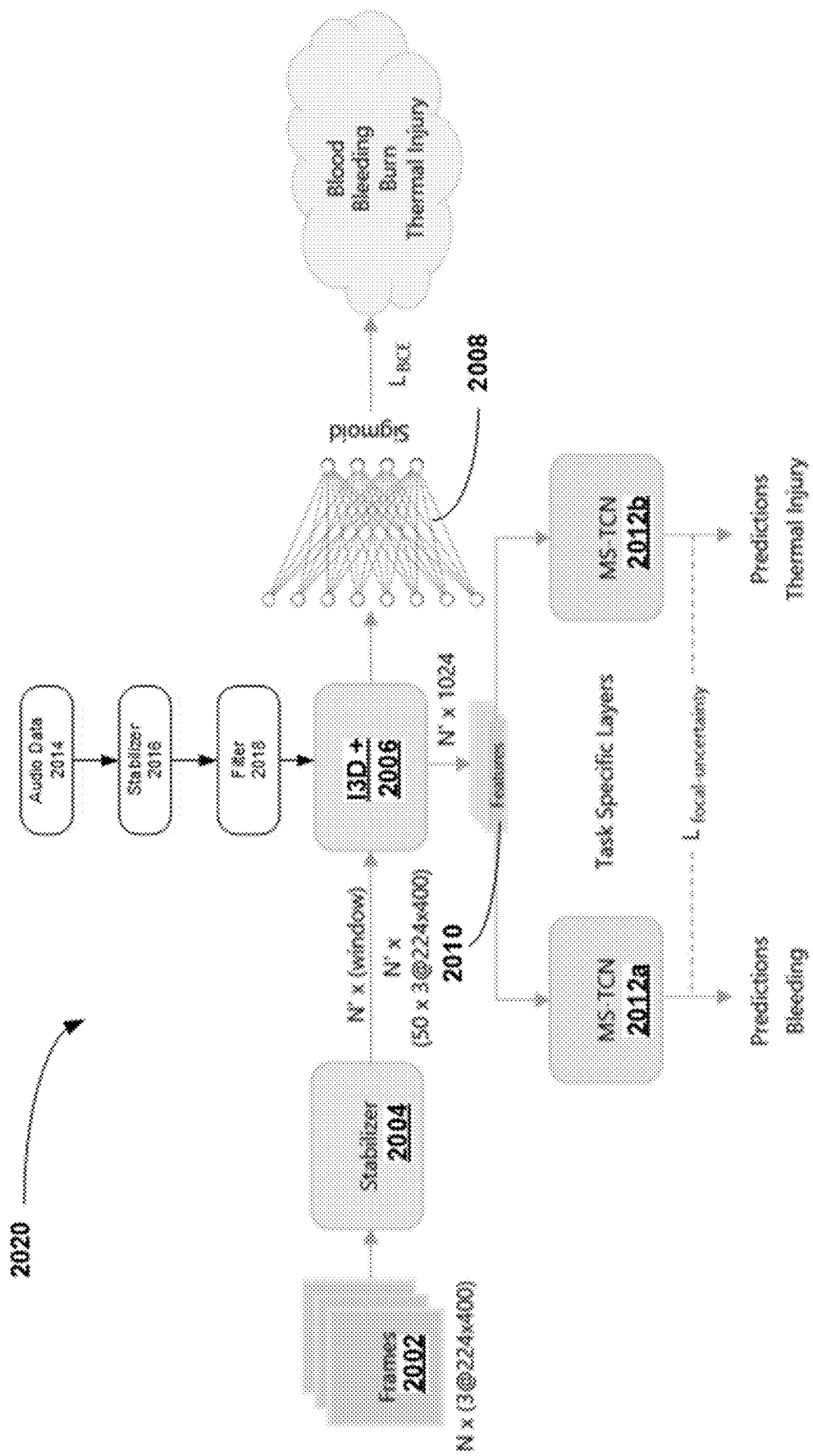
FIG. 20 illustrates, in a flow diagram, an example of a composition and flow of data of each module in a system adapted to receive audio data, in accordance with some embodiments.

In example embodiments, a system can be configured to receive audio data as an input in addition to frame data. Reference is now made to FIG. 20, showing a system 2020 configured to receive audio data 2014. The audio data may comprise audio data received from directional microphones located around the room, or integrated with the device capturing the video data.

The system 2020 is similar to system 420, except system 2020 is adapted to receive audio data 2014, and the second module 2006 shown FIG. 20 comprises additional model elements to incorporate the audio data 2014 into detection and classification of adverse events. In example embodiments, the second module 2006 is comprised of sub-modules, with the audio data 2014 being processed independently of the frames 402 data. In some embodiments, for example, the audio data 2014 is sampled at a rate such that it can be incorporated with the sampled data generated from the processing of the frames 402 data.

In example embodiments, the audio data 2014 is processed by a module 2016 (also referred to as a stabilizer) in a manner similar to the stabilizer 404 operating upon the frames 402. For example, a model may be trained to determine whether a particular loudness in sound is attributed to the relative motion of a microphone and incorporated into the module 2016.

Optionally, the audio data 2014 may be processed by a module 2018 (referred to as a filter) to remove noise. For example, a model may be trained to remove audio data pertaining to ambient noise, human voices, or noise generated by the microphone handling/motion and incorporated into the module 2018. Modules described herein can be implemented using software or hardware components, including electronic circuitry, systems on a chip, application specific integrated circuits, field programmable gate arrays, among others.

Where audio data 2014 is received by the system 2020, training can include various approaches, including the establishment of weak labels, or semi-supervised teacher/student guided learning.

With respect to weak labels, the approach can reduce annotation time as it is more forgiving, but generally, the granularity required for strong labels can be very difficult to achieve (20 ms accuracy).

On the other hand, with semi-supervised teacher/student, guided learning approaches, these approaches may outperform approaches using only supervised learning, and are useful for applications with volumes of unlabelled data, such as for recordings made in an operating room or healthcare facility setting. There can be two sets of data: labelled and unlabelled. Data can be augmented in various situations, for example, by adding Gaussian noise, or conducting transformations, such as masking, pitch shifting, among others. Data augmentation can be used where data requires upsampling, and in some embodiments, unlabelled data is not augmented.

For labelled data, loss can be calculated by comparing student outputs to labels, and for unlabelled data, loss can be calculated by comparing student to teacher outputs. Semi-supervised learning approaches can use a combination of the 2 losses, and in some embodiments, the training approach can use a scales up approach that relies on strong labels at beginning. A mean teacher can be implemented in certain situations where teacher weights are established as a moving average of student weights, and guided learning can use a tCNN for example. A tCNN may, for example, be better at audio tagging. The audio loss can include, as described in various embodiments, cross entropy losses, mean squared errors, etc.

Parameters specific to semi-supervised learning for audio include EMA decay: moving average for mean teacher modifier, consistency weights: effect of unsupervised loss on total loss, per-batch labelled percent (usually 25%-50%), among others. Choice of model(s) used can include CRNN (mean teacher) (CNN feeds into RNN layers{RNN, LSTM, GRU}), guided learning uses a tCNN as teacher, 1D CNN (freq axis) as student, max pooling (can 'find' sounds in a longer clip), attention pooling (used in guided learning), dropout and batchnorm, among others. Additional parameters, according to some embodiments, include sounds sorted into short, medium, and long, and from a design perspective, the median filter size can be established using varying sizes. These sizes can include a median filter as [5,13,41] frames, or [120, 280, 840] ms long.

A specific ontology can be utilized as distractions in the operating room can theoretically affect surgeon performance and patient safety. A macro level analysis of the most common and most severe distractions has been conducted and the results presented in other approaches. However, the effect of these distractions within a surgery (micro level) has not been quantified nor studied. In addition, the classes are not consistent. A distraction class is present in at most 5 of the 17 studies found. Their severity ratings are subjective (as rated by an observer, usually) and inconsistent. Some are observed surgery, while some are in laboratory experiments.

Meanwhile, in the field artificial intelligence and machine learning, a large amount of labelled data is incredibly important for the supervised training of models. However, annotation of said data is time consuming. Sample sizes have to be large, increasing annotation time. This is especially true for the annotation of 'distractions'. An observer must implicitly determine what is considered a 'distraction'. For instance, a loud sound may occur and be assumed to be a distraction, but it may not have actually been a distraction.

In relation to audio, Applicants conducted experimentation with a list of all possible sounds. This list was condensed and adapted to the operating room iteratively, with input from a team of annotators, a deep learning engineer, and a surgeon. Sounds were included or rejected based on the criteria above. The final ontology of sounds is below.

| Potential Distractions | Operating Room Sounds |
|---|---|
| Alarm | Cautery |
| Cell Phone/Pager | Harmonic |
| Door | Insufflation Air |
| Dropped Object | Ligasure |
| Packaging | Stapler |
| Object (stool) dragging | Suction |
| OR Phone | |
| Drawers | |

The sounds represent potential for assisting in an adverse event detection module. For example, thermal injuries can only occur when an energy device (cautery, harmonic, Ligasure™) is on. There might be a direct causation between a distraction and an adverse event.

For supervised machine learning in relation to audio, a weak label approach is described in some embodiments. For audio classification tasks, audio is often transformed into a spectrogram, which gets the frequency magnitudes for audio windows, which is a short slice of the audio. These length of these windows can be very small, typically only a few milliseconds long. As an example, an audio sampled at 44.1 Hz with a 512-frame window is only 12 ms long.

Labels can be essential for supervised machine learning. For audio labels, however, it is very difficult for an annotator to label the onset and offset of an audio event with high granularity. In the example above, the annotator would have to annotate where the sound began and stopped and be correct within 6 milliseconds, which would either be very time consuming, or introduce significant errors in the annotations.

Using weak labels can help address the problem by labelling relatively large sections of audio instead of using specific onsets and offsets. In Applicants' experimentation, audio was broken into 10 second long sections, with labels being assigned to the entire 10s audio. This drastically reduces annotation time and error rates.

The tradeoff of this, however, is that a model might be given 'useless' data. As an example, if an alarm only lasts 1 second long, but the label for a 10s long clip is 'alarm', the model is being fed 9s of irrelevant data. This is where various pooling layers help the model. Pooling layers reduce the dimensionality of a vector. What this can be interpreted as in our model is that the model looks for where in a 10s audio the sound event is occurring.

The two methods of pooling in the experimental work were maxpooling and attention pooling. Max pooling takes the maximum vector value to reduce dimensionality. For example [1,5,2,3] becomes just [5]. In attention pooling, the model learns which parts of an audio are most relevant to the labels, and focuses on those parts of the model output.

To address issues in supervised machine learning where labels are not fully established, unlabelled and labelled data can be used whereby labelled data can be used to improve labelling for the unlabelled data. To address this challenge, Applicants describe using semi-supervised training methods to improved unlabelled data. The mean teacher method uses two identical models. The model weights of the student model are calculated as normal using backpropagation. However, the teacher's weights are determined by using the moving average of the student weights. Instead of using a standard loss function to determine the student weights, a custom loss function is used, which is a combination of classification cost (loss between student and label) and consistency cost (loss between student and teacher). The student model learns from labelled examples, and then uses the teacher to become robust to noise.

FIG. 21A and FIG. 21B are charts showing results for guided learning in relation to distractions and operating room sounds, according to some embodiments.

FIG. 22 is a chart showing results comparing a mean teacher approach as opposed to guided learning, according to some embodiments.

Figure 23:
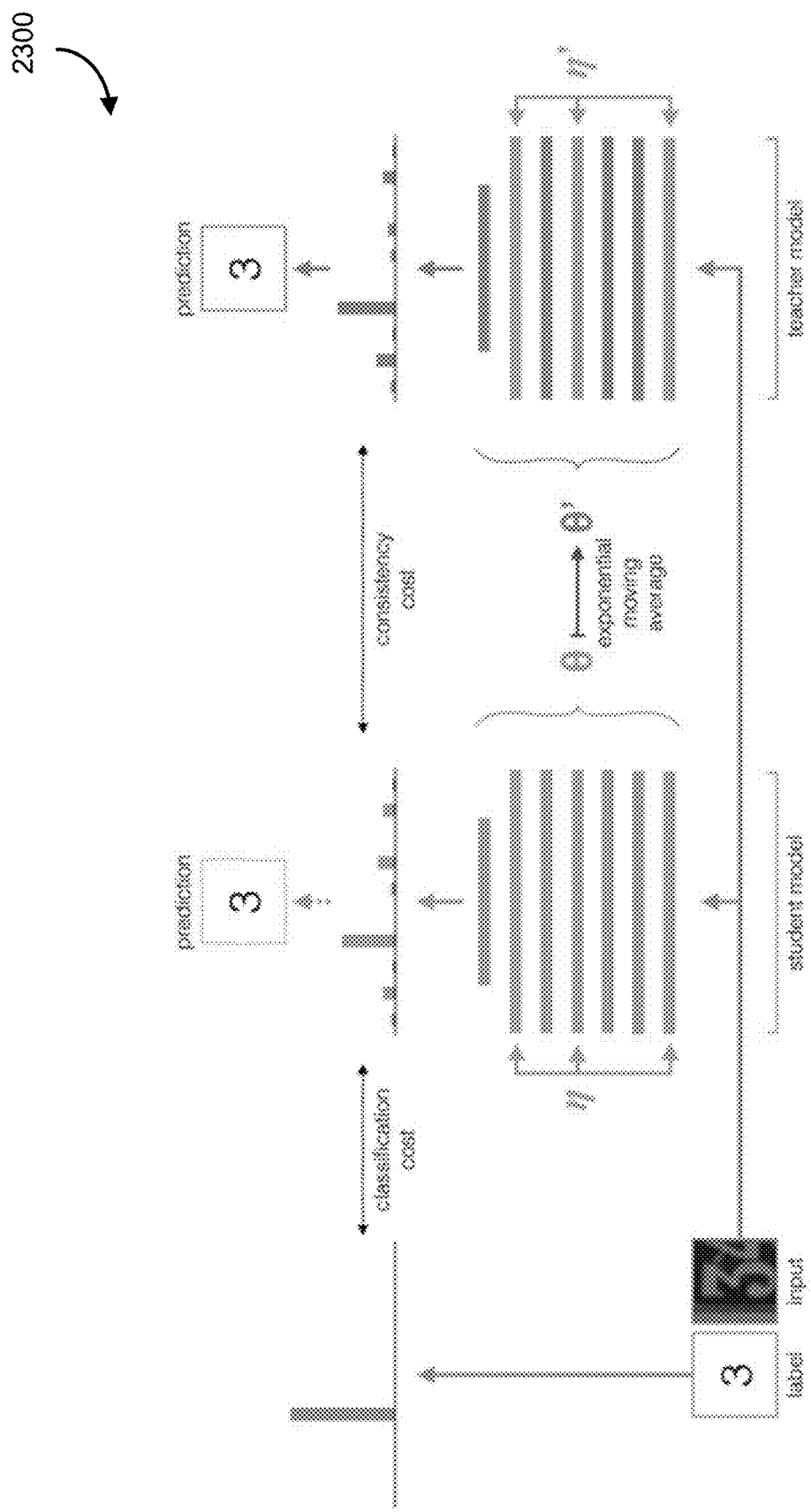
FIG. 23 is a diagram that illustrates an approach to provide a student model that allows a mechanism to establish labels for unlabelled data, according to some embodiments.

FIG. 23 is a diagram 2300 that illustrates an approach to provide a student model that allows a mechanism to establish labels for unlabelled data, according to some embodiments.

Guided learning uses the same student-teacher training methods. However, the teacher, instead of being a moving average, is a completely different model. For sound event detection, the teacher is a temporal CNN, meaning the teacher is very good at global classification. The student, however, is a 1D CNN along the frequency axis (not in time). The effect of this is that the student learns the features, while the teacher learns what labels exist globally. The student can then focus on features while learning from the teacher's global predictions.

According to some embodiments, all video feeds and audio feeds may be recorded and synchronized for an entire medical procedure. Without video, audio and data feeds being synchronized, rating tools designed to measure the technical skill and/or non-technical skill during the medical procedure may not be able to gather useful data on the mechanisms leading to adverse events/outcomes and establish correlation between performance and clinical outcomes.

According to some embodiments, measurements taken (e.g., error rates, number of adverse events, individual/team/technology performance parameters) may be collected in a cohesive manner. According to some embodiments, data analysis may establish correlations between all registered parameters if/as appropriate. With these correlations, hazard zones may be pinpointed, high-stakes assessment programs may be developed and/or educational interventions may be designed.

The following discussion provides many example embodiments of the inventive subject matter. Although each embodiment represents a single combination of inventive elements, the inventive subject matter is considered to include all possible combinations of the disclosed elements. Thus, if one embodiment comprises elements A, B, and C, and a second embodiment comprises elements B and D, then the inventive subject matter is also considered to include other remaining combinations of A, B, C, or D, even if not explicitly disclosed.

The embodiments of the devices, systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

Throughout the foregoing discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described herein are implemented by physical computer hardware, including computing devices, servers, receivers, transmitters, processors, memory, displays, and networks. The embodiments described herein provide useful physical machines and particularly configured computer hardware arrangements.

Although the embodiments have been described in detail, it should be understood that various changes, substitutions and alterations can be made herein.

Moreover, the scope of the present application is not intended to be limited to the particular embodiments of the process, machine, manufacture, composition of matter, means, methods and steps described in the specification.

As can be understood, the examples described above and illustrated are intended to be exemplary only.

What is claimed is:

1. A system for automatically generating data structures configured to store classifications relating to an adverse event based on audio or video data, the classifications based at least on a plurality of classification tasks for injury event detection, the system comprising:
   a processor, operating in conjunction with computer memory, the processor configured to:
   receive a set of audio or video data;
   extract, using a feature extractor neural network, a vector of latent features from the set of audio or video data;
   provide, to each of a plurality of time-based classifiers, the vector of latent features from the feature extractor neural network, each time-based classifier corresponding to a classification task of the plurality of classification tasks configured to detect an injury event;
   train the feature extractor neural network on a training data set using a sigmoid binary cross-entropy loss and a regression loss; and
   train each time-based classifier of the plurality of time-based classifiers separately on each classification task of the plurality of classification tasks with a loss function that includes at least the sigmoid binary cross-entropy loss and the regression loss;
   wherein the regression loss is a truncated mean-square error (T-MSE) that minimizes a number of transitions from one action to another, and the combination of the regression loss and the sigmoid binary cross-entropy loss adapts the feature extractor neural network for multi-task event detection;
   wherein the loss function is optimized for event-wise metric performance, based at least on intersection over union thresholds, over frame-wise metric performance by (1) incorporating a focal loss term to address class imbalance by scaling the loss function for each time-based classifier by a factor of 1−p, where p is a confidence value of a prediction, and (2) incorporating an uncertainty loss in the loss function for each time-based classifier by adding a trainable weight $\sigma^2_c$ to each task, the trainable weight representing a learnable scalar.

2. The system of claim 1, wherein the set of audio or video data includes a set of video frames that have been stabilized to reduce camera motion through the use of bundled-camera path stabilization that reduces jitter and smooths camera paths so that the latent features are accumulated across a plurality of frames.

3. The system of claim 2, wherein stabilization includes warping images to align each frame's camera view based at least on homography.

4. The system of claim 1, wherein the feature extractor neural network is a three dimensional (3D) or two-dimensional (2D) convolutional network.

5. The system of claim 1, wherein the classification tasks include at least bleeding and thermal injury detection, and wherein the classification tasks are causally distinct and include distinguishing active injury events from prior injury artifacts.

6. The system of claim 1, wherein the loss function for each time-based classifier further includes both focal and the uncertainty loss wherein the loss function is based on the relation:

$$\mathcal{L}_{focal\text{-}uncertainty} = \left(\frac{1}{CN}\sum_c\sum_n \frac{1}{\sigma_c^2}(1-p_{cn})\mathcal{L}_{BCE_{cn}} + \log\sigma_c\right) + \lambda\mathcal{L}_{T\text{-}MSE};$$

where C is a number of classes, N is a number of samples, A is a smoothing loss constant, $L_{BCE_{cn}}$ is a corresponding binary cross entropy of class c and sample n, $p_{cn}$ is a confidence probability of a prediction of class c at sample n, and $\sigma^2_c$ is the learnable scalar added from the uncertainty loss.

7. The system of claim 1, wherein the processor is configured to receive a set of audio data, and the feature extractor neural network extracts the vector of latent features from a combination of the set of audio data and the set of video data.

8. The system of claim 7, wherein the training data set includes both training video data and training audio data.

9. A method for automatically generating data structures configured to store classifications relating to an adverse event based on audio or video data, the classifications based at least on a plurality of classification tasks, the method comprising:

receiving a set of audio or video data;
extracting, using a feature extractor neural network, a vector of latent features from the set of audio or video data;
providing, to each of a plurality of time-based classifiers, the vector of latent features from the feature extractor neural network, each time-based classifier corresponding to a classification task of the plurality of classification tasks configured to detect an injury event;
training the feature extractor neural network on a training data set using a sigmoid binary cross-entropy loss and a regression loss; and
training each time-based classifier of the plurality of time-based classifiers separately on each classification task of the plurality of classification tasks with a loss function that includes at least the sigmoid binary cross-entropy loss and the regression loss;
wherein the regression loss is a truncated mean-square error (T-MSE) that minimizes a number of transitions from one action to another, and the combination of the regression loss and the sigmoid binary cross-entropy loss adapts the feature extractor neural network for multi-task event detection;
wherein the loss function is optimized for event-wise metric performance, based at least on intersection over union thresholds, over frame-wise metric performance by (1) incorporating a focal loss term to address class imbalance by scaling the loss function for each time-based classifier by a factor of 1−p, where p is a confidence value of a prediction, and (2) incorporating an uncertainty loss in the loss function for each time-based classifier by adding a trainable weight $\sigma^2_c$ to each task, the trainable weight representing a learnable scalar.

10. The method of claim 9, wherein the set of audio or video data includes a set of video frames that have been stabilized to reduce camera motion through the use of bundled-camera path stabilization that reduces jitter and smooths camera paths so that the latent features are accumulated across a plurality of frames.

11. The method of claim 10, wherein stabilization includes warping images to align each frame's camera view based at least on homography.

12. The method of claim 9, wherein the feature extractor neural network is a three dimensional (3D) or two-dimensional (2D) convolutional network.

13. The method of claim 9, wherein the classification tasks include at least bleeding and thermal injury detection, and wherein the classification tasks are causally distinct and include distinguishing active injury events from prior injury artifacts.

14. The method of claim 9, wherein the loss function for each time-based classifier further includes both focal and the uncertainty loss, wherein the loss function is based on the relation:

$$\mathcal{L}_{focal\text{-}uncertainty} = \left(\frac{1}{CN}\sum_c \sum_n \frac{1}{\sigma_c^2}(1-p_{cn})\mathcal{L}_{BCE_{cn}} + \log\sigma_c\right) + \lambda\mathcal{L}_{T\text{-}MSE};$$

where C is a number of classes, N is a number of samples, A is a smoothing loss constant, $L_{BCE_{cn}}$ is a corresponding binary cross entropy of class c and sample n, $p_{cn}$ is a confidence probability of a prediction of class c at sample n, and $\sigma^2_c$ is the learnable scalar added from the uncertainty loss.

15. The method of claim 9, the method comprising receiving a set of audio data, and extracting, by the feature extractor neural network, the vector of latent features from a combination of the set of audio data and the set of video data.

16. A non-transitory computer readable medium storing machine interpretable instructions, the machine interpretable instructions, which when executed by a processor, cause the processor to perform a method for automatically generating data structures configured to store classifications relating to an adverse event based on audio or video data, the classifications based at least on a plurality of classification tasks, the method comprising:
receiving a set of audio or video data;
extracting, using a feature extractor neural network, a vector of latent features from the set of audio or video data;
providing, to each of a plurality of time-based classifiers, the vector of latent features from the feature extractor neural network, each time-based classifier corresponding to a classification task of the plurality of classification tasks configured to detect an injury event;
training the feature extractor neural network on a training data set using a sigmoid binary cross-entropy loss and a regression loss; and
training each time-based classifier of the plurality of time-based classifiers separately on each classification task of the plurality of classification tasks with a loss function that includes at least the sigmoid binary cross-entropy loss and the regression loss;
wherein the regression loss is a truncated mean-square error (T-MSE) that minimizes a number of transitions from one action to another, and the combination of the regression loss and the sigmoid binary cross-entropy loss adapts the feature extractor neural network for multi-task event detection;
wherein the loss function is optimized for event-wise metric performance, based at least on intersection over union thresholds, over frame-wise metric performance by (1) incorporating a focal loss term to address class imbalance by scaling the loss function for each time-based classifier by a factor of 1−p, where p is a confidence value of a prediction, and (2) incorporating an uncertainty loss in the loss function for each time-based classifier by adding a trainable weight $\sigma^2_c$ to each task, the trainable weight representing a learnable scalar.

* * * * *